United States Patent
Kubota et al.

(10) Patent No.: US 6,540,336 B2
(45) Date of Patent: *Apr. 1, 2003

(54) LIQUID DISCHARGE HEAD, METHOD FOR MANUFACTURING SUCH HEAD, HEAD CARTRIDGE AND LIQUID DISCHARGING APPARATUS

(75) Inventors: Masahiko Kubota, Tokyo (JP); Masahiko Ogawa, Hino (JP); Masami Ikeda, Tokyo (JP); Ichiro Saito, Yokohama (JP); Hiroyuki Ishinaga, Tokyo (JP); Tomoyuki Hiroki, Zama (JP); Yoshiyuki Imanaka, Kawasaki (JP); Teruo Ozaki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,725

(22) Filed: Dec. 4, 1998

(65) Prior Publication Data

US 2002/0012026 A1 Jan. 31, 2002

(30) Foreign Application Priority Data

| Dec. 5, 1997 | (JP) | ................................. 9-336102 |
| Dec. 5, 1997 | (JP) | ................................. 9-336104 |
| Nov. 20, 1998 | (JP) | ................................. 10-331576 |

(51) Int. Cl.[7] ............................................. B41J 2/05
(52) U.S. Cl. ................................... 347/65; 216/27
(58) Field of Search ............................ 347/54, 56, 63, 347/65, 94; 430/320; 216/27; 438/21; 29/290.1

(56) References Cited

U.S. PATENT DOCUMENTS 3,379,803 A    4/1968   Tittmann et al. ............... 264/81

(List continued on next page.)

FOREIGN PATENT DOCUMENTS

| EP | 0100624 | 2/1984 |
| EP | 0811492 | 12/1997 |

(List continued on next page.)

OTHER PUBLICATIONS

Hawley's Condensed Chemical Dictionary 13th ed., revised by Richard J. Lewis, Sr., 1997, John Wiley & Sons, Inc., p. 840.*

*Primary Examiner*—John Barlow
*Assistant Examiner*—Blaise Mouttet
(74) *Attorney, Agent, or Firm*—Fitzpatrick, Cella, Harper & Scinto

(57) ABSTRACT

A liquid discharge head, a liquid discharging apparatus having such a liquid discharge head, and a method for manufacturing such a liquid discharge head. The liquid discharge head is provided with a top plate including a plurality of ink discharge ports for discharging ink droplet, a plurality of first liquid passages for supplying ink in correspondence to the plurality of ink discharge ports and a common liquid chamber for supplying the ink to the first liquid passages, a liquid discharge head substrate obtained by forming second liquid passages arranged adjacent to the first liquid passages and including bubble generating areas on a substrate on which a plurality of heat generating elements for causing the ink discharge port to discharge the ink droplets and including drivers for driving the heat generating elements, and a movable diaphragm for completely isolating the first liquid passages and the second liquid passages from each other and displaceable by a bubble generated on the heat generating element. The method includes a movable diaphragm forming step for providing the movable diaphragm in such a manner that a portion for fixing the movable diaphragm is covered.

16 Claims, 37 Drawing Sheets

U.S. PATENT DOCUMENTS

| | | | |
|---|---|---|---|
| 4,480,259 A | * 10/1984 | Kruger et al. | 347/63 |
| 4,490,728 A | * 12/1984 | Vaught et al. | 347/60 |
| 4,723,129 A | 2/1988 | Endo et al. | 346/1.1 |
| 4,929,964 A | * 5/1990 | Sato et al. | 347/62 |
| 5,068,674 A | 11/1991 | Sato et al. | 346/1.1 |
| 5,262,802 A | 11/1993 | Karita et al. | 346/140 R |
| 5,389,957 A | 2/1995 | Kimura et al. | 347/20 |
| 5,479,197 A | 12/1995 | Fujikawa et al. | 347/63 |
| 5,580,468 A | 12/1996 | Fujikawa et al. | 216/27 |
| 5,602,576 A | 2/1997 | Murooka et al. | 347/59 |
| 5,631,678 A | * 5/1997 | Hadimioglu et al. | 347/46 |
| 5,731,828 A | 3/1998 | Ishinaga et al. | 347/62 |
| 5,754,201 A | 5/1998 | Ishinaga et al. | 347/62 |
| 5,786,832 A | 7/1998 | Yamanaka et al. | 347/45 |
| 5,841,448 A | 11/1998 | Moriyama et al. | 347/19 |
| 5,850,238 A | 12/1998 | Karita et al. | 347/29 |
| 5,880,762 A | 3/1999 | Ishinaga et al. | 347/62 |
| 5,943,074 A | * 8/1999 | Kashino et al. | 347/54 |

FOREIGN PATENT DOCUMENTS

| | | | |
|---|---|---|---|
| EP | 816083 A2 * | 1/1998 | B41J/2/05 |
| EP | 0956953 | 11/1999 | |
| JP | 44-21353 | 9/1969 | |
| JP | 52-37479 | 9/1977 | |
| JP | 55-027282 | 2/1980 | |
| JP | 55-081172 | 6/1980 | |
| JP | 59-26270 | 2/1984 | |
| JP | 61-59911 | 12/1986 | |
| JP | 61-59914 | 12/1986 | |
| JP | 54-059936 | 12/1986 | |
| JP | 4-329148 | 11/1992 | |
| JP | 5-229122 | 9/1993 | |

* cited by examiner

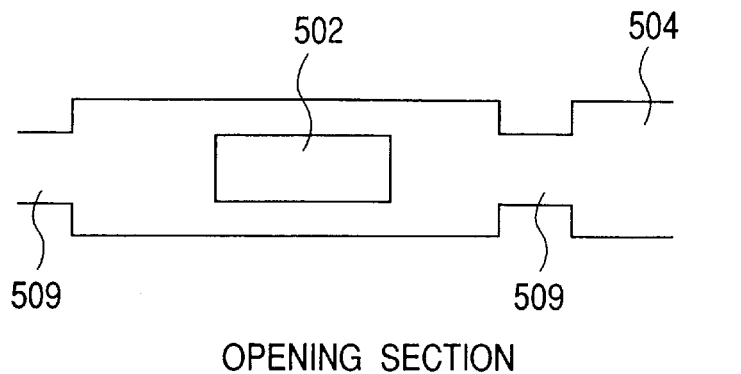
FIG. 14A
FIG. 14B
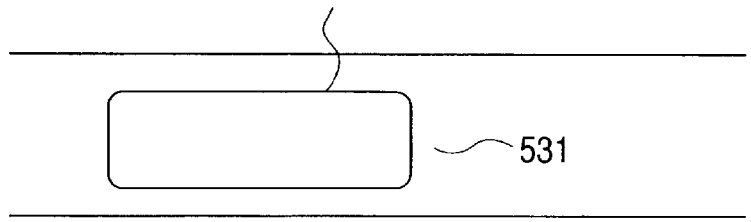
FIG. 14C
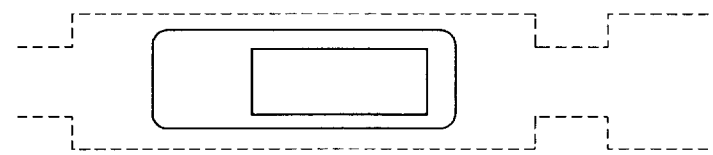
FIG. 14D
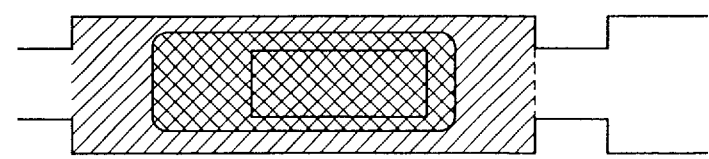

FIG. 20A1
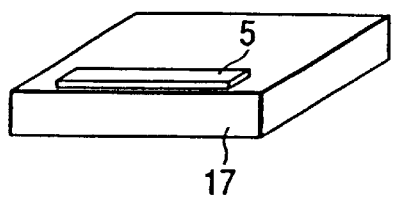
FIG. 20A2
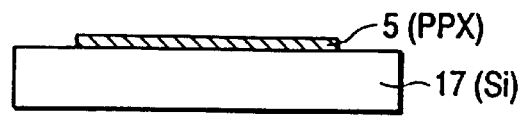
FIG. 20B1
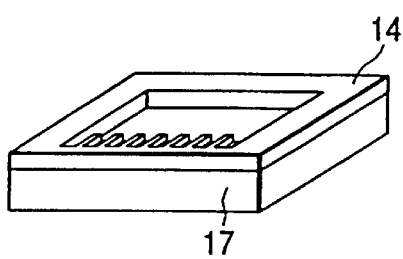
FIG. 20B2
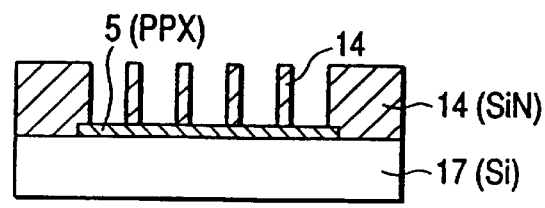
FIG. 20C1
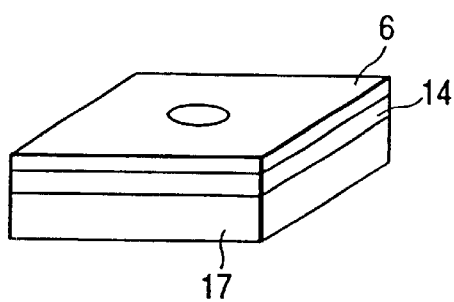
FIG. 20C2
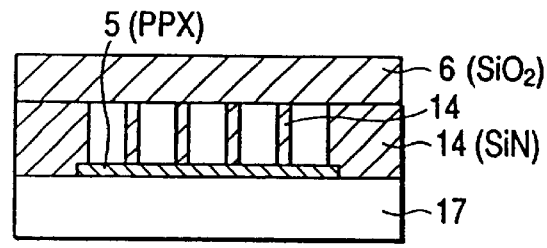
FIG. 20D1
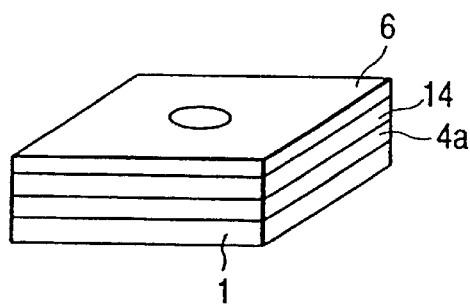
FIG. 20D2
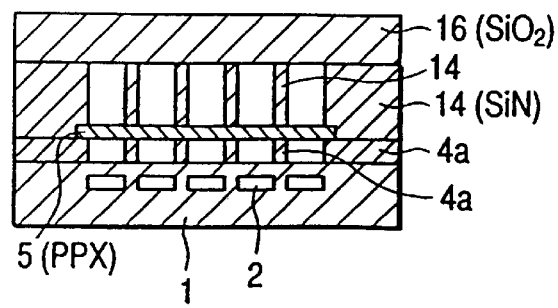

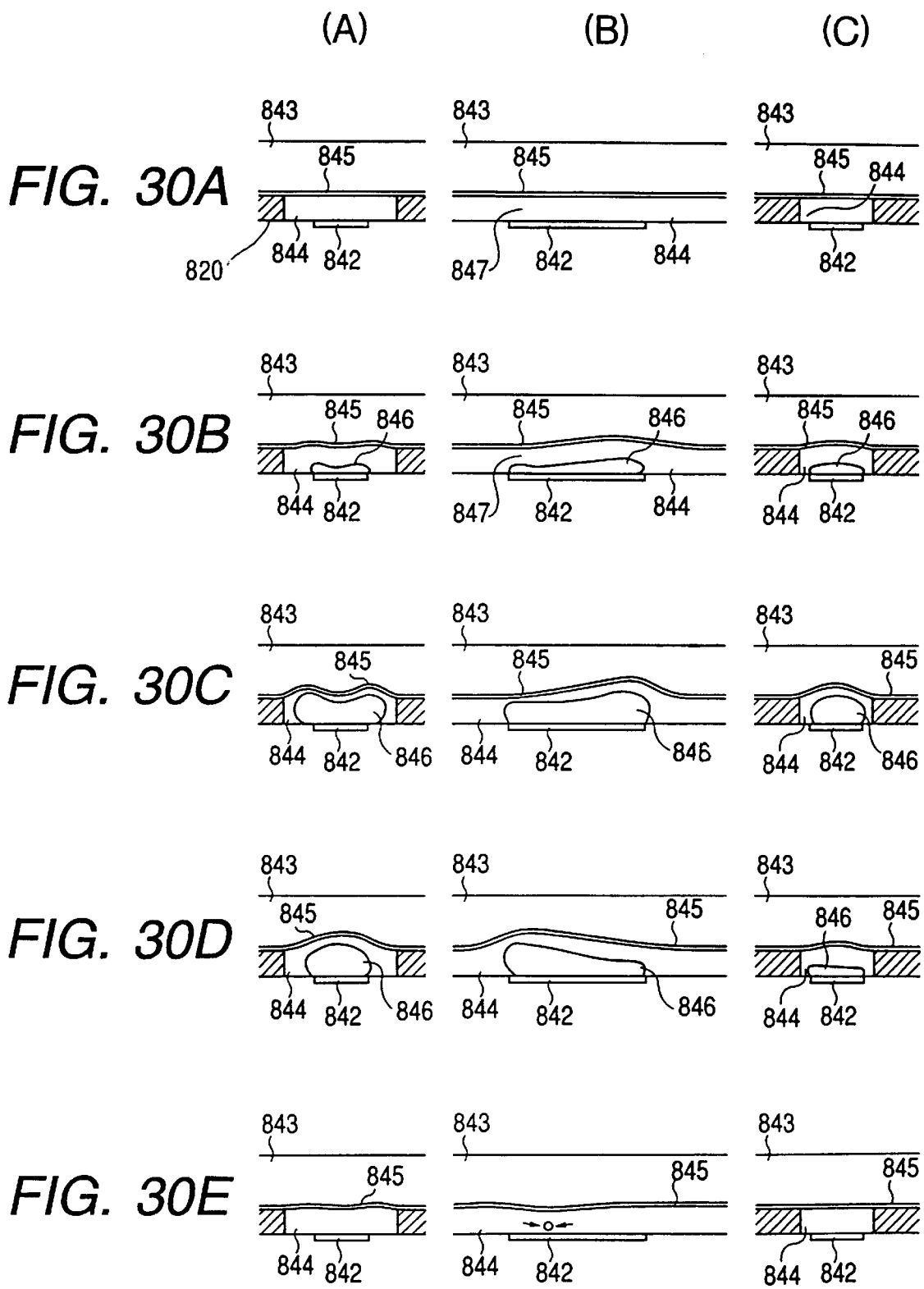

LIQUID DISCHARGE HEAD, METHOD FOR MANUFACTURING SUCH HEAD, HEAD CARTRIDGE AND LIQUID DISCHARGING APPARATUS

BACKGROUND OF THE INVENTION

1. Field of the Invention

The present invention relates to a method for manufacturing a liquid discharge head for discharging desired liquid by generating a bubble by causing thermal energy to act on the liquid, such a liquid discharge head, a head cartridge using such a liquid discharge head, and a liquid discharging apparatus.

Further, the present invention can be applied to an apparatus such as a printer, a copying machine, a facsimile having a communication system and a word processor having a printer portion for effecting recording with respect to a recording medium such as paper, thread, fibers, cloth, leather, metal, plastic, glass, wood or ceramics and the like, and an industrial recording apparatus combined with various processing devices in a composite manner.

Incidentally, in this specification, the term "recording" means not only that an image such as a character or a figure is applied on a recording medium but also that an image such as a pattern having no meaning is applied to a recording medium.

2. Related Background Art

It is already known to provide an ink jet recording method (so-called bubble jet recording method) in which a change in condition including abrupt volume change (generation of a bubble) is caused in ink by applying thermal energy to the ink, and the ink is discharged from a discharge port by an acting force based on the condition change, thereby forming an image by adhering the discharged ink onto a recording medium. A recording apparatus using such a bubble jet recording method generally includes discharge ports for discharging the ink, ink passages communicated with the discharge ports, and heat generating bodies (electrothermal converting elements) as energy generating means disposed in the ink passages and adapted to discharge the ink, as disclosed in Japanese Patent Publication Nos. 61-59911 and 61-59914.

According to the above-mentioned recording method, a high quality image can be recorded at a high speed with low noise, and, in a head effecting such a recording method, since the discharge ports for discharging the ink can be arranged with high density, a recorded image having high resolution and a color image can easily be obtained by a compact apparatus. Thus, the bubble jet recording method has recently been applied to various office equipment such as printers, copying machines and facsimiles, and has also been applied to industrial systems such as a print apparatus.

On the other hand, in the conventional bubble jet recording methods, since the heat generating member is heated repeatedly while contacting with the ink, deposit of ink may be accumulated on the heat generating member. Further, when liquid to be discharged is apt to be degraded or it is hard to generate an adequate bubble, good liquid discharge may not be achieved by the direct heating bubble formation by means of the heat generating member.

The Applicant has proposed a method for discharging discharge liquid by bubbling the bubbling liquid by thermal energy through a flexible diaphragm isolating the bubbling liquid from the discharge liquid, as disclosed in Japanese Patent Laid-Open No. 55-81172. In this method, a relation between the flexible diaphragm and the bubbling liquid is such that the flexible diaphragm is provided on a part of a nozzle. To the contrary, an arrangement in which a large diaphragm for separating the entire head into an upper portion and a lower portion is disclosed in Japanese Patent Laid-Open No. 59-26270. The large diaphragm is pinched between two plate members defining a liquid passage to prevent liquids in two liquid passages from mixing with each other.

On the other hand, a technique in which the bubbling liquid itself has its own feature and liquid having boiling point lower than that of the discharge liquid is used as the bubbling liquid in consideration of the bubbling feature is disclosed in Japanese Patent Laid-Open No. 5-229122, and a technique in which conductive liquid is used as the bubbling liquid is disclosed in Japanese Patent Laid-Open No. 4-329148.

SUMMARY OF THE INVENTION

However, the Inventors found the following problems by investigating the actual manufacturing of the liquid discharge head using the above-mentioned separating diaphragms.

That is to say, since the separation diaphragm is positioned between a substrate having a plurality of heat generating elements and a top plate for forming a common liquid chamber, when the deformable diaphragm is handled as a single piece, the attaching of the diaphragm becomes complicated and the diaphragm may be damaged during its attachment.

Further, it is difficult to adhere the diaphragm to desired positions on the ink passages and heaters of the head and to positively fix an area of the diaphragm other than a movable part thereof, which results in dispersion in discharging ability from part to part. Particularly, when the diaphragm (regarding application filed by the Inventors) is used for obtaining high level liquid discharging while maintaining the effect obtained by the separating ability of the diaphragm, this problem must be solved in a simple manner.

In addition, from another point of view, the Inventors found another new problem when the liquid is discharged on the basis of the bubble formation effected by film boiling using an organic diaphragm and a heat generating member. That is to say, there arises a need (which may occur in practical use) for improving the endurance of the separation diaphragm itself and the ink jet head in consideration of heating factors in the displacement of the diaphragm due to a series of condition changes (generation of bubble, growth of bubble and contraction of bubble).

A first object of the present invention is to provide a method for manufacturing a liquid discharge head, in which the above-mentioned problems can be solved and dispersion in discharging ability from part to part is reduced to improve reliability.

A second object of the present invention is to provide a liquid discharge head which can record a high quality and fine image and in which the above-mentioned problems can be solved and dispersion in discharging ability from part to part is reduced to improve reliability.

The other object of the present invention is to provide associated inventions (described later) such as a method for manufacturing a liquid discharge head, a liquid discharge head, a head cartridge and a liquid discharging apparatus derived by the Inventors in the course of solution of the above problems.

To achieve the above first object, according to the present invention, in a method for manufacturing a liquid discharge head comprising a top plate including a plurality of ink discharge ports for discharging ink droplets, a plurality of first liquid passages for supplying ink in correspondence to the plurality of ink discharge ports and a common liquid chamber for supplying the ink to the first liquid passages, a liquid discharge head substrate obtained by forming second liquid passages arranged adjacent to the first liquid passages and including bubble generating areas disposed adjacent to the first liquid passages on a substrate on which a plurality of heat generating elements for causing the ink discharge port to discharge the ink droplets and including drivers for driving the heat generating elements, and a movable diaphragm for completely separating the first liquid passages and the second liquid passages and displaceable by bubbles generated on the heat generating elements, there is provided a movable diaphragm forming step for providing the movable diaphragm in such a manner that a portion for fixing the movable diaphragm is covered.

According to another aspect of the present invention, in a method for manufacturing a liquid discharge head comprising a top plate including a plurality of ink discharge ports for discharging ink droplets, a plurality of first liquid passages for supplying ink in correspondence to the plurality of ink discharge ports and a common liquid chamber for supplying the ink to the first liquid passages, a liquid discharge head substrate obtained by forming second liquid passages arranged adjacent to the first liquid passages and including bubble generating areas disposed adjacent to the first liquid passages on a substrate on which a plurality of heat generating elements for causing the ink discharge port to discharge the ink droplets and including drivers for driving the heat generating elements, and a movable diaphragm for completely separating the first liquid passages and the second liquid passages and displaceable by bubbles generated on the heat generating elements, there are provided a step for providing the movable diaphragm on a support for forming the movable diaphragm, a step for providing movable diaphragm fixing portions for fixing the movable diaphragm on the movable diaphragm, and a step for removing the support.

According to the above-mentioned liquid discharge head manufacturing method, since the movable diaphragms are integral with the portions for fixing the movable diaphragms, the diaphragms themselves are not handled. Accordingly, a method for manufacturing a liquid discharge head, in which the above-mentioned problems can be solved and dispersion in discharging ability from part to part is reduced to improve reliability can be provided.

To achieve the above second object, according to the present invention, in a liquid discharge head comprising a top plate including a plurality of ink discharge ports for discharging ink droplets, a plurality of first liquid passages for supplying ink in correspondence to the plurality of ink discharge ports and a common liquid chamber for supplying the ink to the first liquid passages, a liquid discharge head substrate obtained by forming second liquid passages arranged adjacent to the first liquid passages and including bubble generating areas disposed adjacent to the first liquid passages on a substrate on which a plurality of heat generating elements for causing the ink discharge port to discharge the ink droplets and including drivers for driving the heat generating elements, and a movable diaphragm for completely separating the first liquid passages and the second liquid passages and displaceable by bubbles generated on the heat generating elements, the movable diaphragm has a frame abutting against the movable diaphragm to support the movable diaphragm.

According to the above-mentioned liquid discharge head, since the frame abutting against the movable diaphragm is provided, during the manufacture, when the movable diaphragm is handled, sufficient rigidity is ensured to prevent damage to the movable diaphragm and assembling alignment can be achieved easily and correctly. Further, since the portions (which become fixed ends (not moved) during the displacement of the movable diaphragm by the frame) of the diaphragm positively act as fixed ends without abutment between the top plate and the substrate, there is no dispersion from part to part and no dispersion depending upon use conditions, thereby stabilizing the discharging feature and recording a highly fine image.

According to another aspect of the present invention, in a liquid discharge head comprising a top plate including a plurality of ink discharge ports for discharging ink droplets, a plurality of first liquid passages for supplying ink in correspondence to the plurality of ink discharge ports and a common liquid chamber for supplying the ink to the first liquid passages, a liquid discharge head substrate obtained by forming second liquid passages arranged adjacent to the first liquid passages and including bubble generating areas disposed adjacent to the first liquid passages on a substrate on which a plurality of heat generating elements for causing the ink discharge port to discharge the ink droplets and including drivers for driving the heat generating elements, and a movable diaphragm for completely separating the first liquid passages and the second liquid passages and displaceable by bubbles generated on the heat generating elements, the top plate, the head substrate and portions of the movable diaphragm abutting against the top plate and the head substrate are formed from material including the same elements.

According to the above-mentioned liquid discharge head, the top plate, the head substrate and portions of the movable diaphragm abutting against the top plate and the head substrate are formed from material including the same elements. Accordingly, when the top plate, the head substrate and the movable diaphragm are assembled, even if the assembling is effected under a high temperature condition, the movable portions of the diaphragm can be prevented from being deviated from the liquid passages. Further, since the heat accumulated in the head during the operation equally acts on the top plate, the head substrate and the abutting portions of the movable diaphragm, the positions of the top plate, the head substrate and the movable diaphragm are not deviated, and excessive force does not act on the abutting portions. Accordingly, since the movable portions and the fixed portions of the movable diaphragm can positively be operated as the movable portions and the fixed portions, a highly fine output image can be obtained.

Further, the present invention provides a head cartridge having the above-mentioned liquid discharge head, and a liquid discharging apparatus having the above-mentioned liquid discharge head.

In addition, as mentioned above, the present invention includes inventions based on recognition of new problems caused when an organic diaphragm is used as the separation diaphragm, and such inventions can be understood from embodiments described later.

Incidentally, in this specification, terms "upstream" and "downstream" are used with respect to a liquid flowing direction from a liquid supply source through the bubble generating area (or movable member) to the discharge port, or, used as representing the corresponding directions in terms of the structure.

BRIEF DESCRIPTION OF THE DRAWINGS

FIGS. 14A, 14B, 14C and 14D are views for explaining an arrangement relation between a heat generating member and a second liquid passage and an abutting member of the liquid discharge head of FIGS. 13A to 13E, where FIG. 14A is a view showing a positional relation between the heat generating member and the second liquid passage, FIG. 14B is a top view of the abutting member, FIG. 14C is a view showing an arrangement relation between the heat generating member and the second liquid passage and the abutting member, and FIG. 14D is a view showing a displaceable area of the movable separation diaphragm;

FIGS. 20A1, 20A2, 20B1, 20B2, 20C1, 20C2, 20D1 and 20D2 are explanatory views for explaining steps for manufacturing a liquid discharge head according to a fourth embodiment of the present invention in sequence, where FIGS. 20A1, 20B1, 20C1 and 20D1 are perspective views, and FIGS. 20A2, 20B2, 20C2 and 20D2 are sectional views, taken along a direction perpendicular to the plurality of liquid passages and corresponding to the perspective views;

FIG. 26A is a sectional view taken along a direction of the liquid passage showing a non-bubbling condition, FIG. 26B is a sectional view taken along the direction of the liquid passage showing a bubbling (discharging) condition, and FIG. 26C is a view showing a construction of a second liquid passage;

FIG. 27A is a sectional view taken along a direction of the liquid passage showing a non-bubbling condition, and FIG. 27B is a sectional view taken along the direction of the liquid passage showing a bubbling (discharging) condition;

FIG. 28A is a view showing a portion of a wall of a second liquid passage formed in a stepped manner, and FIG. 28B is a view showing a portion of a wall of a second liquid passage formed to have a certain radius of curvature;

FIG. 29A is a top view showing a positional relation between a second liquid passage and a heat generating member, and FIG. 29B is a perspective view showing the positional relation of FIG. 29A;

FIGS. 30A, 30B, 30C, 30D and 30E are views for explaining a discharging operation of the liquid discharge head shown in FIGS. 29A and 29B in a time-lapse manner, where (A) in FIGS. 30A to 30E are sectional views taken along the line B—B in FIG. 29A, (B) in FIGS. 30A to 30E are sectional views taken along the line A—A in FIG. 29A, and (C) in FIGS. 30A to 30E are sectional views taken along the line C—C in FIG. 29A;

FIG. 31A is a view showing a condition that a width of a second liquid passage near a heat generating member is gradually increased in a stepped manner from an upstream side to a downstream side, FIG. 31B is a view showing a condition that a width of a second liquid passage near a heat generating member is gradually increased to have a certain radius of curvature from an upstream side to a downstream side, and FIG. 31C is a view showing a condition that a width of a second liquid passage near a heat generating member is gradually increased to have a radius of curvature reverse to that of FIG. 31B from a downstream side to an upstream side;

FIG. 38A is a view showing a non-bubbling condition and FIG. 38B is a view showing a bubbling condition;

FIG. 43A is a view showing a non-bubbling condition and FIG. 43B is a view showing a bubbling (discharging) condition; FIG. 44A is a view showing a non-bubbling condition and FIG. 44B is a view showing a bubbling (discharging) condition.

DESCRIPTION OF THE PREFERRED EMBODIMENTS

The present invention will now be explained in connection with embodiments thereof with reference to the accompanying drawings.

First Embodiment

Figure 1:
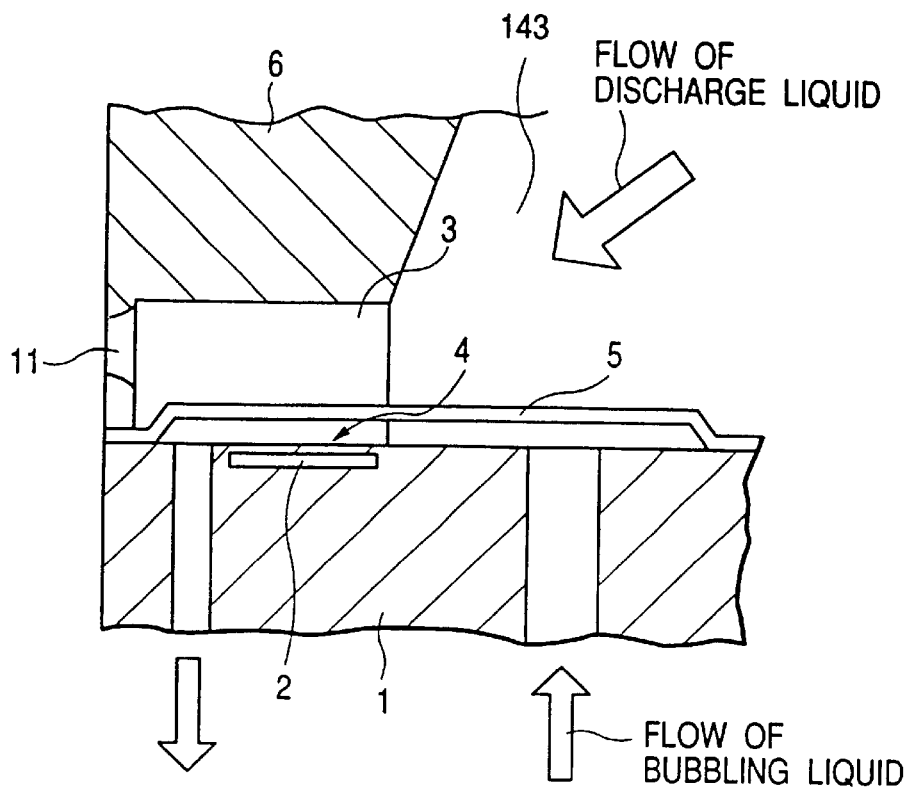
FIG. 1 is a sectional view of a liquid discharge head according to a first embodiment of the present invention, taken along a direction of a liquid passage.
Figure 2:
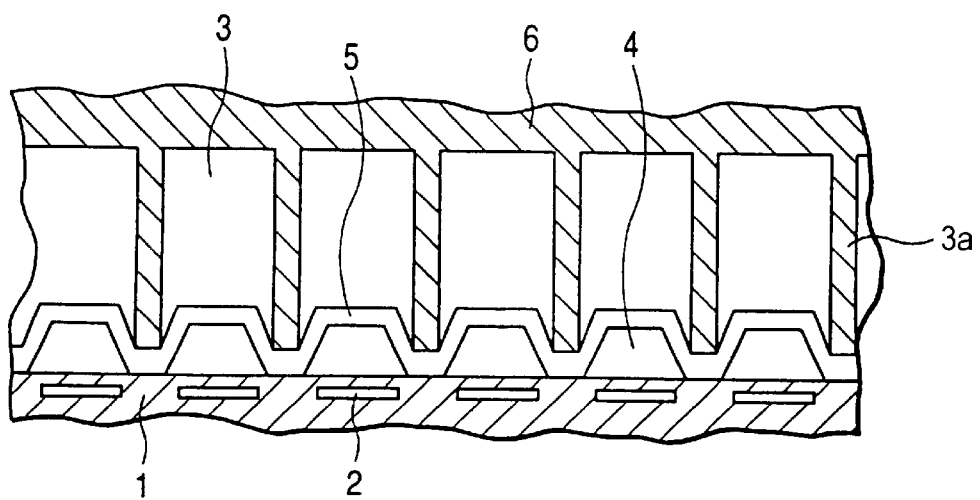
FIG. 2 is a sectional view of the liquid discharge head of FIG. 1, taken along a direction perpendicular to the plurality of liquid passages.

FIG. 1 is a sectional view of a liquid discharge head according to a first embodiment of the present invention, taken along a direction of a liquid passage, and FIG. 2 is a sectional view of the liquid discharge head of FIG. 1, taken along a direction perpendicular to the plurality of liquid passages.

In the liquid discharge head according to the first embodiment, second liquid passages 4 for bubbling liquid are located on a liquid discharge head substrate 1 on which a plurality of heat generating elements 2 for affording bubble generating thermal energy to liquid are arranged, and first liquid passages 3 (for discharge liquid) communicated with discharge ports 11 are provided on the second liquid passages. The first and second liquid passages correspond to the respective heat generating elements 2.

A movable separation diaphragm 5 made of non-organic material and having elasticity is disposed between the first and second liquid passages, so that the discharge liquid in the first liquid passages 3 is completely isolated from the bubbling liquid in the second liquid passages 4. The discharge liquid in the first liquid passages 3 and the bubbling liquid in the second liquid passages 4 are supplied from respective supply paths.

The discharge liquid is supplied from an ink tank (described later) to a first common liquid chamber and is discharged from the discharge ports through the first liquid passages corresponding to the plurality of respective heat generating elements. On the other hand, the bubbling liquid is supplied to a second common liquid chamber and is loaded in the second liquid passages corresponding to the plurality of respective heat generating elements. In the illustrated embodiment, the bubbling liquid flows as shown by the arrows in FIG. 1 and is moved or circulated through a liquid moving path (not shown).

The first liquid passages 3 communicated with the discharge ports 11 are formed by joining the top plate 6 to the liquid discharge head substrate 1. That is to say, the top plate 6 according to the illustrated embodiment is constituted by an orifice plate having the discharge ports 1, a plurality of liquid passage walls 3a for defining the plurality of first liquid passages 3, and a liquid chamber frame defining a first common liquid chamber 143 commonly communicated with the plurality of first liquid passages 3 to supply liquid (discharge liquid) to the first liquid passages 3.

The liquid discharge head according to the illustrated embodiment has a characteristic that the liquid discharge head substrate 1, movable separation diaphragm 5 and top plate 6 are formed from material including the same elements such as silicon.

First of all, a method for manufacturing the liquid discharge head according to the illustrated embodiment will be explained. FIGS. 3A through 3C to 5A through 5C are schematic views for explaining the liquid discharge head manufacturing method.

Firstly, a method for manufacturing the top plate will be briefly described with reference to FIGS. 3A to 3C.

In what follows, the term "heat $SiO_2$ oxide" is used to indicate that heat is used for forming an oxide film on an Si substrate.

Figure 3A:
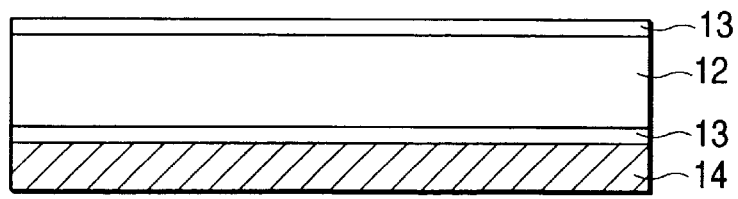
FIGS. 3A, 3B and 3C are views showing steps for manufacturing a top plate constituting the liquid discharge head according to the first embodiment of the present invention.

As shown in FIG. 3A, first of all, after films 13 of heat $SiO_2$ oxide having a thickness of about 1 μm are formed on both surfaces of a silicone wafer 12 (Si substrate), a portion for defining the common liquid chamber is patterned by using a known technique such as photolithography. And, an SiN film 14 (material of nozzles) having a thickness of about 30 μm is formed on the film 13 by a microwave CVD method (referred to as "μW-CVD method" herein after). Gas used for forming the SiN film in the μW-CVD method may be mixed gas of monosilane ($SiH_4$), nitrogen ($N_2$) and argon (Ar). Incidentally, components of the gas used may include zinrane ($Si_2H_6$) and/or ammonia ($NH_3$), as well as the above gases.

In the illustrated embodiment, the SiN film is formed under high vacuum of 5 mTorr by using a microwave having power of 1.5 kW and by supplying $SiH_4/N_2/Ar$ having a flow rate of 100/100/40 sccm. The SiN film maybe formed with other component ratios and by a CVD method using an RF power source.

Figure 3B:
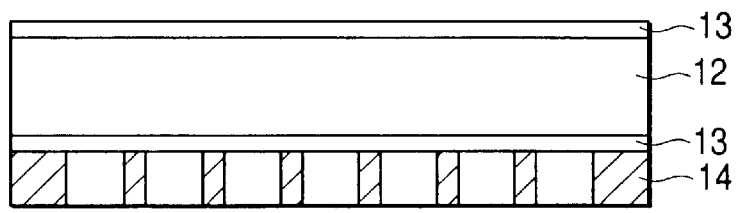

Then, as shown in FIG. 3B, orifice portions and liquid passage portions are patterned by using a known technique such as photolithography, and etching is effected to obtain a trench structure by using an etching device utilizing dielectric coupled plasma.

Figure 3C:
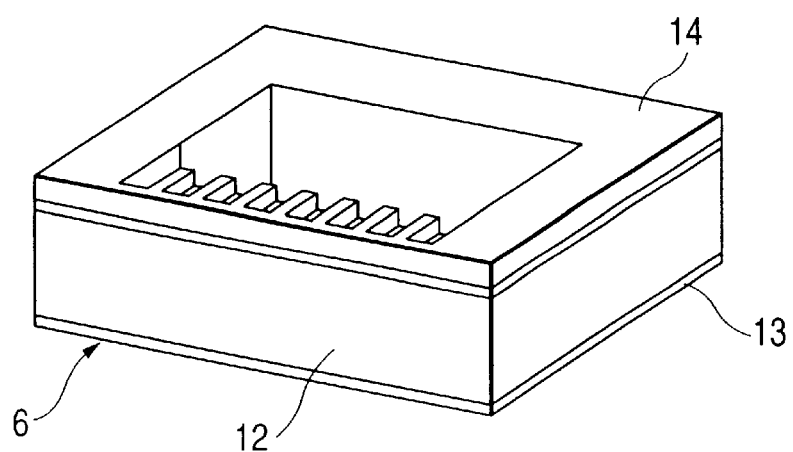

Thereafter, as shown in FIG. 3C, by using tetra-methyl-ammonium-hydroxide (referred to as "TMAH"" hereinafter), etching is effected on the silicon wafer 12 to manufacture the silicone top plate 6 integral with orifices as shown in FIG. 1.

Next, a method for manufacturing the head substrate and the movable diaphragm will be explained with reference to FIGS. 4A to 4C.

Figure 4A:
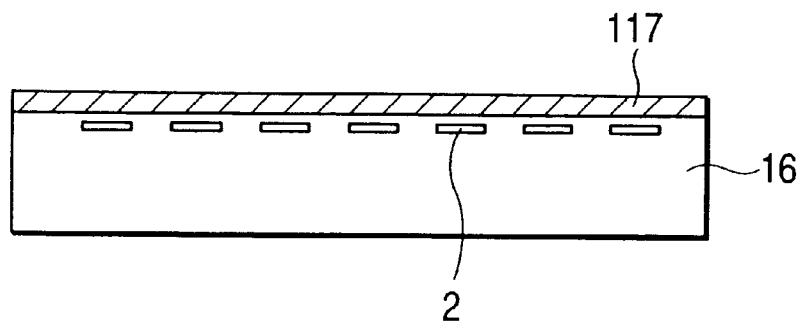
FIGS. 4A, 4B and 4C are explanatory views showing a manufacturing method for manufacturing a liquid discharge substrate constituting the liquid discharge head according to the first embodiment of the present invention, and a condition that the top plate is joined to the liquid discharge substrate.

First of all, as shown in FIG. 4A, a PSG (Phospho-Silicate Glass) film 117 having a thickness of about 5 μm is formed on an element substrate 16 (described later) by using a plasma CVD method. In the illustrated embodiment, since the thickness of the PSG film 117 ultimately determines the heights of the second liquid passages, in consideration of balance of the entire liquid passages depending upon liquid supply conditions to the second liquid passages, it is desirable that the thickness is selected to a value for achieving the most excellent efficiency of the movable member.

Figure 4B:
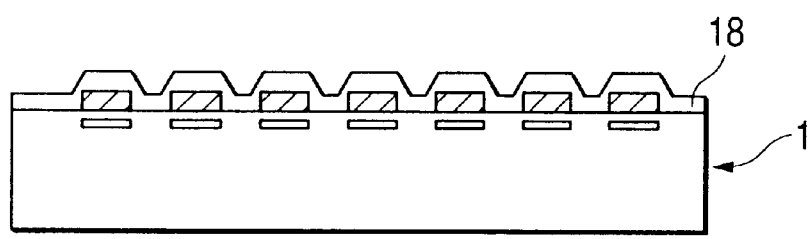

Then, as shown in FIG. 4B, portions of the PSG film other than portions defining the second liquid passages and the second common liquid chamber are patterned by using a known technique such as photolithography, and an SiN film 18 (defining the separation diaphragm between the first liquid passages and the second liquid passages) having a thickness of about 1 μm is formed on the PSG film. This SiN film is generally used in a semi-conductor process and has good alkali resistance, chemical stability and good ink resistance. As composition of the SiN film, $Si_3N_4$ is the best, but, in consideration of the efficiency of the movable diaphragm, Si:N may be selected in the range of 1:1 to 1.5. Further, in view point of excellent alkali resistance, chemical stability and ink resistance, SiC may be used in place of SiN. Incidentally, a thickness of the movable diaphragm made of inorganic material such SiN is desirably 1000 Å–1 μm (in case of SiN), depending upon materials.

On the other hand, regarding a rear surface of the element substrate 16, after the heat $SiO_2$ oxide film having the thickness of about 1 μm was previously formed thereon, a plurality of opening portions (not shown in FIGS. 4A to 4C; refer to FIG. 1) for supplying openings and discharging openings for forming the liquid moving paths defined by the second common liquid chamber and the second liquid passages are patterned by using a known technique such as photolithography. Cylindrical through-holes each having a diameter of 10 to 50 μm are formed (by etching) in the rear surface of the element substrate 16 by an etching device using dielectric coupled plasma.

In the illustrated embodiment, by using the PSG film as a sacrifice layer for forming the second liquid passages, in the etching process, when the holes corresponding to the second liquid passages are provided, the etching can be stopped at a certain location on the PSG film. Incidentally, regarding areas on the element substrate in which the through-holes are formed, a heat accumulation layer 103 (described later) can previously be removed.

Figure 4C:
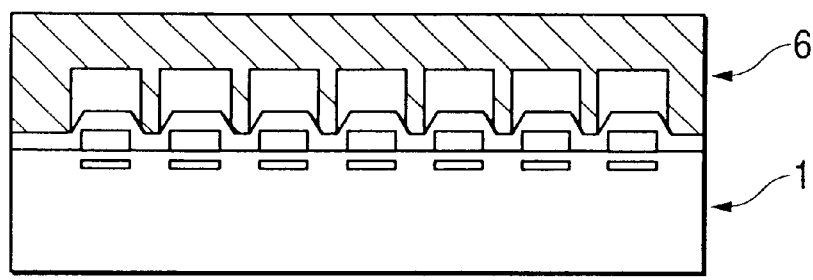

And, as shown in FIG. 4C, by pouring solvent (for example, buffered fluoroacid) for removing PSG from the rear surface of the substrate in which the through-holes were formed, the second liquid passages are formed, thereby completing the head substrate integral with the movable diaphragm. Incidentally, as is explained in the illustrated embodiment, by using the second liquid passages as the liquid moving paths and by providing the plurality of through-holes, the removal of PSG by the solvent can be promoted and residual etching can be prevented.

As mentioned above, according to the method for manufacturing the head substrate integral with the movable diaphragm, since the movable diaphragm is formed integrally with the head substrate having the portion for securing the movable diaphragm, it is not required that a very thin movable diaphragm having a thickness of about 1 μm be handled as a single piece.

Further, since the movable diaphragm can be formed integrally with the head substrate having the heat generating resistance elements, the positioning of the movable diaphragm with respect to the heat generating resistance elements can be effected more correctly, thereby preventing dispersion in discharging ability from part to part. Further, since the second liquid passages are formed by utilizing the semiconductor manufacturing process, the pitch between the liquid passages can be reduced to about 10 to 20 μm, thereby realizing high density arrangement of the nozzles easily.

Incidentally, while an example that PSG is used as the sacrifice layer for forming the second liquid passages was explained, so long as a selection ratio between the sacrifice layer and the movable separation diaphragm is provided by the solvent, any material can be used. For example, as is explained in the illustrated embodiment, when SiN is used as the movable separation diaphragm and buffer fluoroacid is used as the solvent, BPSG (Boron-doped Phospho-Silicate Glass) can be conveniently used as the sacrifice layer. Incidentally, in the case where SiN is used as the movable separation diaphragm and buffer fluoroacid is used as the solvent, when PSG or BPSG is used as the sacrifice layer, even if residual etching remains in parts of the second liquid passages, since the residual etching is apt to be etched alkali substance such as ink, the residual etching is flown out ultimately when the ink is supplied, thereby improving the reliability. Further, when manufactured by the above-mentioned process, it is desirable that the selection ratio regarding the element substrate is provided in the etching process for formation of the above-mentioned through-holes. Among materials satisfying such a condition, any desirable material may be selected.

Next, the joining of the top plate shown in FIG. 4C and the head substrate integral with the movable diaphragm will be explained.

In the illustrated embodiment, since the head substrate integral with the movable diaphragm and the top plate are formed from the same elements, the two components can be joined by low noise (room temperature) joining using surface activity (referred to merely as "room temperature joining" hereinafter).

A room temperature joining device used in this case comprises an auxiliary chamber and a joining chamber (both are vacuum chambers), and vacuum of 1 to 10 Pa is used. In the auxiliary chamber, an alignment position for positioning a portion for joining the liquid discharge head substrate 1 and the orifice integral type top plate 6 is determined by using image treatment. Thereafter, while such a condition is being maintained, the assembly is conveyed into the joining chamber, where energy particles are applied to the surface of the SiN film at the portion to be joined. After the surface is activated by such application, the liquid discharge head substrate 1 and the orifice integral type top plate 6 are joined. In this case, in order to increase strength, temperature of 200° C. or more or pressure may be applied.

Incidentally, as a joining method, after a thin film (having a thickness of 3000 Å) of water glass (sodium silicate) is coated on the portion (to be joined) of the liquid discharge head substrate and the patterning is effected, the substrate may be joined to the top plate at a temperature of about 100° C., or, after adhesive is coated on one of the discharge head substrate and the top plate by a transferring method, the joining may be effected with heat and pressure.

In the illustrated embodiment, when the top plate and the head substrate are joined, since the top plate, movable diaphragm and head substrate are all formed from material including silicon, all these parts are influenced by thermal expansion in the same manner, thus improving heat resistance. Therefore, even when the assembling (joining) is performed under a high temperature condition, the movable portions of the diaphragm can be prevented from being deviated from the liquid passages. Incidentally, for the purpose of equalizing the influence due to thermal expansion, the material used is not limited to silicon, but the top plate, movable diaphragm and head substrate may all be formed from another element.

Figure 5A:
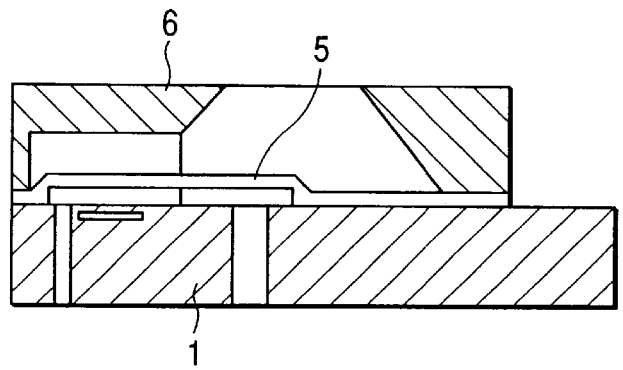
FIGS. 5A, 5B and 5C are schematic sectional views showing steps for forming orifices in the top plate constituting the liquid discharge head according to the present invention.
Figure 5B:
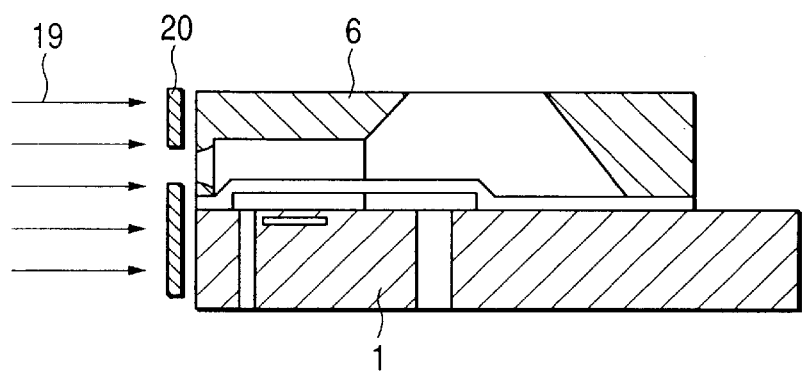
Figure 5C:
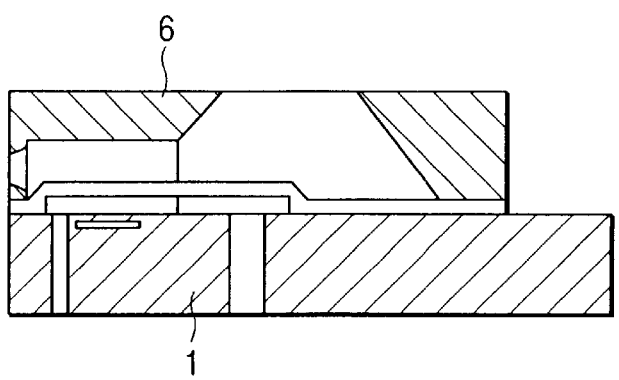

As mentioned above, regarding the assembly obtained by joining the top plate and the head substrate as shown in FIG. 5A, as shown in FIG. 5B, the orifice portions are worked by an ion beam 19 while using a mask 20 under vacuum. In this case, due to power of the ion beam, the working can be effected in an inverted taper. In this way, as shown in FIG. 5C, the head can be completed. Incidentally, as a method for manufacturing the orifices, a laser abrasion using an excimer laser may be effected under normal temperature/pressure.

In the laser abrasion using an excimer laser, SiN material is suitable. In the above-mentioned working of material including silicon, SiN is best, then, SiC and Si are better, and $SiO_2$ is worst. Incidentally, the diaphragm including the silicon is formed by the plasma CVD method.

Although the face of the inorganic insulation diaphragm formed by the laser abrasion has an adequately sharp configuration as it is, in order to obtain a sharper configuration, a polishing process may be added.

Next, the liquid discharging from the liquid discharge head of FIG. 1 will be explained with reference to FIGS. 6A to 6E. FIGS. 6A to 6E are schematic sectional views (taken along a direction of the liquid passage) for explaining the manner that the liquid is discharged from the liquid discharge head of FIG. 1 in a time-lapse fashion.

In FIGS. 6A to 6E, the first liquid passages 3 directly communicated with the discharge ports 11 are filled with first liquid supplied from the first common liquid chamber 143, and the second liquid passages 4 having the bubble generating areas are filled with the bubbling liquid from which a bubble can be formed by applying thermal energy from the heat generating member 2.

Figure 6A:
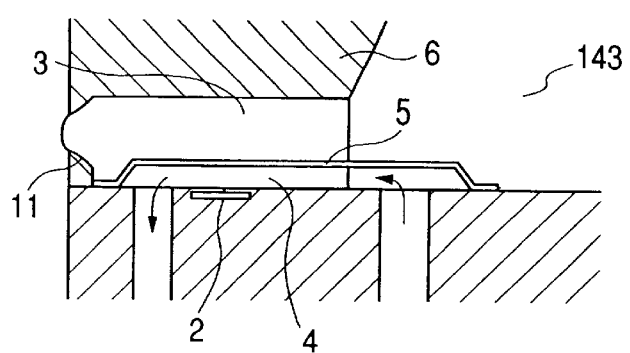
FIGS. 6A, 6B, 6C, 6D and 6E are schematic sectional views (taken along the direction of the liquid passage) for explaining liquid discharged from the liquid discharge head of FIG. 1 in a time-lapse manner.

In an initial condition as shown in FIG. 6A, the liquid in the first liquid passage 3 is conveyed near the discharge port 11 by a capillary force. Incidentally, in the illustrated embodiment, the discharge port 11 is located at a downstream side of the projection area of the heat generating member 2 onto the first liquid passage 3 in a liquid flowing direction in the first liquid passage 3. As mentioned above, the second liquid flows to be shifted in the second liquid passage in a direction shown by the arrows.

Figure 6B:
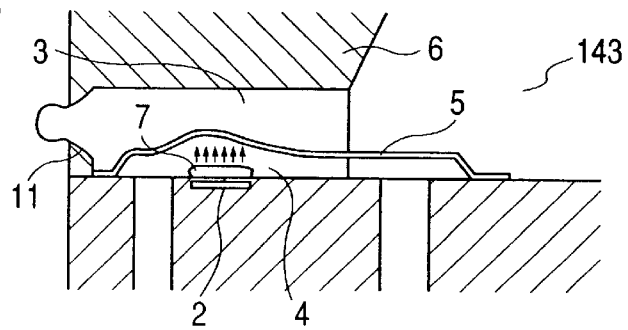

In this condition, when the thermal energy is applied to the heat generating member 2, the heat generating member 2 is heated quickly, with the result that the second liquid contacted with the bubble generating area is heated to generate the bubble (FIG. 6B). The bubble 7 is generated by a film boiling phenomenon described in the U.S. Pat. No. 4,723,129 and is formed on the entire surface of the heat generating member with high pressure. The pressure generated in this case is propagated through the second liquid in the second liquid passage 4 to act on the movable separation diaphragm 5, with the result that the movable separation diaphragm 5 is deformed to start the discharging of the first liquid in the first liquid passage 3.

Figure 6C:
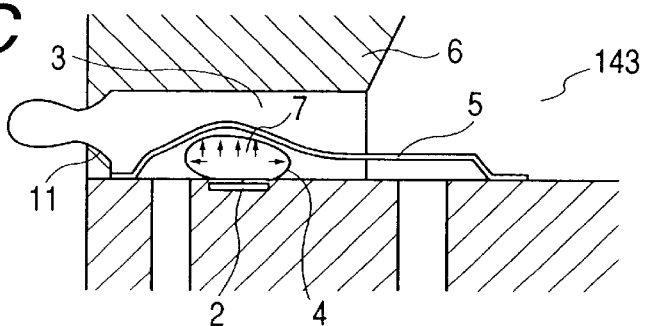
Figure 6D:
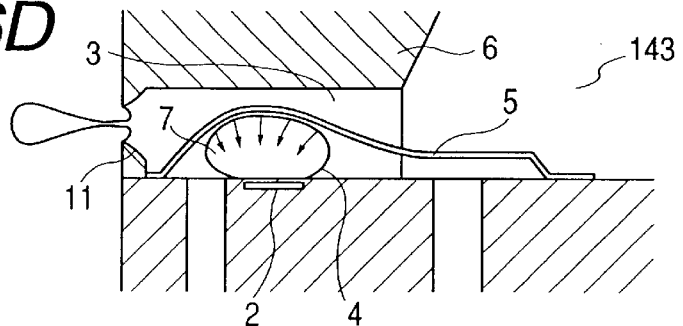
Figure 6E:
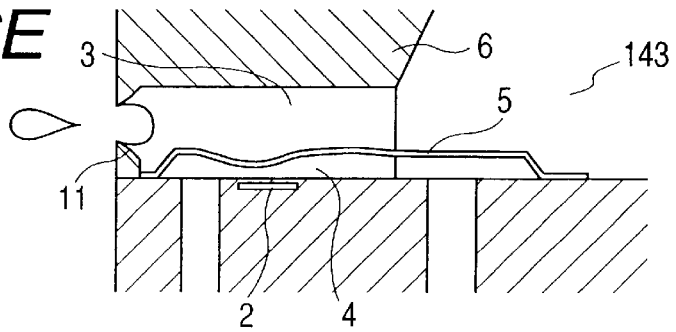

When the bubble 7 generated on the entire surface of the heat generating member 2 is grown quickly, the bubble becomes a film shape (FIG. 6C). The expansion of the bubble 7 with high pressure in the initial bubble generating condition causes further deformation of the movable separation diaphragm 5, with the result that the discharging of the first liquid in the first liquid passage 3 from the discharge port 11 is further promoted. Thereafter, when the bubble 7 is further grown, the deformation of the movable separation diaphragm 5 is increased (FIG. 6D), and, thereafter, when the bubble is contracted, the movable diaphragm is returned to the initial condition shown in FIG. 6A (FIG. 6E).

As mentioned above, in the liquid discharge head according to the illustrated embodiment, the liquid discharge head substrate 1, movable separation diaphragm 5 and top plate 6 are formed from material including the same element. Accordingly, since the influence due to heat accumulation acts on these members in the same manner, in use, the joined portions between the liquid discharge head substrate 1, movable separation diaphragm 5 and top plate 6 are not subjected to excessive forces. Therefore, since the assembling accuracy in the manufacture is improved and the movable portions and fixed portions of the movable diaphragm can surely be functioned as the movable portions and fixed portions, respectively, a highly fine output image can be obtained stably.

Further, in the illustrated embodiment, since the top plate is formed from the material including silicon, heat radiating ability of the head can be improved in comparison with a head made of resin. Further, since the liquid passage walls defining the liquid passages for the discharge liquid are formed from SiN as well as the movable separation diaphragm, ink resistance can be enhanced. With such additional features, the above-mentioned effect (in the illustrated embodiment) that the highly fine output image can be obtained stably becomes further excellent.

Lastly, supplementary explanation of the liquid discharge head of FIG. 1 will be made.

In the illustrated embodiment, in the head shown in FIG. 1, the second common liquid chamber 144 (shown in FIG. 7) communicated with the second liquid passages is defined by the movable separation diaphragm 5. In order to prevent the flow of the liquid (caused by the pressure wave due to the bubble generated at the bubble generating area between the movable separation diaphragm and the heat generating resistance element) from entering into the second liquid passage, the side walls defining the second liquid passage are extended up to an upstream point of the rear end of the heat generating resistance element 2.

As is explained in the illustrated embodiment, since the second common liquid chamber is defined by the diaphragm, there is obtained an effect that the cross-talk of the bubbling liquid due to the bubbling can be further suppressed. In order to enhance such effect, as is indicated in the illustrated embodiment, it is desirable that the second common liquid chamber is opposed to the first common liquid chamber with the interposition of the movable separation diaphragm.

Second Embodiment

Figure 7:
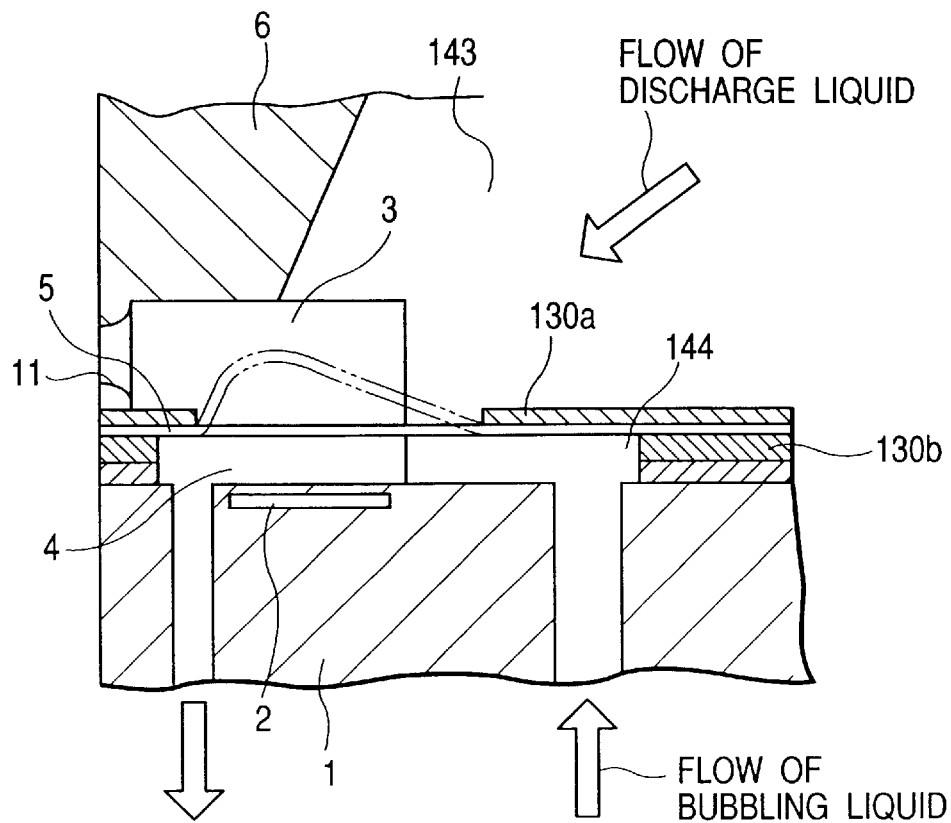
FIG. 7 is a sectional view of a liquid discharge head according to a second embodiment of the present invention, taken along a direction of a liquid passage.
Figure 8:
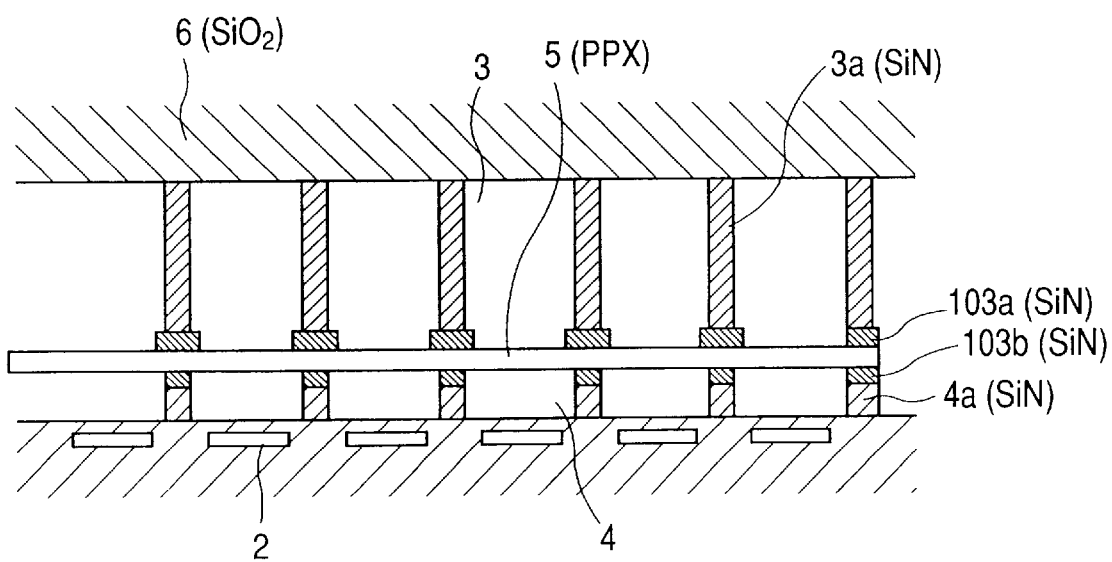
FIG. 8 is a sectional view of the liquid discharge head of FIG. 7, taken along a direction perpendicular to the plurality of liquid passages.

FIG. 7 is a sectional view of a liquid discharge head according to a second embodiment of the present invention, taken along a direction of a liquid passage, and FIG. 8 is a sectional view of the liquid discharge head of FIG. 7, taken along a direction perpendicular to the plurality of liquid passages. Incidentally, in the second embodiment, elements having the same function as that of the first embodiment are designated by the same reference numerals.

In the liquid discharge head according to this embodiment, second liquid passages 4 for bubbling liquid are located on a liquid discharge head substrate 1 on which heat generating elements 2 for affording bubble generating thermal energy to liquid are arranged, and first liquid passages 3 (for discharge liquid) communicated with discharge ports 11 are provided on the second liquid passages. The first and second liquid passages correspond to the respective heat generating elements 2. A movable separation diaphragm 5 having elasticity is disposed between the first and second liquid passages, so that the discharge liquid in the first liquid passages 3 is completely isolated from the bubbling liquid in the second liquid passages 4. The discharge liquid in the first liquid passages 3 and the bubbling liquid in the second liquid passages 4 are supplied from respective supply paths.

The first liquid passages 3 communicated with the discharge ports 11 are formed by joining the top plate 6 to the liquid discharge head substrate 1. That is to say, the top plate 6 is constituted by an orifice plate having the discharge ports 11, a plurality of grooves for defining the plurality of first liquid passages 3, and a recess defining a first common liquid chamber 143 commonly communicated with the plurality of first liquid passages 3 to supply liquid (discharge liquid) to the first liquid passages 3.

The separation diaphragm 5 is made of material having elasticity and having heat resistance against a temperature of about 300° C., oil resistance, solvent resistance and chemical resistance. Further, good diaphragm forming ability by using coating or deposition is desirable. For example, polyparaxylirene used in a surface film of a silicone rubber elastic body may be used. Such material has good adhering ability to silicone material and good elasticity and, from such material, a thin film can be obtained by a vapor-phase deposition polymerization method. Further, a fluororesin film is also suitable for the separation diaphragm of the liquid discharge head of the present invention. After water paint of fluororesin (for example, FEP, PFA, PTFE) is coated, a film is formed by heating firing. The fluororesin also has good adhering ability to silicone material and good elasticity.

Joining members 130a, 130b for fixing the separation diaphragm 5 and for joining first liquid passage walls 3a and first common liquid chamber frame to second liquid passage walls 4a and second common liquid chamber frame are disposed on and under the separation diaphragm 5. In the illustrated embodiment, the top plate, head substrate and joining members 130a, 130b are all made of material including silicon.

Accordingly, since the influence due to heat accumulation acts on these members in the same manner, in use, the joined portions between the liquid discharge head substrate 1, movable separation diaphragm 5 and top plate 6 are not subjected to excessive forces. Therefore, since the assembling accuracy in the manufacture is improved and the movable portions and fixed portions of the movable diaphragm can surely be functioned as the movable portions and fixed portions, respectively, a highly fine output image can be obtained stably.

Further, in the illustrated embodiment, since the top plate is formed from the material including silicon, heat radiating ability of the head can be improved in comparison with a head made of resin, and, the above-mentioned effect (in the illustrated embodiment) that the highly fine output image can be obtained stably becomes further excellent, as in the first embodiment.

Lastly, supplementary explanation of the characteristic of this embodiment will be made.

As in the first embodiment, in the second embodiment, since the side walls defining the second liquid passages are extended up to a point upstream of the rear ends of the heat generating resistance elements 2 and the second common liquid chamber 144 is opposed to the first common liquid chamber with the interposition of the movable separation diaphragm, the cross-talk of the bubbling liquid due to the bubbling can be further suppressed.

Further, in the illustrated embodiment, the liquid passage walls 3a (side walls of the first liquid passages) for defining the first liquid passages are extended up to the first common liquid chamber 143 at the point upstream of the rear ends of the heat generating resistance elements 2, and there is no upper wall there.

With this arrangement, when the bubble is growing in the bubble generating area between the movable separation diaphragm 5 and the heat generating resistance element 2, the flow of liquid toward the upstream and adjacent nozzles is blocked or suppressed by the deformed movable separation diaphragm 5 and the liquid passage walls 3a, thereby suppressing shifting of the liquid toward the upstream direction. As a result, a retard amount of meniscus during contraction of bubble can be reduced.

Incidentally, also in an example shown in FIGS. 13A to 13E (described later), the above arrangement may be applied.

Next, a method for manufacturing the liquid discharge head according to the illustrated embodiment will be explained with reference to FIGS. 9A through 9C to 12A and 12B.

Firstly, the method for manufacturing the top plate will be described with reference to FIGS. 9A and 9B.

Figure 9A:
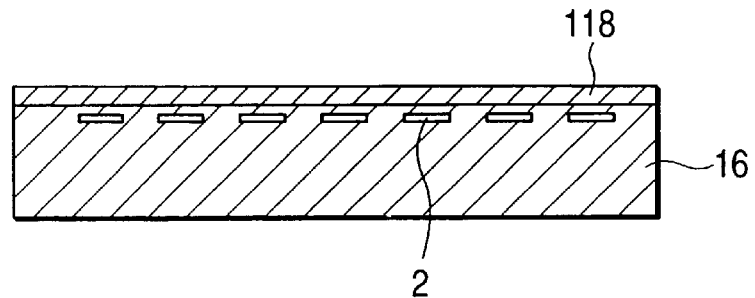
FIGS. 9A, 9B and 9C are explanatory views showing a manufacturing method for manufacturing a liquid discharge substrate constituting the liquid discharge head according to the second embodiment of the present invention, and a condition that the top plate is joined to the liquid discharge substrate.

As shown in FIG. 9A, first of all, an SiN film 118 (forming the liquid passage walls 4a defining the second liquid passages) having a thickness of about 5 $\mu$m is formed on an element substrate 16 (fully described later) by the $\mu$W-CVD method. And, the second liquid passages and the second common liquid chamber (not shown) are formed by using a known technique such as photolithography.

Thereafter, a film of heat $SiO_2$ oxide having a thickness of about 1 $\mu$m is formed on the element substrate 16.

On the other hand, regarding the rear surface of the element substrate, a plurality of supply opening portions for supplying the bubbling to the second common liquid chamber and for shifting the bubbling liquid from the second liquid passages are patterned by using a known technique such as photolithography. And, cylindrical through-holes having a diameter of 50 $\mu$m are formed (by etching) in the rear surface of the element substrate by an etching device using dielectric coupled plasma. As in the first embodiment, also in the second embodiment, it is desirable that a heat accumulation layer 103 (described later) is previously removed from areas where the through-holes are formed.

Figure 9B:
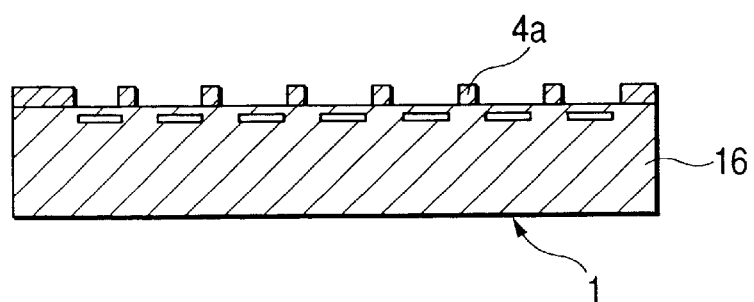
Figure 9C:
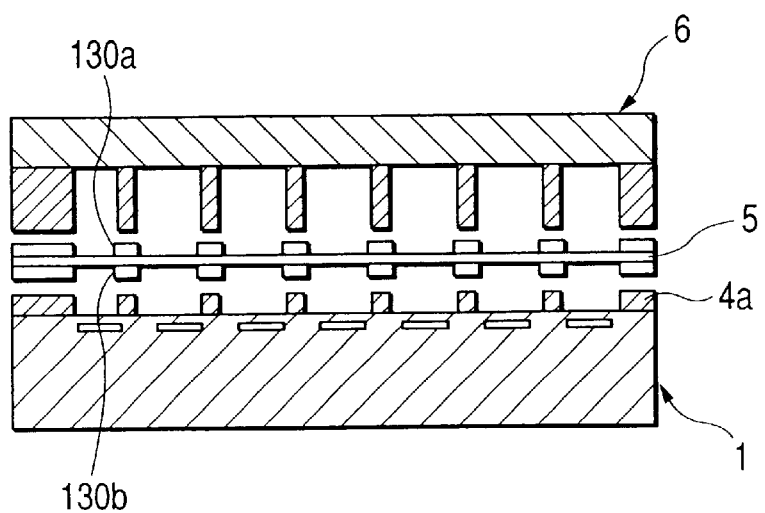

And, as shown in FIG. 9C, the orifice integral type top plate 6 is joined to the substrate with the interposition of the movable separation diaphragm which will be described later. As in the first embodiment, the orifice integral type top plate 6 is manufactured by the processes shown in FIGS. 3A to 3C, and parts of the first liquid passage walls and the first common liquid chamber frame are formed from the SiN film. Further, as in the first embodiment, the joining of the substrate and the top plate and the movable separation diaphragm can be effected by room temperature joining.

Thereafter, as in the first embodiment, the head is completed by working the orifice portions (FIGS. 5A to 5C).

In the manufacturing method according to the illustrated embodiment, as shown in FIG. 4C, since the movable separation diaphragm is handled together with the joining members, as in the first embodiment, it is not required that the movable diaphragm be handled as a single piece. Now, a method for manufacturing the separation diaphragm having the joining members which is a characteristic of the illustrated embodiment will be fully explained with reference to FIGS. 10A to 10D.

Figure 10A:
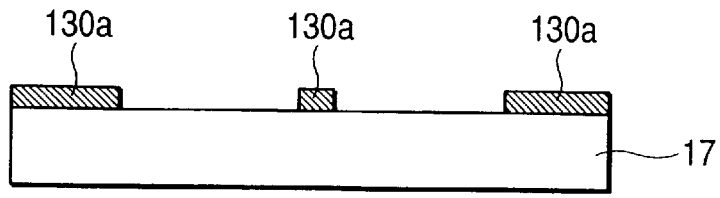
FIGS. 10A, 10B, 10C and 10D are schematic sectional views for explaining a method for manufacturing a separation diaphragm with abutting portions of the liquid discharge head according to the second embodiment of the present invention.

First of all, as shown in FIG. 10A, an SiN film having a thickness of about 3 $\mu$m (defining the joining member 130a constituting the joining portion to the orifice integral type top plate 6) is formed on a silicone wafer 17 by using the $\mu$W-CVD method. And, etching is effected by using a known technique such as photolithography so as to leave only the required portions.

Figure 10B:
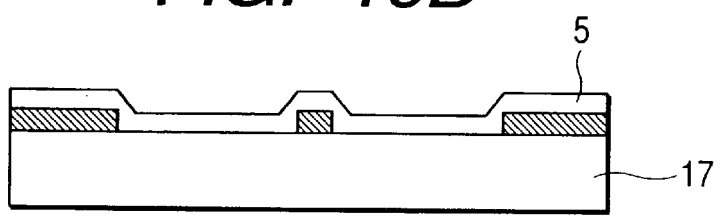

Then, as shown in FIG. 10B, a film of polyparaxylirene having a thickness of about 5 $\mu$m is formed as the movable separation diaphragm 5 by a vapor-phase deposition polymerization method. The fundamental structure, manufacturing method and polymerization of polyparaxylirene used in the present invention are disclosed in U.S. Pat. No. 3,379,803 and Japanese Patent Publication Nos. 44-21353 and 52-37479.

Figure 10C:
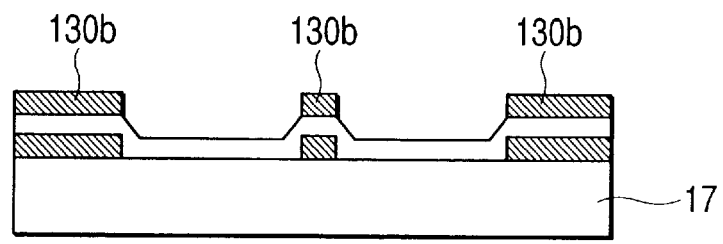

Then, as shown in FIG. 10C, an SiN film having a thickness of about 2 $\mu$m (defining the joining member 130b constituting the joining portion to the liquid discharge head substrate 1) is formed by using the $\mu$W-CVD method. And, etching is effected by using a known technique such as photolithography so as to leave only the required portions.

Figure 10D:

Lastly, as shown in FIG. 10D, the silicone wafer 17 is removed by an etching method using chemical mechanical polishing (CMP) or TMAH. Alternatively, the silicone wafer may be removed by exposing the substrate to $XeF_2$ gas.

Figure 11E:
Figure 12A:
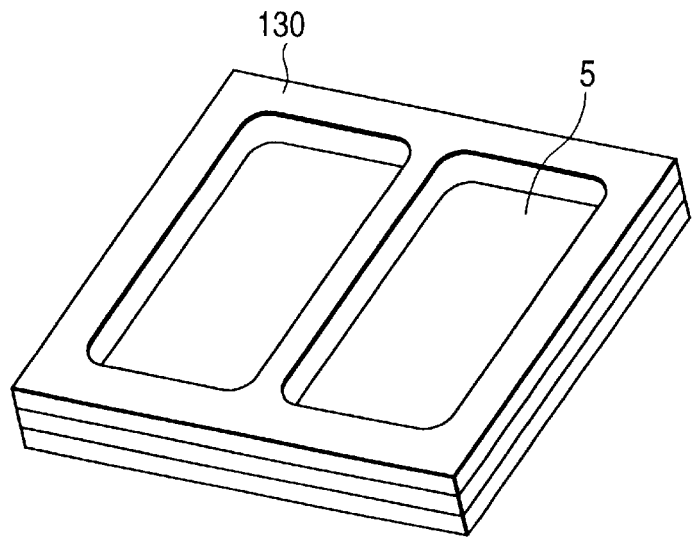
FIG. 12A is a perspective view of a separation diaphragm integral with abutting portions of the liquid discharge head according to the second embodiment of the present invention.
Figure 12B:
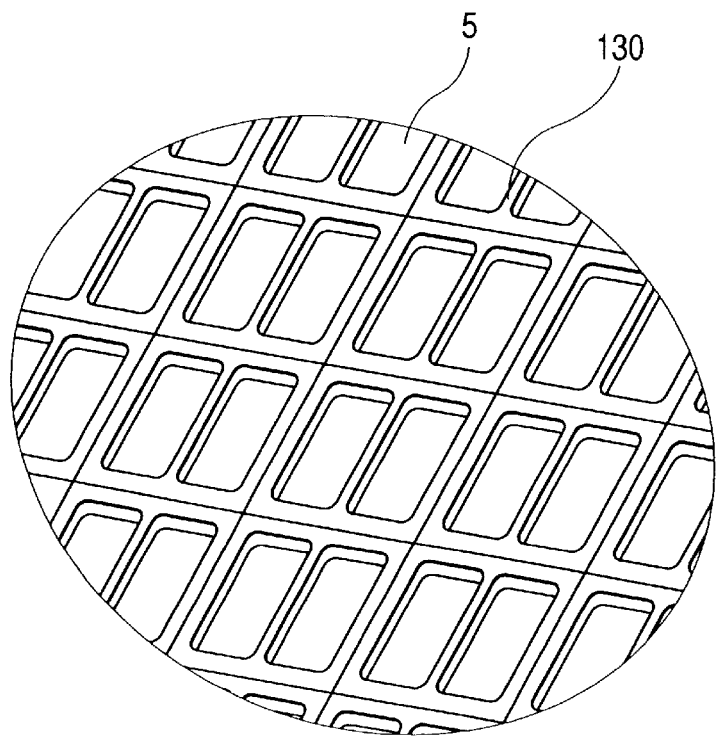
FIG. 12B is a schematic view showing a condition that a plurality of separation diaphragms integral with abutting portions are formed on a silicone wafer to obtain a plurality of diaphragms at once.

FIG. 12A is a perspective view of the separation diaphragm having the joining members integrally formed therewith manufactured by the above processes. FIG. 12B is a view of the separation diaphragm having the joining members integrally formed therewith of FIG. 10D or FIG. 11E, looked at from below. In the illustrated embodiment, by providing the joining members on the movable diaphragm, in the manufacture, when the movable diaphragm is handled, adequate strength or rigidity is ensured, thereby preventing the damage of the movable diaphragm and permitting easy and correct alignment during the assembling. Further, since the fixed end portions of the diaphragm (during the deformation of the diaphragm) can surely act as the fixed ends without the joining to the top plate and the substrate and the fixed end portions can be manufactured with high accuracy, dispersion from part to part and dispersion depending upon use conditions can be avoided, thereby providing a liquid discharge head having stable discharging ability and capable of a highly fine image, and the nozzles can easily be arranged with high density.

In the illustrated embodiment, by providing the upper and lower joining members as the frame, the handling ability in the manufacture is enhanced, and, by covering the deformable portions of the movable diaphragm by the joining members (i.e., as shown in FIG. 12A, the joining members have closed openings) to clearly define the fixed ends of the diaphragm, the diaphragm is clearly divided into the movable portions and the fixed portions, thereby achieving the excellent effect.

Further, in the illustrated embodiment, since the silicone wafer is used as a tool for manufacturing the joining members and the movable separation diaphragm, these parts can be manufactured under a high temperature condition, and, since the thin film forming technique is used, the parts can be manufactured with high accuracy under a clean environment without creating any pinhole. Further, as shown in FIG. 12B, a plurality of separation diaphragms having joining members formed integrally therewith shown in FIG. 12A may be formed on the silicone wafer to obtain the plurality diaphragms at once. In this case, although the article must be cut in correspondence to the head, a large number of diaphragms having movable portions and fixed portions with high accuracy can be manufactured at a time.

Figure 11A:
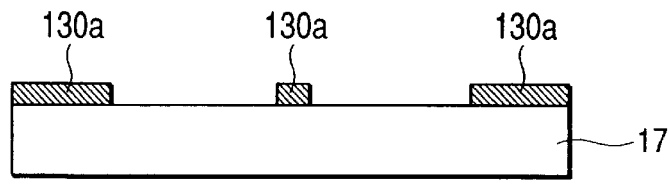
FIGS. 11A, 11B, 11C, 11D and 11E are schematic sectional views for explaining another method for manufacturing a separation diaphragm with abutting portions of the liquid discharge head according to the second embodiment of the present invention.
Figure 11B:
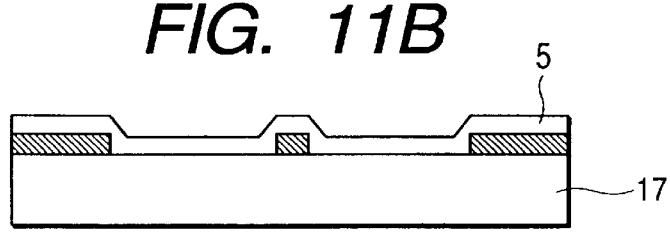
Figure 11C:
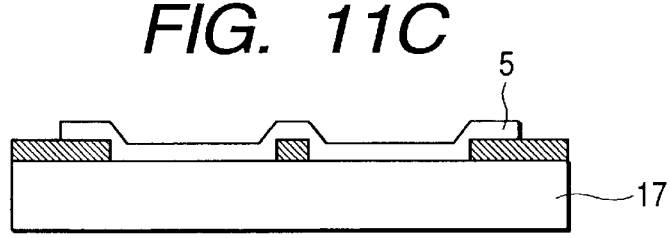
Figure 11D:
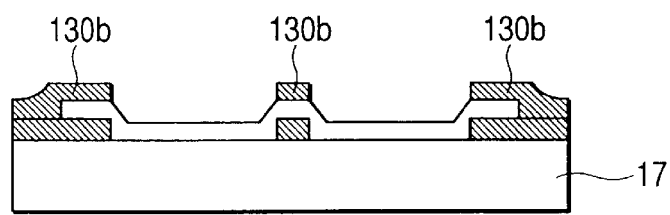

Incidentally, in place of the processes shown in FIGS. 10A to 10D, as shown in FIG. 11C, after both ends of the movable separation diaphragm 5, the SiN film constituting the joining member 130b defining the joined portion to the liquid discharge head substrate 1 may be formed. According to this method (processes corresponding to FIGS. 10A and 10B are shown in FIGS. 11A and 11B, and processes corresponding to FIGS. 10C and 10D are shown in FIGS. 11D and 11E), since the joining members 130a and 130b made of the same material can be joined, the movable separation diaphragm can be positively held by the joining members from both sides, and, when a plurality of movable separation diaphragms with the joining members are formed on the silicone wafer collectively and the article is cut in accordance with the head, since the joining members joined together rather than the diaphragm itself are cut, the cutting process can be effected accurately at a high speed, and the influence of the cutting apparatus can be reduced and dispersion from part to part can be reduced.

Next, a liquid discharging operation of the liquid discharge head according to the illustrated embodiment will be explained with reference to FIGS. 13A to 13E and 14A to 14D.

FIGS. 13A to 13E are explanatory views for explaining the liquid discharging operation of the liquid discharge head according to the second embodiment. In FIGS. 13A to 13E, as in the second embodiment shown in FIG. 7, a second liquid passage 504 for the bubbling liquid is provided on a substrate 510 on which a heat generating member 502 (in this embodiment, a heat generating resistance body having dimension of 40 $\mu$m×105 $\mu$m) for generating thermal energy for creating a bubble in the liquid, and a first liquid passage 503 directly communicated with a discharge port 501. Further, a movable separation diaphragm 505 formed from a thin film made of inorganic material having elasticity is disposed between the first liquid passage 503 and the second liquid passage 504, so that discharge liquid in the first liquid passage 503 is isolated from bubbling liquid in the second liquid passage 504.

As the characteristic of this embodiment, at a side of the movable separation diaphragm 505 facing the first liquid passage 503, the deformation of the movable separation diaphragm 505 is limited by a joining member 531 joined to liquid passage walls of the first liquid passage. The joining member can be manufactured integrally with the movable separation diaphragm by using the above-mentioned method. In this case, in the processes for forming the movable separation diaphragm with the joining members explained in connection with FIGS. 10A to 10D, after the movable separation diaphragm is firstly formed on the Si wafer, the joining members may be formed. Even when the joining members (movable diaphragm deformation regulating member) are formed after the movable diaphragm was firstly formed, the same handling ability of the diaphragm as that in the manufacturing method according to the second embodiment can be obtained. Incidentally, as a method for manufacturing the joining members in an inverted taper manner, a metal film having the same dimension as the movable diaphragm is formed as an etching stop layer, and the joining members can be formed by over etching by using a dry etching process.

Figure 13A:
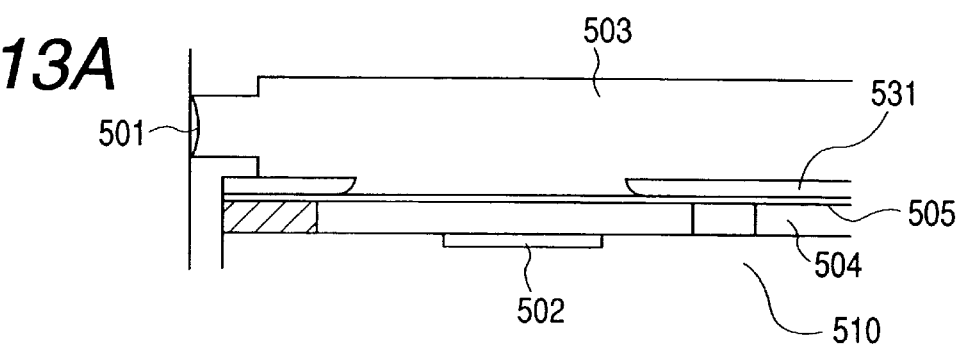
FIGS. 13A, 13B, 13C, 13D and 13E are explanatory views for explaining an operation of the liquid discharge head according to the second embodiment of the present invention.

In FIG. 13A, energy such as electrical energy is not applied to the heat generating member 502, so that heat is not generated from the heat generating member 502. Incidentally, the movable separation diaphragm 505 is located at a first position substantially parallel with the substrate 501.

It is important that a center of the opening of the joining member 531 is located at a downstream side of a center of the heat generating member 502, so that a center of the movable area of the movable separation diaphragm 505 is positioned at a downstream side of the center of the heat generating member 502.

Figure 13B:
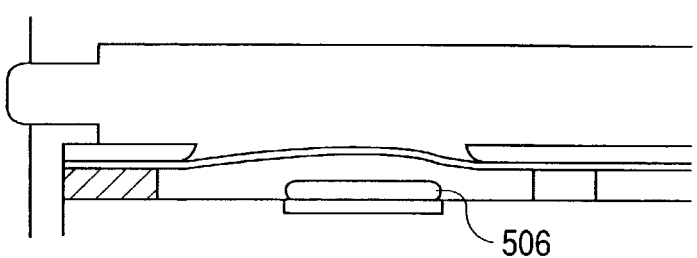

As shown in FIG. 13B, when the electrical energy is applied to the heat generating member 502, a part of the bubbling liquid in a bubble generating area is heated by heat generated from the heat generating member 502, thereby creating a bubble 506 by film boiling. Since the center of the movable area of the movable separation diaphragm 505 is positioned at a downstream side of the center of the heat generating member 502, the movable separation diaphragm 505 is apt to be deformed at the downstream side of the heat generating member 502 by pressure of the bubble 506.

Figure 13C:
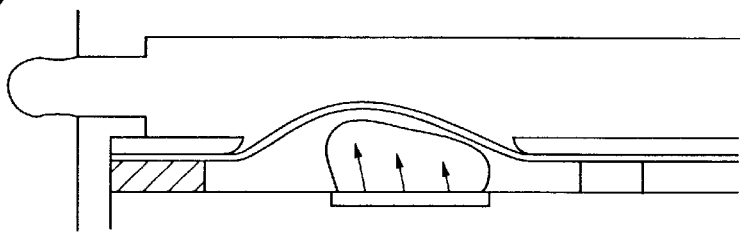

When the bubble 506 is further grown, as shown in FIG. 13C, in dependence upon the pressure of the growing bubble, the movable separation diaphragm 505 is further displaced toward the first liquid passage 503. Consequently, the generated bubble 506 is grown more greatly at the downstream side than the upstream side, with the result that the movable separation diaphragm 505 is greatly displaced from the first position.

Figure 13D:
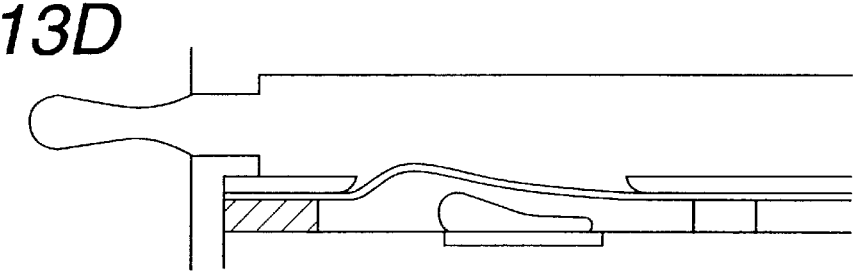

Thereafter, as shown in FIG. 13D, when the bubble 506 is contracted by reduction in pressure in the bubble which is a characteristic of the film boiling phenomenon, the movable separation diaphragm 505 which was displaced to a second position gradually returns toward the initial position (first position) shown in FIG. 13A by negative pressure caused by contraction of the bubble 506.

Figure 13E:
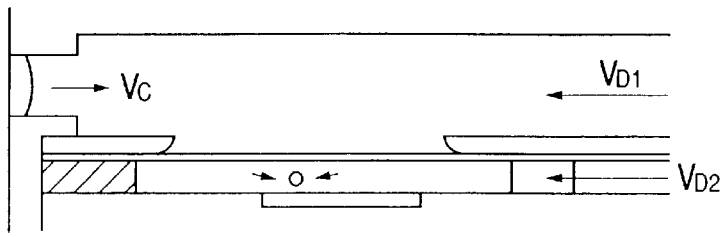

When the bubble 506 disappears, as shown in FIG. 13E, the movable separation diaphragm 505 returns to the initial position (first position). Further, when the bubble disappears, in order to compensate for the loss of volume of the liquid, the liquid flows in from the upstream side, i.e., from the common liquid chamber (as shown by the arrows $V_{D1}$, $V_{D2}$) and from the discharge port 501 (as shown by the arrow $V_C$). In this case, during the growth of the bubble, since the liquid flows toward the downstream side (toward the discharge port), the flows $V_{D1}$, $V_{D2}$ become great, the re-fill speed is improved and a retard amount of meniscus can be suppressed.

In the illustrated embodiment, at the opening of the joining member 531, as shown in FIGS. 13A to 13E, the joining member is chamfered to prevent concentration of stress in the movable separation diaphragm 505 at the edge of the joining member, thereby reducing deterioration in strength and improving endurance.

Now, the construction of the liquid discharge head according to the second embodiment will be described.

FIGS. 14A to 14D are views showing a positional relation between the heat generating member 502 and the second liquid passage 504 and the joining member 531, where FIG.

14A is a view showing a positional relation between the heat generating member 502 and the second liquid passage 504, FIG. 14B is a view showing the joining member 531 looked at from the above, FIG. 14C is a view showing a positional relation between the heat generating member 502 and the second liquid passage 504 and the joining member 531, and FIG. 14D is a view in which an upward deformable area and a downward deformable area of the movable separation diaphragm 505 are indicated by different hatched zones; in these Figures, the discharge port is located at the left.

As shown in FIG. 14D, in the illustrated embodiment, a portion surrounded by the walls of the second liquid passage 504 corresponds to the downward deformable area of the movable separation diaphragm 505 and a portion within the opening of the joining member 531 corresponds to the upward deformable area of the movable separation diaphragm 505, and the center of the movable area of the movable separation diaphragm 505 is located at a downstream side of the center of the heat generating member 502.

In this altered embodiment, by providing a single joining member, during the upward deformation and downward deformation, the deformable areas are differentiated; however, as in the second embodiment, when the upper and lower joining members are provided, by differentiating the openings of the upper and lower joining members (more specifically, the opening of lower joining member facing the second liquid passages is made greater than the opening of the upper joining member facing the first liquid passages), the deformable areas may be differentiated.

Incidentally, as shown in FIG. 14B, in the opening of the joining member 531, by providing "R" at four corners, the movable separation diaphragm 505 can be prevented from being broken and the endurance of the diaphragm can be improved.

As mentioned above, with the arrangement according to the illustrated embodiment, since the movable separation diaphragm deformed by the increased force due to the growth of the bubble is deformed toward the downstream side by positioning the center of the movable area of the movable separation diaphragm at the center of the heat generating member, liquid weak to heat or high viscous liquid can be efficiently discharged with high pressure. Further, due to the transporting action of the liquid in the first liquid passage, the discharge amount can be increased.

Third Embodiment

Figure 15:
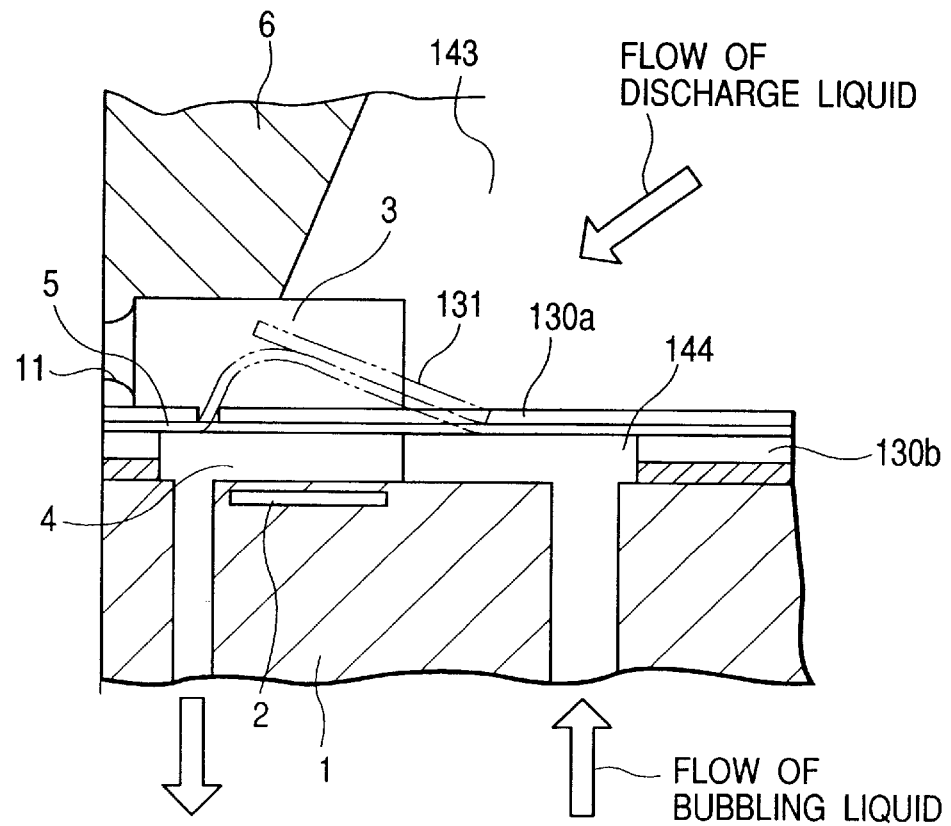
FIG. 15 is a sectional view of a liquid discharge head according to a third embodiment of the present invention, taken along a direction of a liquid passage.
Figure 16:
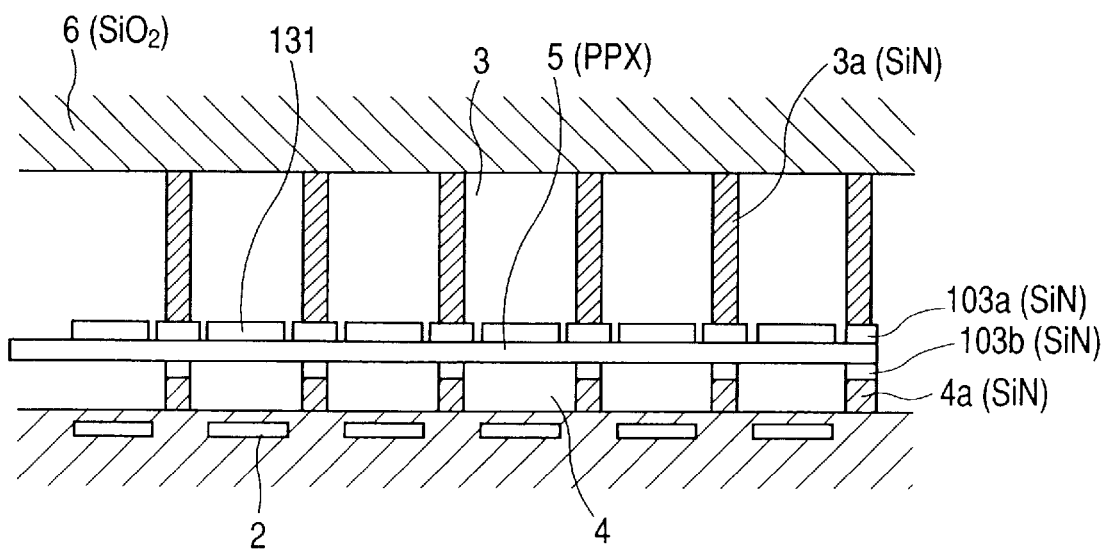
FIG. 16 is a sectional view of the liquid discharge head of FIG. 15, taken along a direction perpendicular to the plurality of liquid passages.

FIG. 15 is a sectional view of a liquid discharge head according to a third embodiment of the present invention, taken along a direction of a liquid passage, and FIG. 16 is a sectional view of the liquid discharge head of FIG. 15, taken along a direction perpendicular to the plurality of liquid passages.

The liquid discharge head according to this embodiment differs from that of the second embodiment in the point that a movable member 131 made of the same material as that of a joining member 130 is disposed on a separation diaphragm 5. Further, in this embodiment, as in the second embodiment, the liquid passage walls 3a for defining the first liquid passages (side walls of the first liquid passages) are extended up to the first common liquid chamber 143 at the upstream side of the rear ends of the heat generating resistance bodies 2, and there is no upper wall there.

With this arrangement, as in the second embodiment, when the bubble is growing in the bubble generating area between the movable separation diaphragm 5 and the heat generating resistance element 2, the flow of liquid toward the upstream and adjacent nozzles is blocked or suppressed by the movable separation diaphragm 5 (and the movable member 131) and the liquid passage walls 3a (due to deformation of the movable separation diaphragm 5 and the movable member 131), thereby suppressing shifting of the liquid in the upstream direction. As a result, a retard amount of meniscus during contraction of bubble can be reduced. Consequently, while the bubble is disappearing, a retard amount of meniscus is reduced. Further, due to the feature of the movable separation diaphragm itself, the deformation is stopped on the way, with the result that, during the growth of the bubble, the shifting of the liquid upstream and toward adjacent nozzles can effectively be suppressed.

Regarding the manufacturing method according to the illustrated embodiment, in the manufacturing process of the movable separation diaphragm, the diaphragm can be manufactured in the same manner as the second embodiment, except that the joining members and the movable member are integrally formed with each other. Now, the manufacturing process of the movable separation diaphragm will be briefly described with reference to FIGS. 17A to 17D.

Figure 17A:
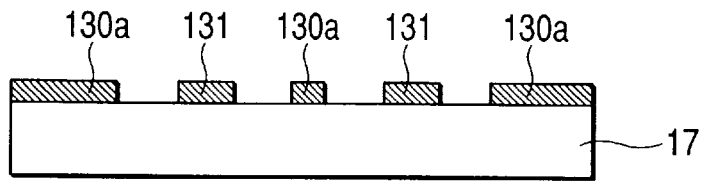
FIGS. 17A, 17B, 17C and 17D are schematic sectional views for explaining a method for manufacturing a separation diaphragm integral with abutting portions of the liquid discharge head according to the third embodiment of the present invention.

First of all, as shown in FIG. 17A, an SiN film having a thickness of about 3 $\mu$m (defining the joining member 130a constituting the portion to be joined to the orifice integral type top plate 6 and the movable member 131) is formed on a silicone wafer 17 by using the $\mu$W-CVD method. And, etching is effected by using a known technique such as photolithography so as to leave only the required portions.

Figure 17B:
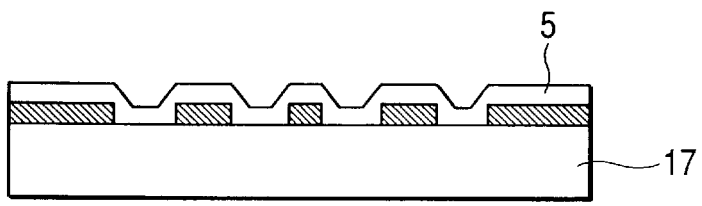
Figure 17C:
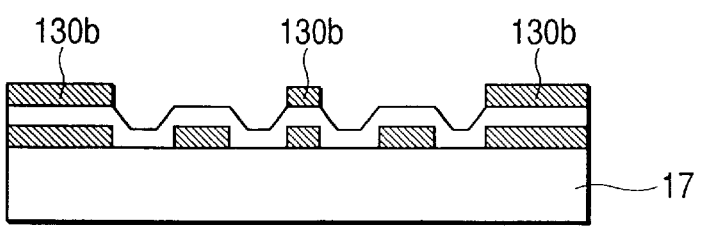
Figure 17D:

Further processes are the same as those in the second embodiment; as shown in FIG. 17B, a film of polyparaxylirene is formed as the movable separation diaphragm 5, and, then, as shown in FIG. 17C, an SiN film defining the joining member 130b constituting the portion to be joined to the liquid discharge head substrate 1 is formed. And, etching is effected by using a known technique such as photolithography so as to leave only the required portions, and thereafter, as shown in FIG. 17D, the silicone substrate 17 is removed.

Figure 18A:
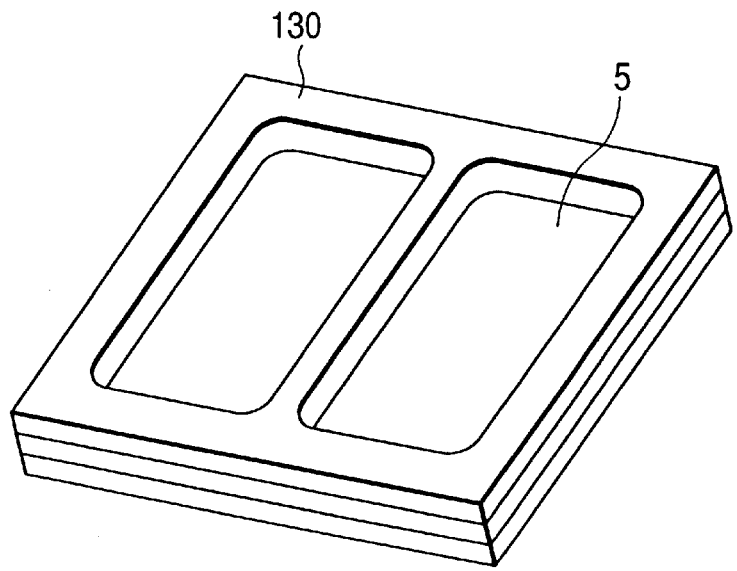
FIGS. 18A and 18B are perspective view of the separation diaphragm integral with abutting portions of the liquid discharge head according to the third embodiment of the present invention.
Figure 18B:
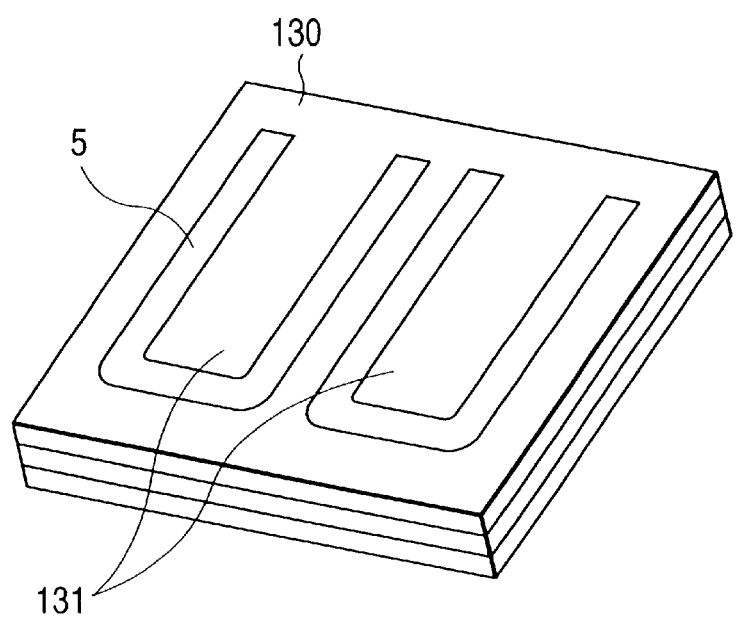

Incidentally, FIGS. 18A and 18B are perspective views of the separation diaphragm having the movable member formed integrally therewith (movable member integral type separation diaphragm), where FIG. 18A is a view of the movable member integral type separation diaphragm looked at from above, and FIG. 18B is a view of the movable member integral type separation diaphragm looked at from below. Also in this embodiment, in the manufacturing method, the same effect as the second embodiment can be achieved. Accordingly, a plurality of diaphragms may be formed on the silicone wafer to obtain the plurality of diaphragms at once.

Figure 19A:
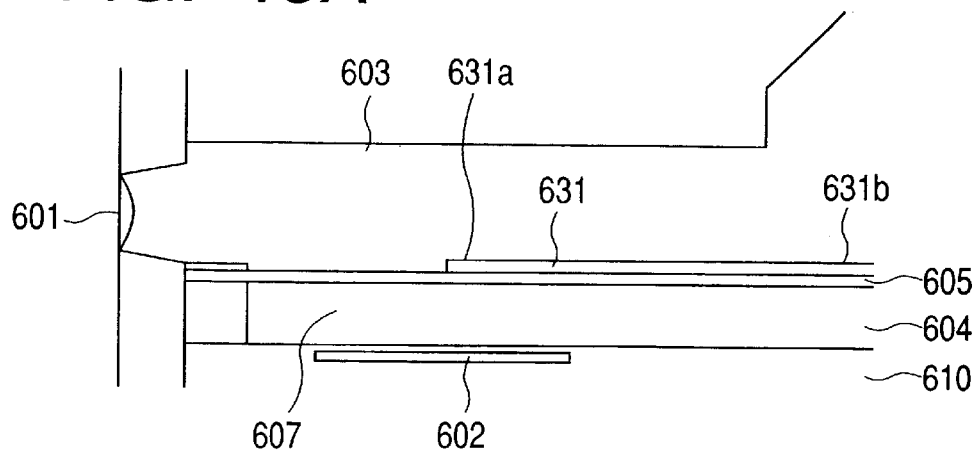
FIGS. 19A, 19B and 19C are explanatory views for explaining an operation of the liquid discharge head according to the third embodiment of the present invention.
Figure 19B:
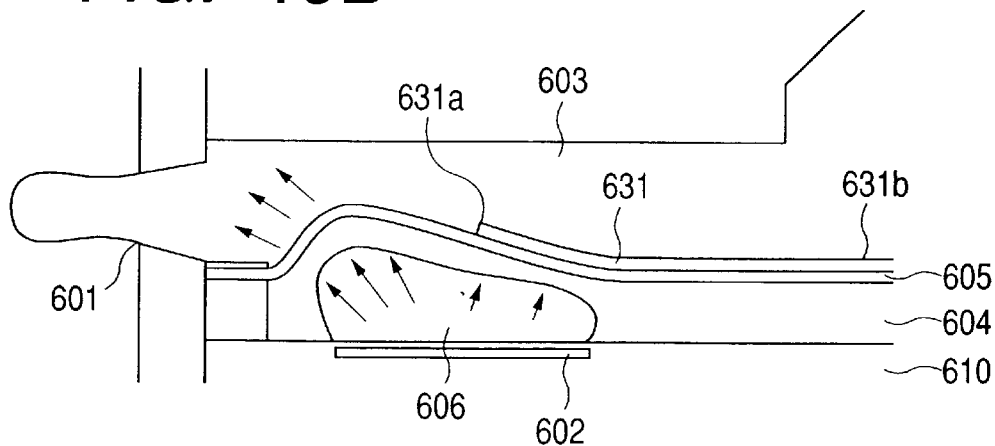
Figure 19C:
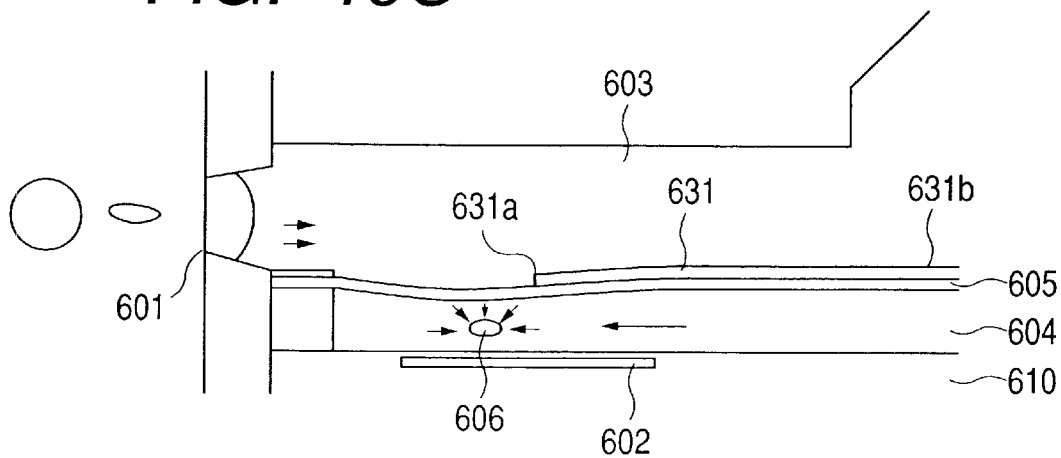

Next, a liquid discharging operation of the liquid discharge head according to the illustrated embodiment will be explained with reference to FIGS. 19A to 19C. FIG. 19A shows a non-bubbling condition, FIG. 19B shows a bubbling (discharging) condition, and FIG. 19C shows a bubble disappearing condition. In these Figures, the joining members are omitted from the illustrations.

As shown in FIG. 19A, in the illustrated embodiment, a second liquid passage 604 for the bubbling liquid is provided on a substrate 610 on which a heat generating member 602 (in this embodiment, a heat generating resistance body having dimension of 40 $\mu$m×105 $\mu$m) for generating thermal energy for creating a bubble in the liquid, and a first liquid passage 603 directly communicated with a discharge port 601 is provided on the second liquid passage. Further, a movable separation diaphragm 605 formed from a thin film made of inorganic material having elasticity is disposed between the first liquid passage 603 and the second liquid passage 604, so that discharge liquid in the first liquid passage 603 is isolated from bubbling liquid in the second liquid passage 604 by the movable separation diaphragm 605. Incidentally, the movable separation diaphragm 605 is disposed facing the heat generating member 602 and is opposed to at least a part of a bubble generating area 607 where a bubble is created by heat from the heat generating member 602. Further, at a side of the movable separation diaphragm 605 facing to the first liquid passage 603, a movable member 631 having a free end 631a disposed above the bubble generating area 607 and a fulcrum 631b at an upstream side of the free end 631a is arranged adjacent to the movable separation diaphragm 605.

Incidentally, regarding the free end 631a of the movable member 631, even when the free end is not disposed opposed to the bubble generating area 607, so long as the free end is disposed at a downstream side of the fulcrum 631b to direct the deformation of the movable separation diaphragm 605 toward the discharge port 601 (more preferably, the free end is opposed to at least a part of the heat generating member 602 with the interposition of the movable separation diaphragm 605), the displacement of the movable separation diaphragm 605 can be controlled effectively. Particularly when the movable member 631 is disposed opposed to the movable separation diaphragm 605 so that the free end 631 a is located at a downstream side of the center of the heat generating member 602 or the bubble generating area 607, since the movable member 631 can concentrate components tending to expand in a direction perpendicular to the heat generating member 602 toward the discharge port 601, the discharging efficiency is remarkably increased. Further, even if the free end 631a is located at the downstream side of the bubble generating area 607, by displacing the free end 631a greatly to displace the movable separation diaphragm 605 toward the discharge port 601 greatly, the discharging efficiency is enhanced.

When the heat is emitted from the heat generating member 602, a bubble 606 is created in the bubble generating area 607 on the heat generating member 602 to displace the movable separation diaphragm 605 toward the first liquid passage 603. However, the displacement of the movable separation diaphragm 605 is regulated by the movable member 631. In the movable member 631, since the free end 631a is disposed above the bubble generating area 607 and the fulcrum is located at the upstream side of the free end, the movable separation diaphragm 605 is displaced more greatly toward the downstream side than the upstream side (FIG. 19B).

That is to say, a desired deformation and displacement can be obtained stably by a direction regulating means for regulating a direction along which the movable separation diaphragm 605 is displaced.

In this way, as the bubble 606 is growing, the downstream portion of the movable separation diaphragm 605 is displaced greatly, with the result that the growth of the bubble 606 is mainly transmitted toward the discharge port 601, thereby discharging the discharge liquid in the first liquid passage 603 from the discharge port 601 efficiently.

Thereafter, when the bubble 606 is contracted, the movable separation diaphragm 605 is returned toward the initial non-deformed position. In this case, the movable separation diaphragm 605 will be displaced toward the second liquid passage 604 from the non-deformed position due to the pressure of the contracted bubble. However, in the illustrated embodiment, since the movable separation diaphragm 605 is integral with the movable member 631, the displacement of the movable separation diaphragm 605 toward the second liquid passage 604 can be suppressed (FIG. 19C).

Thus, the reduction in pressure in the first liquid passage 603 is suppressed to suppress the retard amount of meniscus, thereby improving the re-fill feature.

Further, the shifting of the liquid toward the upstream side is suppressed by the movable member 631, thereby improving the re-fill feature and reducing the cross-talk.

As mentioned above, according to the illustrated embodiment, the discharge liquid and the bubbling liquid are provided independently, and only the discharge liquid can be discharged. Thus, even regarding a highly viscous liquid such as polyethylene glycol in which the bubble would not be adequately created by heat, resulting in poor discharging, by supplying this liquid to the first liquid passage 603 and by supplying liquid (mixed liquid of about 1–2 cp having ethanol:water=4:6) which can easily create the bubble to the second liquid passage 604 as the bubbling liquid, good discharging can be achieved.

Further, by selecting liquid which does not create deposition of rubber on the heat generating member by heat as the bubbling liquid, the generation of the bubble can be stabilized and good discharging can be achieved.

In the liquid discharge head according to the present invention, since the effect as described in the above-mentioned embodiments can be obtained, liquid such as highly viscous liquid can be discharged with high discharging efficiency and with high discharging force.

Further, even when liquid having low heat resistance is used, so long as this liquid is supplied to the first liquid passage 603 as the discharge liquid and liquid having high heat resistance and which can create a bubble easily is supplied to the second liquid passage 604, the liquid having low heat resistance is not subjected to thermal deterioration, and the liquid can be discharged with higher discharging efficiency and with higher discharging force.

In the illustrated embodiment, with the arrangement in which the movable separation diaphragm 605 having the movable member 631 formed integrally therewith, the liquid can be discharged at higher speed with higher discharging force and higher discharging efficiency than the conventional liquid discharging apparatuses. A bubbling liquid having the above-mentioned feature may be used; more specifically, the bubbling liquid may be methanol, ethanol, n-propanol, isopropanol, n-xane, n-heptane, n-octane, toluene, xylene, methylene dichloride, trichlene, fleone TF, fleone BF, ethyl ether, dioxiane, cyclohexane, methyl acetate, ethyl acetate, acetone, methyl ethyl ketone, water or mixtures thereof.

As the discharge liquid, various liquids may be used regardless of the presence/absence of bubbling ability and thermal properties. Further, even liquid having poor bubbling ability, liquid which deteriorated and is degraded by heat or highly viscous liquid which were conventionally hard to be discharged can be used.

However, it is desired that, as the property of the discharge liquid, liquids itself and the reaction to the bubbling liquid, which does not prevent the discharging and bubbling and operations of the movable separation diaphragm and the movable member should be selected.

As recording discharge liquid, highly viscous ink can be used.

As other discharge liquids, liquids such as medical liquid or perfume which has low heat resistance can be used.

Bubbling liquid and discharge liquid having the following compositions are used for effecting the recording. As a result, liquid having a high viscosity of 150 cp, as well as liquid having a viscosity of ten-odd cp, which was hard to be discharged, can be discharged effectively, thereby obtaining a high quality image.

| Composition of bubbling liquid 1: | |
|---|---|
| ethanol | 40 wt % |
| water | 60 wt % |
| Composition of bubbling liquid 2: | |
| water | 100 wt % |
| Composition of bubbling liquid 3: | |
| isopropyl alcohol | 10 wt % |
| water | 90 wt % |
| Composition of discharge liquid 1 (pigment ink) (viscosity: about 15 cps): | |
| carbon black | 5 wt % |
| styrene-acrylic acid-acrylic acid ethyl copolymer (oxidation 140, weight average molecular weight 8000) | 1 wt % |
| mono-ethanol amine | 0.25 wt % |
| glycerol | 69 wt % |
| thio digsocol | 5 wt % |
| ethanol | 3 wt % |
| water | 16.75 wt % |
| Composition of discharge liquid 2: (viscosity: 55 cps) | |
| polyethylene glycol 200 | 100 wt % |
| Composition of discharge liquid 3: (viscosity: 150 cps) | |
| polyethylene glycol 600 | 100 wt % |

By the way, in case of the liquid which was conventionally considered difficult to discharged, since the discharging speed is slow, dispersion in discharging direction was promoted and shot accuracy of liquid dots onto a recording sheet was worsened and there was dispersion in the discharging amount due to unstable discharging, with the result that it was difficult to obtain a high quality image. However, with the arrangement according to the illustrated embodiment, generation of bubbles can be achieved sufficiently and stably by using the bubbling liquid. Thus, the shot accuracy of the liquid droplets can be improved and the ink discharge amount can be stabilized, thereby improving the quality of the recorded image remarkably.

Fourth Embodiment

In the manufacturing methods according to the second and third embodiments, when the movable separation diaphragm is formed on the Si wafer, the joining members of the movable diaphragm was firstly formed and then the movable diaphragm was formed. However, the joining member as the frame may be provided on one surface of the diaphragm rather than both surfaces, and the movable separation diaphragm may be firstly formed on the Si wafer. Even when the movable diaphragm is firstly formed and then the joining member (and, if necessary, a cantilever movable member) is formed, the same advantage such as good handling ability of the diaphragm, as in the second and third embodiments, can be achieved.

Further, by utilizing the above-mentioned manufacturing methods, the handling can be effected in a condition that the top plate and the movable diaphragm are integral with each other. Thus, as a fourth embodiment of the present invention, a manufacturing method in which the handling is effected in the condition that the top plate and the movable diaphragm are integral with each other will be explained with reference to FIGS. 20A1 to 20D2. FIGS. 20A1 to 20D2 are explanatory views for explaining processes for manufacturing a liquid discharge head in which a top plate and a separation diaphragm are integrally manufactured in a sequence from FIGS. 20A1 to 20D2, where FIGS. 20A1, 20B1, 20C1 and 20D1 are perspective views, and FIGS. 20A2, 20B2, 20C2 and 20D2 are sectional views taken along a direction perpendicular to a plurality of liquid passages.

First of all, as shown in FIGS. 20A1 and 20A2, a polyparaxylilene film is formed on a silicone wafer 17 as a movable separation diaphragm 5.

Then, as shown in FIGS. 20B1 and 20B2, a wall surface for defining orifices, first liquid passages and a common liquid chamber is formed as an SiN film 14, for example, by a $\mu$W-CVD method. And, etching is effected by using a known technique such as photolithography so as to leave only the required portions.

Then, as shown in FIGS. 20C1 and 20C2, a flat plate 6 having a through-hole as a liquid supply opening of the common liquid chamber previously formed by etching is joined to the wall surface 14 defining the liquid passages and the common liquid chamber, thereby forming the top plate integral with the movable diaphragm.

Thereafter, the silicone wafer 17 is removed, and, the assembly is joined to the liquid discharge head substrate 1 (for example, manufactured by the manufacturing method in the second embodiment shown in FIGS. 9A and 9B) having the liquid passage walls (desirably formed from SiN) of the second liquid passages and the heat generating resistance elements 2, thereby joining the top plate and the head substrate together, as shown in FIGS. 20D1 and 20D2. In this case, the movable separation diaphragm and the liquid passage walls 4a constitute the second liquid passages.

Thereafter, by providing the discharge ports in the orifice portions by the laser working in the first embodiment shown in FIGS. 5A to 5C, the liquid discharge head having the movable separation diaphragm can be manufactured.

In case of the liquid discharge head manufacturing method according to the illustrated embodiment, since the liquid passages and the movable separation diaphragm can be formed integrally, there is no positional deviation of the diaphragm with respect to the liquid passages, and, thus, a liquid discharge head having high reliability and no dispersion in discharging ability from part to part can be provided.

Other Embodiments

As mentioned above, while the present invention was explained with respect to main embodiments, hereinbelow, other embodiments and alterations which can be applied to the embodiments of the present invention will be explained. Incidentally, in the following explanations, examples can be applied to the above-mentioned embodiments, except for special limitations.

<Construction of Element Substrate>

Figure 21:
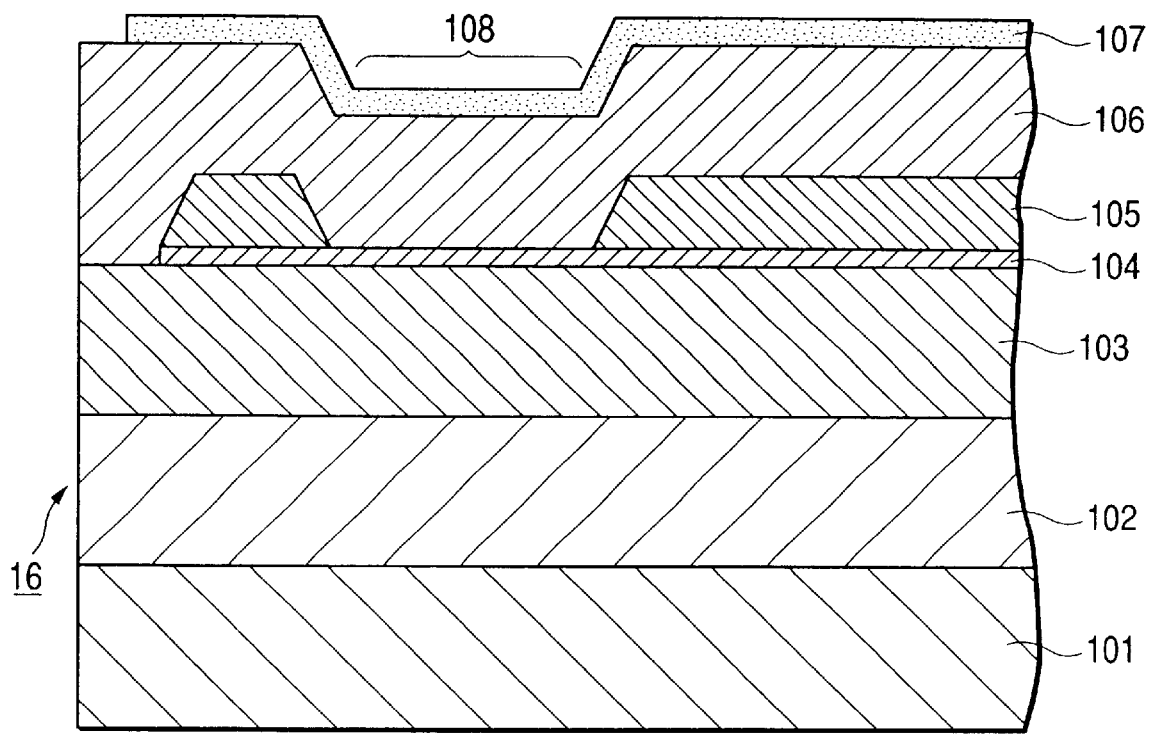
FIG. 21 is a sectional view showing an example of a portion corresponding to a heat generating element portion (bubble generating area) of a liquid discharge head substrate according to the present invention.

First of all, the element substrate forming a part of the liquid discharge heads according to the above-mentioned embodiments will be explained. FIG. 21 is a sectional view showing a portion corresponding to a head generating element (bubble generating area) of a liquid discharge head substrate 1. In FIG. 21, the reference numeral 101 denotes a silicone substrate and 102 denotes a heat oxidized film as a heat accumulation layer. The reference numeral 103 denotes an $SiO_2$ or $Si_2N_4$ film as a layer-to-layer film also acting as a heat accumulation layer; 104 denotes a resistance layer; and 106 denotes an $SiO_2$ or $Si_2N_4$ film as a protection layer; and 105 denotes a wiring made of aluminium or aluminium alloy such as Al—Si or Al—Cu. The reference numeral 107 denotes anti-cavitation film for protecting the protection layer 106 from chemical and physical shock caused due to the heating of the resistance layer 104; and 108 denotes a heat acting portion of the resistance layer 104 where an electrode wiring 105 is not formed.

These driving elements are formed on an Si substrate by a semi-conductor technique, and the heat acting portion is further formed on the same substrate.

Figure 22:
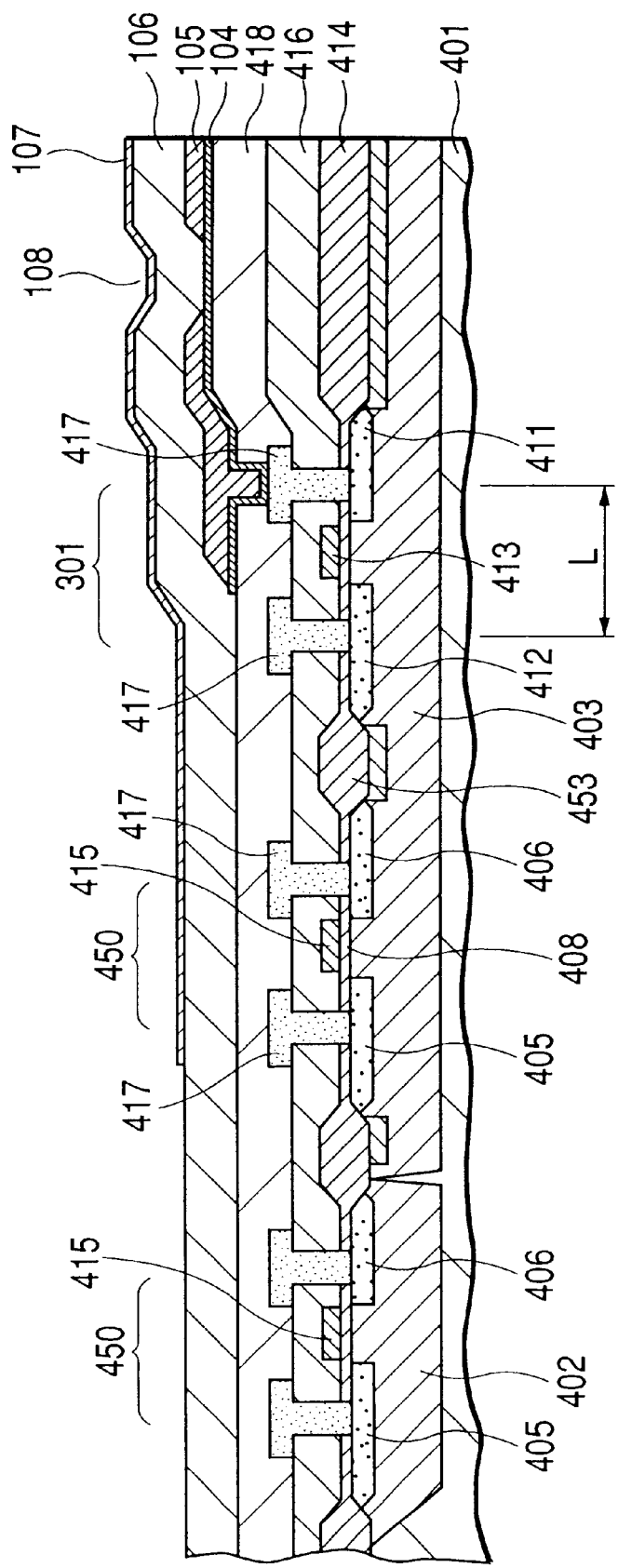
FIG. 22 is a schematic sectional view for explaining an example of a longitudinal section of main elements of the liquid discharge head substrate according to the present invention.

FIG. 22 is a schematic longitudinal sectional view showing the main elements.

P-MOS450 is formed in an N-type well area and N-MOS451 is formed in a P-type well area on an Si substrate 401 made of P conductor by impurity introduction and diffusion such as ion platation by using a general MOS process. The P-MOS450 and N-MOS451 are constituted by gate wirings 415 of poly-Si deposited to a thickness of 4000 to 5000 Å by a CVD method through a gate insulation film 408 having a thickness of several hundred Å, and source areas 405 and drain areas 406 into which N-type or P-type impurity is introduced, and C-MOS logic is constituted by the O-MOS and N-MOS.

Further, an element driving N-MOS transistor is constituted by a drain area 411 and a source area 314 in the P-well substrate by the impurity introduction and diffusion process.

Incidentally, in the illustrated embodiment, while an example that the N-MOS transistor is used was explained, so long as a transistor has an ability for driving the plurality of heat generating element independently and a function capable of achieving the above-mentioned fine structure, the transistor is not limited to the N-MOS transistor.

Further, between the elements, oxidized film separation areas 405 having a thickness of 5000–10000 Å are formed by field oxidation to separate the elements from each other. The field oxidized films act as a first heat accumulation layers under the heat acting portion 108.

After the elements are formed, a layer-to-layer insulation film having a thickness of about 7000 Å is formed by depositing PSG film and BPSG film by using the CVD method, and, after being flattened by heat treatment, the wiring is effected by an aluminium electrode 417 as a first wiring layer through a contact hole. Thereafter, a layer-to-layer insulation film 418 such as $SiO_2$ film having a thickness 10000–15000 Å is formed by the plasma CVD method, and, further, a $TaN_{0.8hex}$ as a resistance layer 104 having a thickness of about 100 Å is formed by a DC spattering method through a through-hole. Thereafter, an aluminium electrode as a second wiring layer for wiring to the various elements is formed.

As the protection layer 106, an $Si_3N_4$ film having a thickness of about 10000 Å is formed by the plasma CVD method. As an uppermost layer, the anti-cavitation film 107 made of Ta and having a thickness of about 2500 Å is formed.

<Fundamental Principle of Discharging of Liquid Discharge Head for Improving Liquid Discharging Efficiency>

Next, in the liquid discharge head having the movable separation diaphragm as in the present invention, a fundamental principle of the discharging for further improving the discharging efficiency will be explained with reference to examples.

FIGS. 23A through 23E to 25A through 25C are views for explaining an example of the discharging method of the above-mentioned liquid discharge head. The discharge ports are arranged at end areas of the first liquid passages, and the deformable areas of the movable separation diaphragm which are deformed as the generated bubble is being grown are disposed at an upstream side of the discharge ports (with respect to a flow direction of the liquid in the first liquid passages). Further, the second liquid passages contain the bubbling liquid or are filled with the bubbling liquid (preferably, the bubbling liquid can be loaded, and, more preferably, the bubbling liquid can be shifted), and each has the bubble generating area.

In this example, the bubble generating area is also disposed at the upstream side of the corresponding discharge port with respect to the flowing direction of the discharge liquid. In addition, the separation diaphragm has a movable area having a length longer than each electrothermal converting element, and has a fixed portion between the upstream ends of the electrothermal converting elements and common liquid chamber for the first liquid passages (preferably, at the upstream ends). Accordingly, the substantial movable range of the separation diaphragm can be understood from FIGS. 23A through 23E to 25A through 25C.

The conditions of the movable separation diaphragm shown in these Figures are determined by elasticity and thickness of the separation diaphragm itself or other additional structure.

{First Discharging Principle}

FIGS. 23A to 23E are sectional views (taken along a direction of the liquid passage) for explaining a first discharging method of the liquid discharge head according to the present invention.

In this example, as shown in FIGS. 23A to 23E, a first liquid passage 703 directly communicated with a discharge port 711 is filled with first liquid supplied from a first common liquid chamber 743, and a second liquid passage 704 having a bubble generating area 707 is filled (from a second liquid chamber 744) with bubbling liquid in which a bubble is created by applying thermal energy to the liquid from a heat generating member 702. Incidentally, a movable separation diaphragm 705 for isolating the first liquid passage 703 and the second liquid passage 704 from each other is disposed between the first liquid passage 703 and the second liquid passage 704. Further, the movable separation diaphragm 705 and an orifice plate 709 are closely secured to each other to prevent the mixing of the liquids in the first and second liquid passages.

Normally, when the movable separation diaphragm 705 is displaced by the bubble generated in the bubble generating area, the diaphragm has no specific direction of displacement, or, rather, tends to advance toward the common liquid chamber, having a great degree of freedom regarding displacement.

In this example, the movement of the movable separation diaphragm 705 is considered, and, a means for regulating the direction of displacement of the diaphragm, which means acts on the movable separation diaphragm 705 itself directly or indirectly, so that the displacement (shifting, expansion or elongation) of the movable separation diaphragm 705 caused by the bubble is directed toward the discharge port.

Figure 23A:
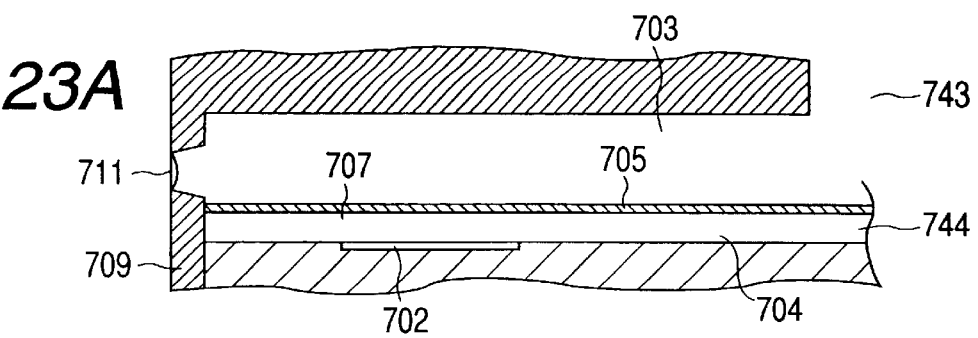
FIGS. 23A, 23B, 23C, 23D and 23E are sectional views for explaining a fundamental discharging pattern to improve discharging efficiency of the liquid discharge head according to the present invention, taken along a direction of the liquid passage.

In an initial condition shown in FIG. 23A, the liquid in the first liquid passage 703 is drawn up to the vicinity of the discharge port 711 by a capillary force. Incidentally, in this example, the discharge port 711 is disposed at a downstream side of a projected area of the heat generating member 702 projected onto the first liquid passage 703 with respect to the liquid flowing direction in the first liquid passage 703.

Figure 23B:
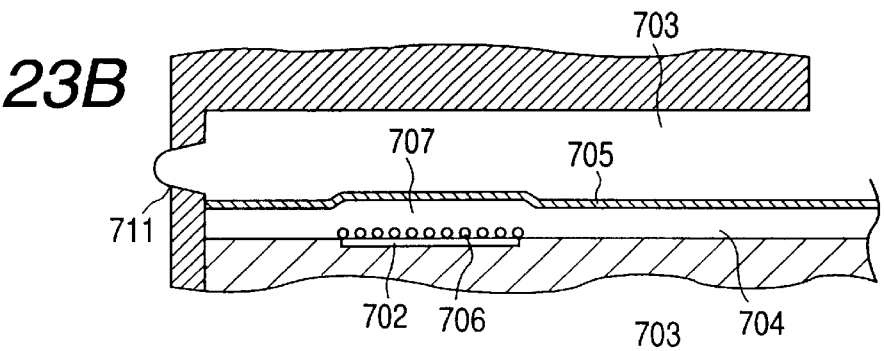

In this condition, when thermal energy is applied to the heat generating member 702 (in this example, heat generating resistance body having dimension of 40 μm×105 μm), the heat generating member 702 is heated quickly, with the result that the second liquid in the bubble generating area 707 is heated to create a bubble 706 (FIG. 23B). The bubble 706 is generated by a film boiling phenomenon disclosed in U.S. Pat. No. 4,723,129 and is created with great high pressure on the entire surface of the heat generating member 702. The pressure generated in this case is propagated through the second liquid in the second liquid passage 704 as a pressure wave and then acts on the movable separation diaphragm 705, with the result that the movable separation diaphragm 705 is displaced to start the discharging of the liquid in the first liquid passage 703.

Figure 23C:
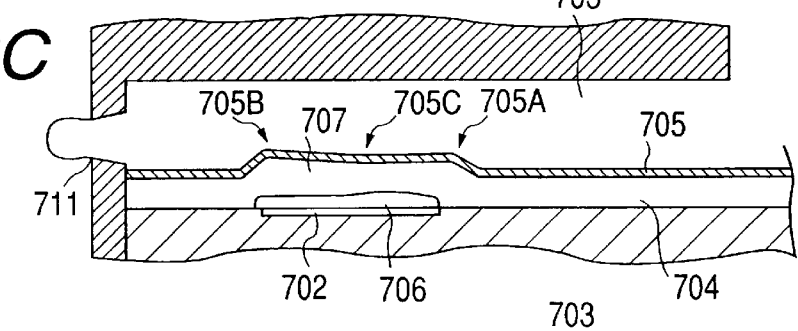

When the bubble 706 created on the entire surface of the heat generating member 702 is grown quickly, the bubble becomes a film shape (FIG. 23C). The expansion of the bubble 706 by the great high pressure in the initial phase of the bubble generation causes the movable separation diaphragm 705 to further displace, with the result that the discharging of the liquid in the first liquid passage 703 from the discharge port 711 is promoted.

Figure 23D:
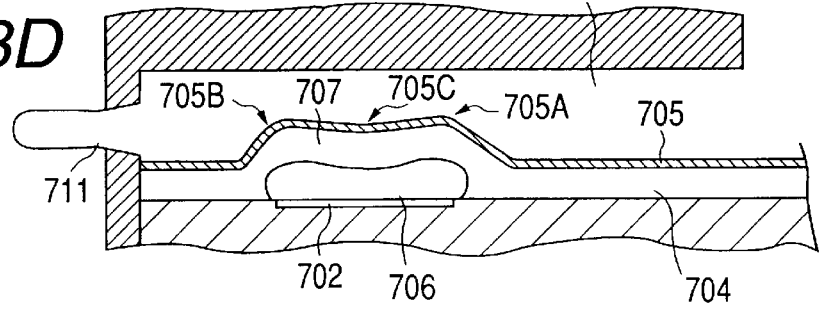

Thereafter, when the bubble 706 is further grown, the displacement of the movable separation diaphragm 705 becomes great (FIG. 23D). Incidentally, up to the condition shown in FIG. 23D, the movable separation diaphragm 705 continues to expanded in such a manner that the displacement of an upstream side 705A of the movable separation diaphragm 705 (with respect to a central portion 705C opposed to the heat generating area 702) becomes substantially equal to a downstream side 705B.

Figure 23E:
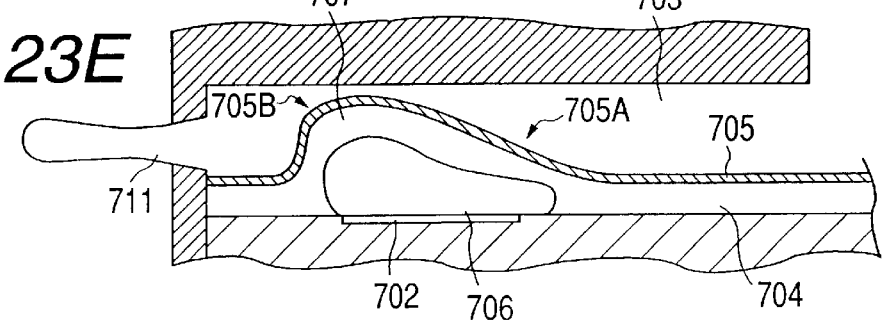

Thereafter, when the bubble 706 is further grown, the bubble 706 and the movable separation diaphragm 705 continuing the displacement are displaced toward the discharge port (displacement of the downstream side 705B becomes greater than that of the upstream side 705A), with the result that the first liquid in the first liquid passage 703 is directly shifted toward the discharge port 711 (FIG. 23E).

In this way, since the movable separation diaphragm 705 has a process for displacing it toward the discharge port to directly shift the liquid toward the discharge port, the discharging efficiency is further improved. Further, the shifting amount of the liquid toward the upstream side is relatively decreased, with the result that the re-fill of the liquid into the nozzles (particularly, into the deformable area of the movable separation diaphragm 705) (replenishment from the upstream side) is improved.

Further, as shown in FIGS. 23D and 23E, when the movable separation diaphragm 705 itself is displaced toward the discharge port from the condition shown in FIG. 23D to the condition shown in FIG. 23E, the discharging efficiency and the re-fill efficiency can be further improved, and the first liquid in the projected area of the heat generating member 702 projected on the first liquid passage 703 can be shifted toward the discharge port, thereby increasing the discharge amount.

FIGS. 24A to 24E are sectional views (taken along a direction of the liquid passage) for explaining a second discharging method of the liquid discharge head according to the present invention. Since this example is also substantially the same as the first discharging principle, explanation will be made by using the same reference numerals.

Figure 24A:
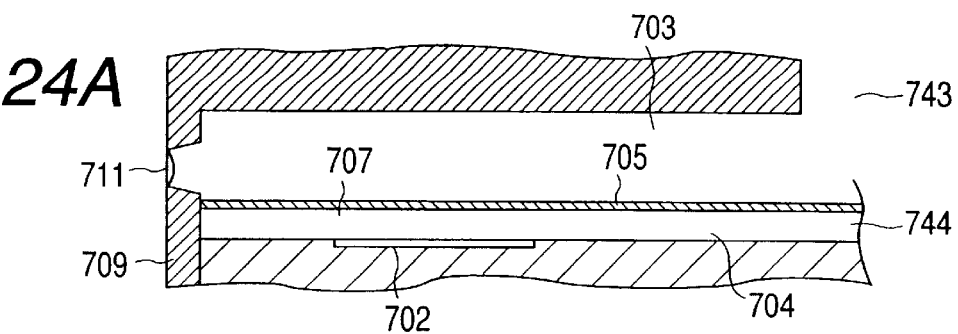
FIGS. 24A, 24B, 24C, 24D and 24E are sectional views for explaining a fundamental discharging pattern to improve discharging efficiency of the liquid discharge head according to the present invention, taken along a direction of the liquid passage.

In an initial condition shown in FIG. 24A, similar to FIG. 23A, the liquid in the first liquid passage 703 is drawn up to the vicinity of the discharge port 711 by a capillary force. Incidentally, in this example, the discharge port 711 is disposed at a downstream side of a projected area of the heat generating member 702 projected onto the first liquid passage 703.

Figure 24B:
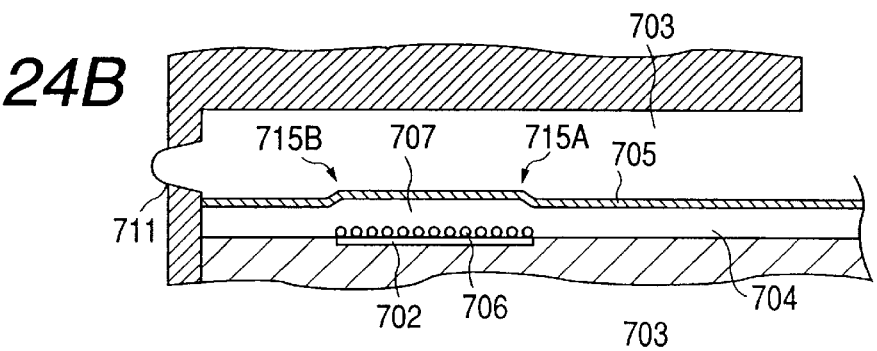

In this condition when thermal energy is applied to the heat generating member 702, the heat generating member 702 is heated quickly, with the result that the second liquid in the bubble generating area 707 is heated to create a bubble 706 (FIG. 24B). The pressure generated in this case is propagated through the second liquid in the second liquid passage 704 as a pressure wave and then acts on the movable separation diaphragm 705, with the result that the movable separation diaphragm 705 is displaced to start the discharging of the liquid in the first liquid passage 703.

Figure 24C:
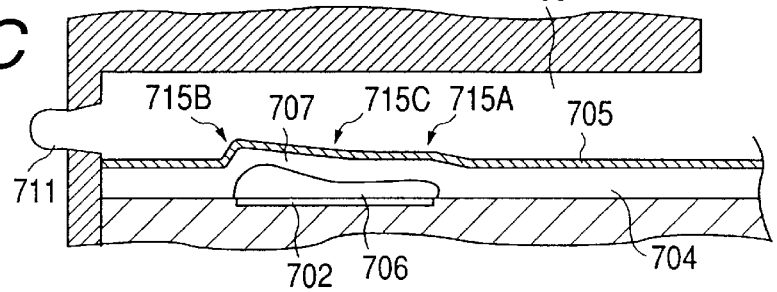

When the bubble 706 created on the entire surface of the heat generating member 702 is grown quickly, the bubble becomes a film shape (FIG. 24C). The expansion of the bubble 706 by the very high pressure in the initial phase of the bubble generation causes the movable separation diaphragm 705 to further displace, with the result that the discharging of the liquid in the first liquid passage 703 from the discharge port 711 is promoted. In this case, as shown in FIG. 24C, in the movable separation diaphragm 705, from immediately after the initial condition, a downstream side 715B of the movable area of the diaphragm is displaced more than an upstream side 715A. Accordingly, the first liquid in the first liquid passage 703 is shifted efficiently toward the discharge port 711 from the initial condition.

Figure 24D:
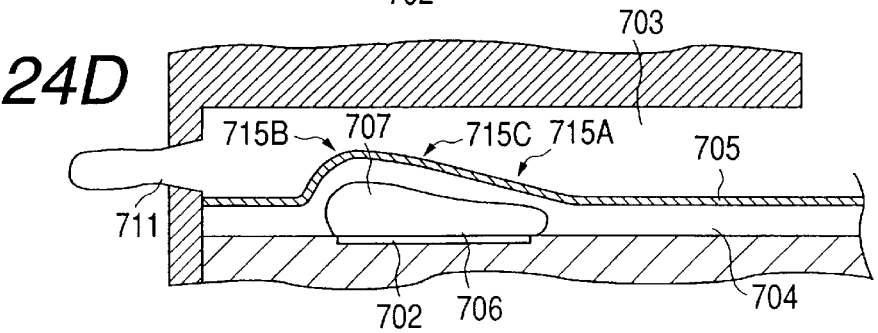

Thereafter, when the bubble 706 is further grown, since the displacement of the movable separation diaphragm 705 and the growth of the bubble are promoted from the condition shown in FIG. 24C, the displacement of the movable separation diaphragm 705 becomes great (FIG. 24D). Particularly, since the downstream side 715B of the movable area is displaced toward the discharge port more than the upstream side 715A and a central portion 715C, the first liquid in the first liquid passage 703 is directly accelerated toward the discharge port, and, since the displacement of the upstream side 715A is small during the entire process, only a small amount of liquid is shifted toward the upstream side.

Accordingly, the discharging efficiency (particularly, discharging speed) can be improved, and the re-fill of the liquid in the nozzles and the volume of the discharged liquid droplets can be stabilized.

Figure 24E:
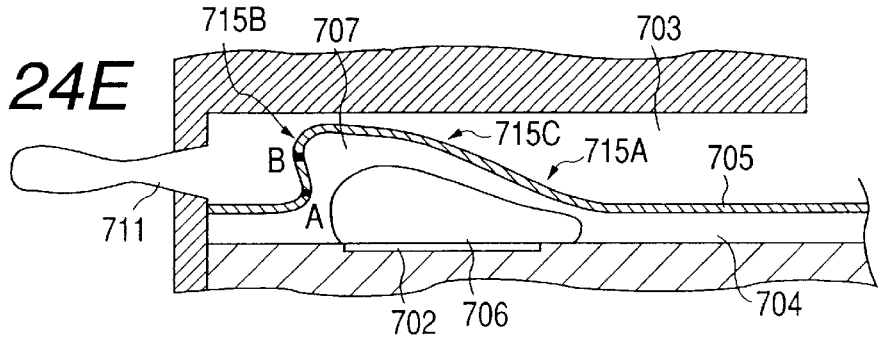

Thereafter, when the bubble 706 is further grown, the downstream side 715B and the central portion 715C of the movable separation diaphragm 705 are further displaced and extended toward the discharge port, thereby achieving the above-mentioned effect (that is, improving the discharging efficiency and the discharging speed) (FIG. 24E). Particularly, in the configuration of the movable separation diaphragm 705 in this case, since not only the displacement of the sectional configuration but also displacement and expansion in a width-wise direction of the liquid passage also become great, an acting area for shifting the liquid in the first liquid passage 703 toward the discharge port becomes great, thereby improving the discharging efficiency accordingly. In particular, since the deformed configuration of the movable separation diaphragm 705 in this case resembles a human's nose, it is referred to as a "nose configuration". Incidentally, as shown in FIG. 24E, this nose configuration includes an "S"-shaped configuration in which a point B which was at the upstream side in the initial condition is positioned at a point A which was at a downstream side in the initial condition, or, as shown in FIG. 24E, a configuration in which the points A and B are located at a similar position.

{Examples of Displacement of Movable Separation Diaphragm}

Figure 25A:
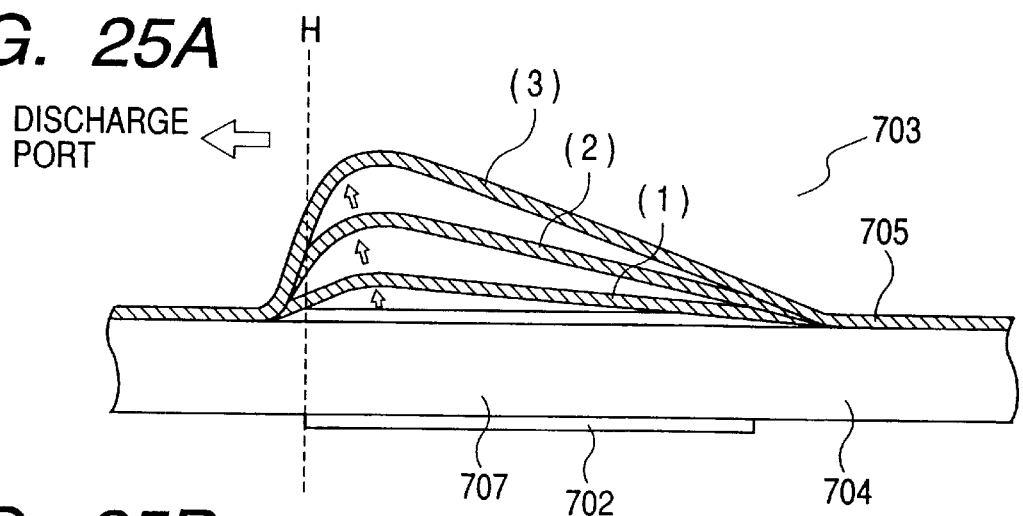
FIGS. 25A, 25B and 25C are sectional views for explaining displacing steps of the movable separation diaphragm to improve discharging efficiency of the liquid discharge head according to the present invention, taken along a direction of the liquid passage.
Figure 25B:
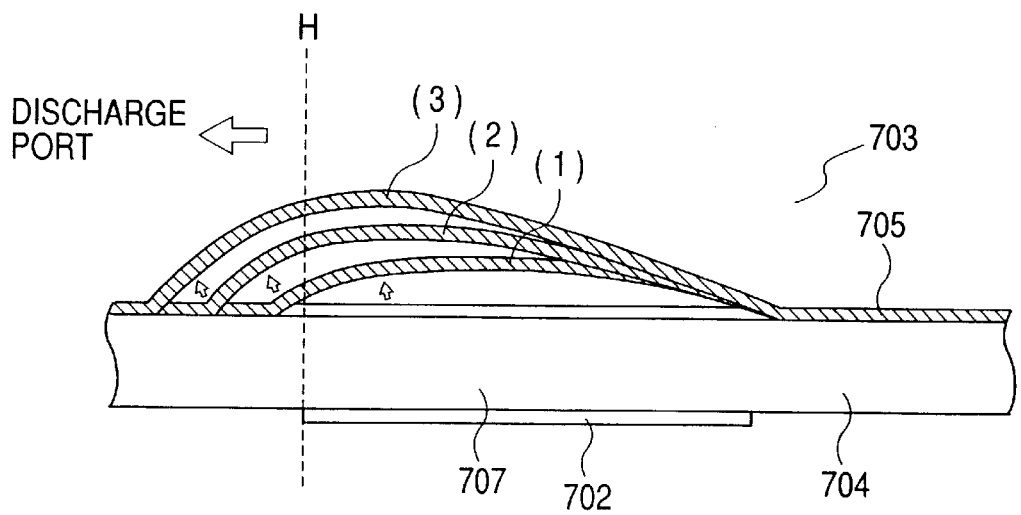
Figure 25C:
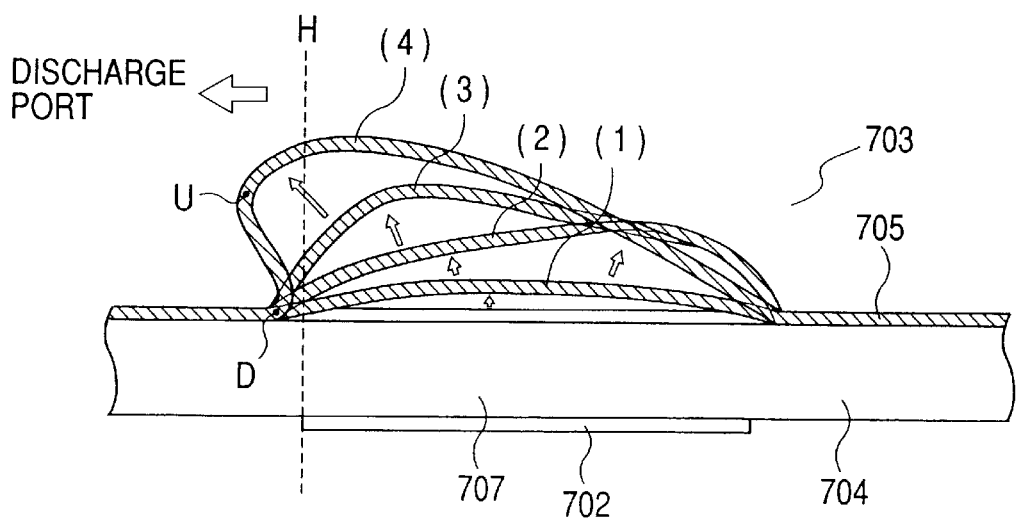

FIGS. 25A to 25C are sectional views (taken along a direction of the liquid passage) for explaining steps of displacement of the movable separation diaphragm during the discharging operation of the liquid discharge head according to the present invention.

In this example, since explanation is made particularly in consideration of changes in the movable range and displacement of the movable separation diaphragm, the bubble, first liquid passage and discharge port are omitted from illustration; but, in these Figures, as a fundamental arrangement, the projection area of the heat generating member 702 in the second liquid passage 704 is the bubble generating area 707, and the second liquid passage 704 and the first liquid passage 703 are substantially isolated from each other by the movable separation diaphragm 705 always (i.e., during the displacement from the initial condition). Further, the discharge port is provided at a downstream side of the downstream end (shown by the line H) of the heat generating member 702 and the supply portion for the first liquid is disposed at an upstream side. Incidentally, hereinbelow, the terms "upstream side" and "downstream side" are used with respect to the central portion of the movable range of the movable separation diaphragm 705 in the flow direction of the liquid in the liquid passage.

In an example shown in FIG. 25A, the movable separation diaphragm 705 is gradually displaced sequentially ((1)→(2)→(3)) from the initial condition, so that the downstream side is displaced more than the upstream side from the initial condition, and, particularly, since this provides a function for improving the discharging efficiency and for shifting the first liquid in the first liquid passage 703 toward the discharge port by the downstream displacement, the discharging speed can be improved. Incidentally, in FIG. 25A, the movable range is substantially constant.

In an example shown in FIG. 25B, as the movable separation diaphragm 705 is gradually displaced sequentially ((1)→(2)→(3)), the movable range of the movable separation diaphragm 705 is widened. In this example, an upstream end of the movable range is fixed. Since the downstream side of the movable separation diaphragm 705 is displaced greatly than the upstream side and the growth of the bubble itself can be directed toward the discharge port, the discharging efficiency can be further enhanced.

In an example shown in FIG. 25C, while the movable separation diaphragm 705 is displaced from the initial condition (1) to a condition (2), the downstream side and the upstream side are displaced to the same extent or the upstream side is displaced more greatly than the downstream side; however, as the bubble is further grown from a condition (3) to a condition (4), the downstream side of the movable separation diaphragm is displaced more than the upstream side. As a result, the first liquid above the movable area can also be shifted toward the discharge port, thereby improving the discharging efficiency and increasing the discharge amount.

Further, in the condition (4) shown in FIG. 25C, since a certain point U on the movable separation diaphragm 705 is displaced nearer the discharge port than a point D which was positioned downstream of the point U in the initial condition, the discharging efficiency is further enhanced by the portion protruded toward the discharge port. Incidentally, this configuration is called as the aforementioned nose configuration.

Although the liquid discharging methods having the above-mentioned steps or processes are included in the present invention, the methods shown in FIGS. 25A to 25C are not necessarily performed independently, but respective steps are also included in the present invention. Further, the step including the nose configuration shown in FIG. 25C may be applied to the methods shown in FIGS. 25A and 25B. The thickness of the movable separation diaphragm illustrated does not limit the actual thickness.

<Direction Regulating Means for Movable Separation Diaphragm>

Next, a regulating means for directing the displacement (shifting, expansion or elongation) of the movable separation diaphragm caused by the bubble toward the discharge port to realize the above-mentioned discharging principles will be explained by using examples 1 to 6.

EXAMPLE 1

Figure 26A:
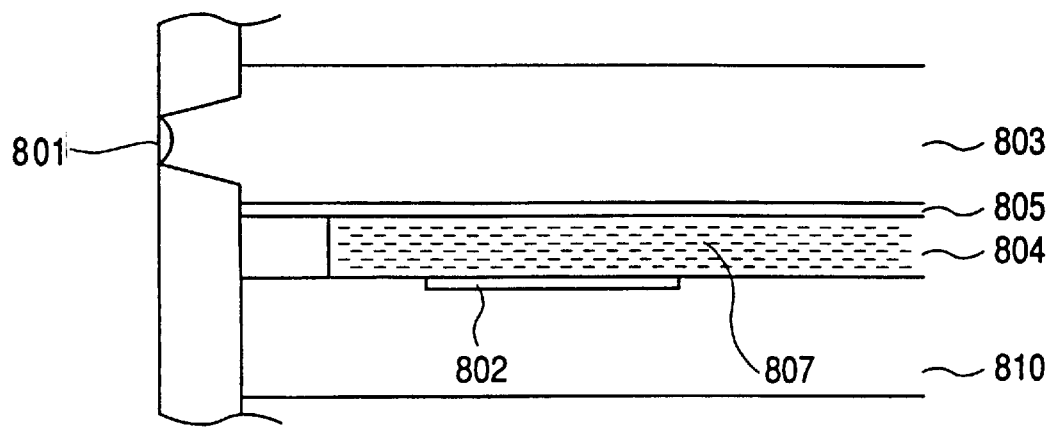
FIGS. 26A, 26B and 26C are views showing a first embodiment of a liquid discharge head having a means for regulating a movable separation diaphragm, according to the present invention, where
Figure 26B:
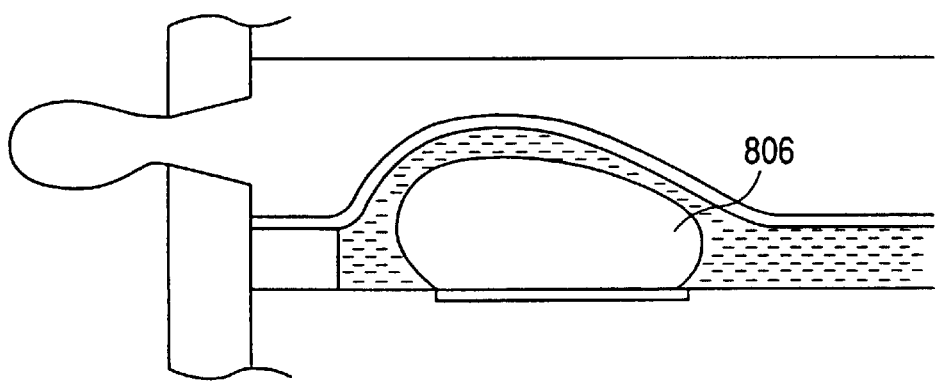
Figure 26C:
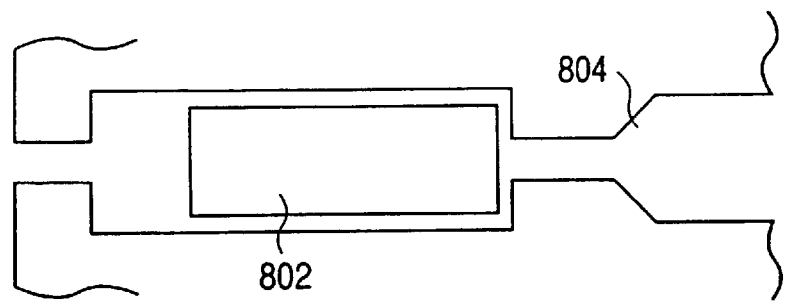

FIGS. 26A to 26C are views showing a first example of a liquid discharge head according to the present invention having the above-mentioned regulating means, where FIG. 26A is a sectional view (taken along a direction of the liquid passage) showing a non-bubbling condition, FIG. 26B is a sectional view (taken along a direction of the liquid passage) showing a bubbling condition, and FIG. 26C is a view showing a construction of a second liquid passage.

As shown in FIGS. 26A to 26C, in the first example, a second liquid passage 804 for bubbling liquid is provided on a substrate 810 on which a heat generating member 802 for generating thermal energy for creating a bubble in the liquid, and a first liquid passage 803 directly communicating with a discharge port 801 is provided on the second liquid passage. Further, a movable separation diaphragm 805 formed from a thin film made of inorganic material having elasticity is disposed between the first liquid passage 803 and the second liquid passage 804, so that the discharge liquid in the first liquid passage 803 is isolated from the bubbling liquid in the second liquid passage 804 by the movable separation diaphragm 805.

By heating the heat generating member 802, heat acts on the bubbling liquid in a bubble generating area 807 between the movable separation diaphragm 805 and the heat generating member 802, with the result that a bubble is created in the bubbling liquid by a film boiling phenomenon. Pressure from the bubble preferentially acts on the movable separation diaphragm 805, with the result that the movable separation diaphragm 805 is displaced to be greatly expanded toward the discharge port 801, as shown in FIG. 26B. Consequently, the pressure of the bubble created in the bubble generating area 807 is directed toward the discharge port 801.

In this example, the second liquid passage 804 is extended toward a downstream direction of the bubble generating area 807 located immediately above the heat generating member 802, so that flow resistance downstream of the heat generating member 802 becomes small, with the result that the pressure of the bubble created by the heat of the heat generating member 802 is apt to be directed toward the downstream direction. With this arrangement, the movable separation diaphragm 805 is also displaced toward the downstream direction, thereby obtaining high discharging efficiency and discharging force.

Further, by regulating the growth of the bubble in the second liquid passage, since regulation directly acts on the bubble itself, the effect can be started as soon as the bubble is created. Further, when the bubble 806 is contracted, since the movable separation diaphragm 805 is quickly returned to the initial position (non-deformed condition) due to contraction of the bubble (reduction in pressure), the acting direction of the pressure can be controlled, and the re-fill speed of the discharge liquid into the first liquid passage 803 is increased, thereby achieving stable discharging even in high speed recording.

EXAMPLE 2

Figure 27A:
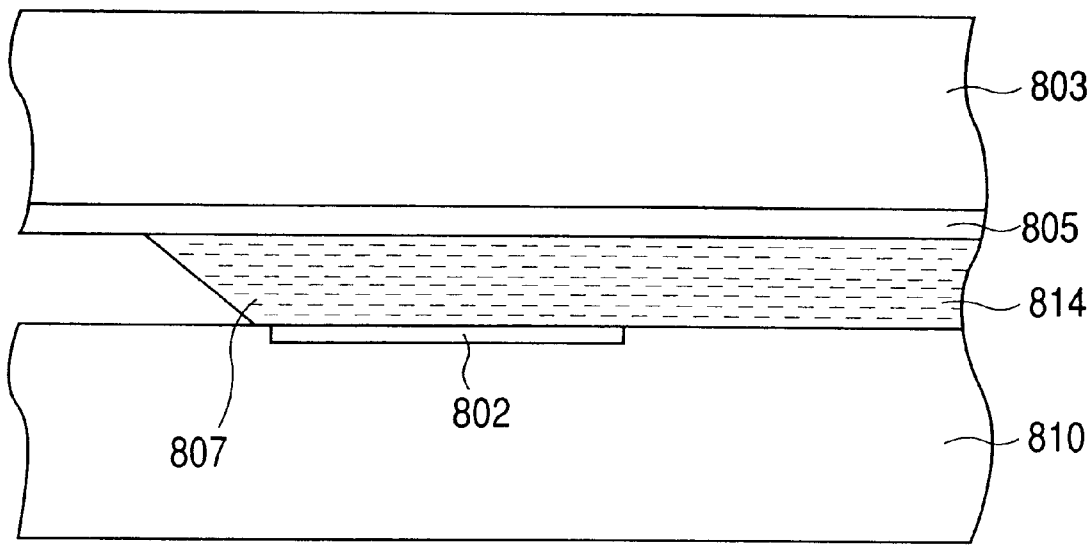
FIGS. 27A and 27B are views showing a second embodiment of a liquid discharge head having a means for regulating a movable separation diaphragm, according to the present invention, where
Figure 27B:
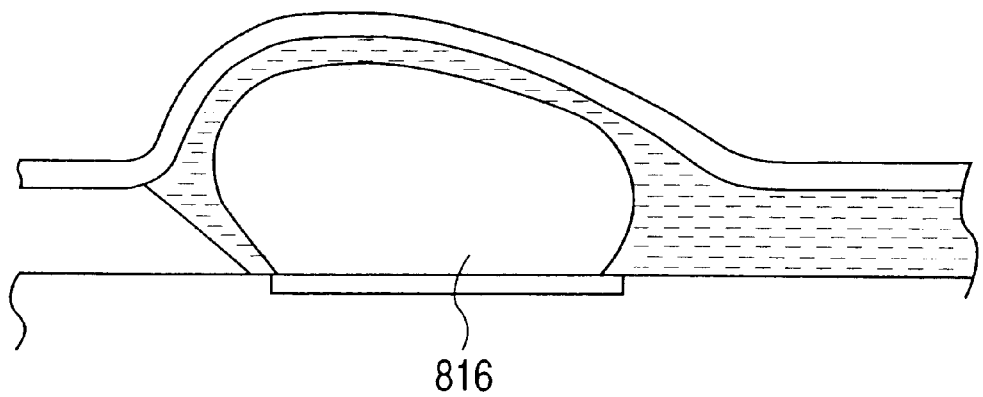

FIGS. 27A and 27B are views showing a second example of a liquid discharge head according to the present invention having the above-mentioned regulating means, where FIG. 27A is a sectional view showing a non-bubbling condition, and FIG. 27B is a sectional view showing a bubbling condition.

As shown in FIGS. 27A and 27B, in this example, a wall of a second liquid passage 814 nearer the discharge port than the heat generating member 802 is tapered to be converged toward the discharge port. With this arrangement, the flow resistance at the bubble generating area 807 and therearound becomes smaller toward the discharge port, with the result that pressure of a bubble 816 created by the heat of the heat generating member 802 is apt to be directed toward the discharge port, thereby obtaining high discharging efficiency and discharging force.

Figure 28A:
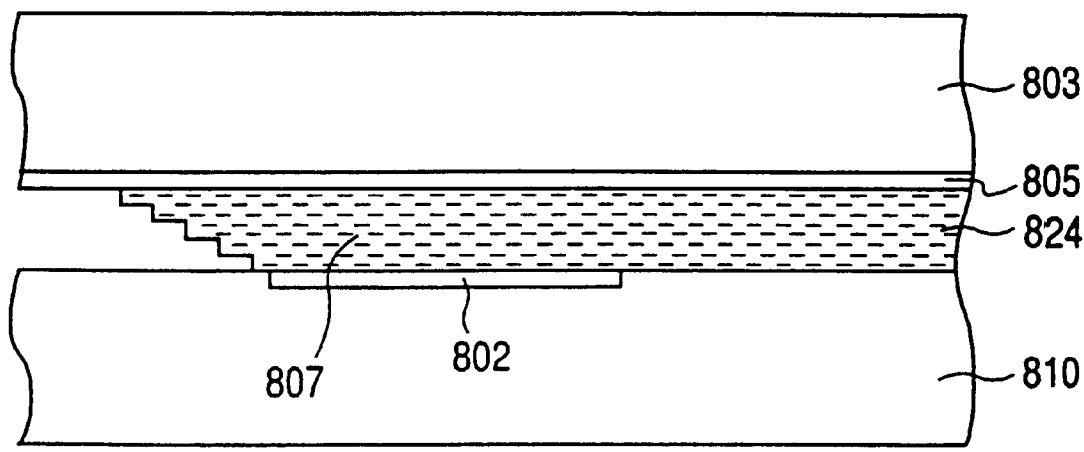
FIGS. 28A and 28B are views taken along a direction of the liquid passage showing an alteration of the liquid discharge head shown in FIGS. 27A and 27B, where
Figure 28B:
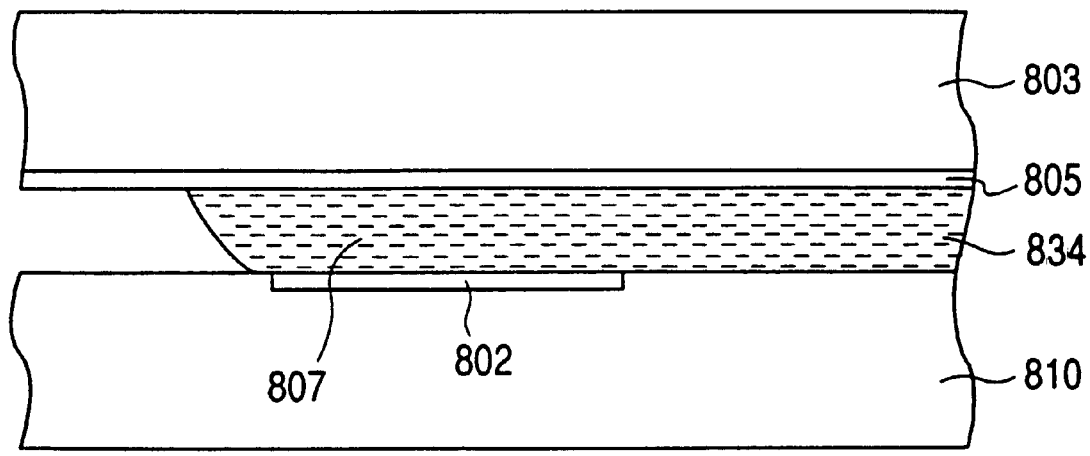

FIGS. 28A and 28B are sectional views (taken along a direction of the liquid passage) showing alterations of the liquid discharge head shown in FIGS. 27A and 27B, where FIG. 28A is a view showing an alteration in which a part of the wall of a second liquid passage is formed in a stepped shape, and FIG. 28B is a view showing an alteration in which a part of the wall of a second liquid passage is formed to have a radius of curvature.

In the alteration shown in FIG. 28A, a wall of a second liquid passage 824 nearer the discharge port than the heat generating member 802 is stepped to be converged toward the discharge port, and, in the alteration shown in FIG. 28B, a wall of a second liquid passage 834 nearer the discharge port than the heat generating member 802 is curved (to have a radius of curvature) to be converged toward the discharge port. With these arrangements, in both cases, the flow resistance at the bubble generating area 807 and therearound becomes smaller toward the discharge port, with the result that pressure of a bubble created by the heat of the heat generating member 802 is apt to be directed toward the discharge port, thereby obtaining high discharging efficiency and discharging force, as in the example shown in FIGS. 27A and 27B.

EXAMPLE 3

Figure 29A:
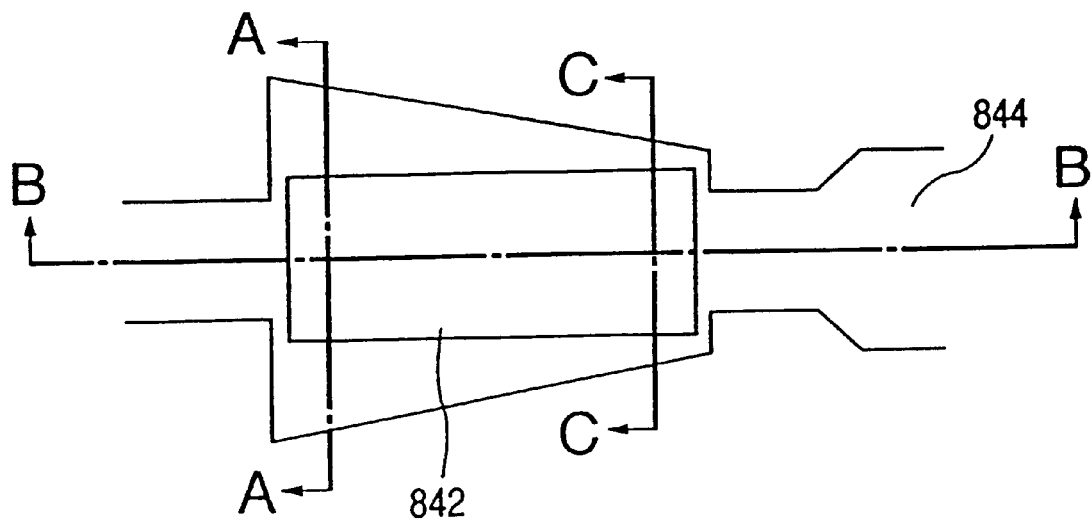
FIGS. 29A and 29B are views showing a third embodiment of a liquid discharge head having a means for regulating a movable separation diaphragm, according to the present invention, where
Figure 29B:
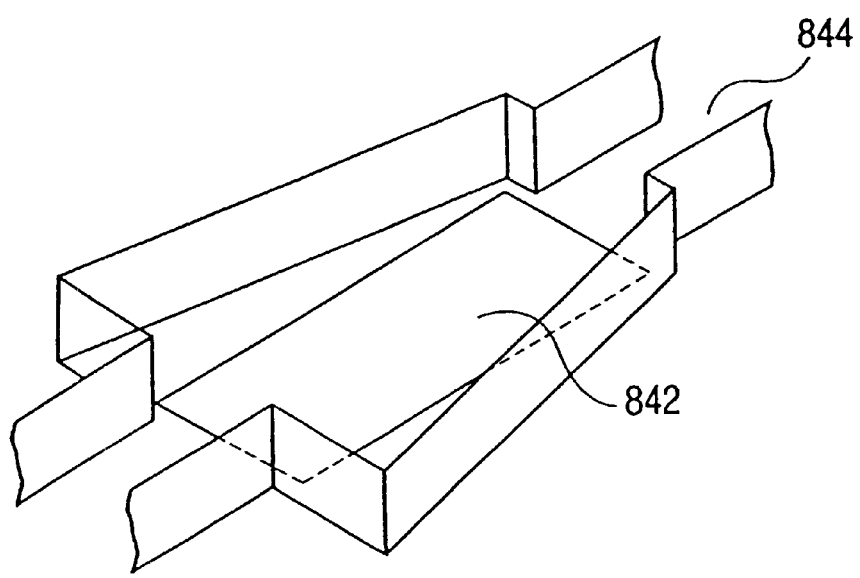

FIGS. 29A and 29B are views showing a third example of a liquid discharge head according to the present invention having the above-mentioned regulating means, where FIG. 29A is a top view showing a positional relation between a second liquid passage and a heat generating member, and FIG. 29B is a perspective view of FIG. 29A (a discharge port is disposed at the left in FIG. 29A).

In the second liquid passage according to this example, as shown in FIGS. 29A and 29B, in the vicinity of the heat generating member 842, a width of the second liquid passage 844 is gradually widened from an upstream side to a downstream side.

Now, a discharging operation of the liquid discharge head having the above-mentioned construction will be fully explained.

FIGS. 30A to 30E are views for explaining a discharging operation of the liquid discharge head shown in FIGS. 29A and 29B in a time-lapse manner, where (A) in FIGS. 30A to 30E (left Figures) are sectional views taken along the line B—B in FIG. 29A, (B) in FIGS. 30A to 30E (central Figures) are sectional views taken along the line A—A in FIG. 29A, and (C) in FIGS. 30A to 30E (right Figures) are sectional views taken along the line C—C in FIG. 29A.

In FIG. 30A, electrical energy is not applied to the heat generating member 842, so as not to generate heat from the heat generating member 842. Incidentally, the movable separation diaphragm 845 (separating first liquid passage 843 from second liquid passage 844) is located at a first position substantially parallel to the substrate.

When electrical energy is applied to the heat generating member 842, a part of the bubbling liquid filled in the bubble generating area 847 is heated by heat generated from the heat generating member 842, thereby creating the bubble 846 by film boiling (FIG. 30B).

The generated bubble 846 is grown quickly by the heat from the heat generating member 842. In this case, since the second liquid passage 844 has the configuration shown in FIGS. 29A and 29B, a central portion of the bubble is greatly grown at the central portion and both end portions of the bubble are greatly grown at the downstream side, with the result that the movable separation diaphragm 845 is displaced accordingly (FIG. 30C).

When the bubble 846 is further grown, the central portion of the bubble at the downstream side is grown most greatly, with the result that the downstream side of the movable separation diaphragm 845 is displaced greatly (FIG. 30D).

Thereafter, when the bubble 846 contracts and disappears by reduction of the inner pressure of the bubble (characteristic of the film boiling phenomenon), the deformed movable separation diaphragm 845 is returned to its initial position by negative pressure due to contraction of the bubble 846 and a restoring force due to the spring feature of the movable separation diaphragm 845 itself (FIG. 30E).

In this way, the pressure caused by the generation of the bubble 846 tends to direct toward the upstream direction (i.e., toward the discharge port) gradually.

As a result, the flow resistance at the bubble generating area 847 and therearound becomes smaller toward the discharge port, with the result that pressure of the bubble 846 created by the heat of the heat generating member 842 is apt to be directed toward the discharge port, thereby obtaining high discharging efficiency and discharging force. Further, the first liquid in the projected portion of the heat generating member 842 can be shifted toward the discharge port, thereby increasing the discharge amount.

Figure 31A:
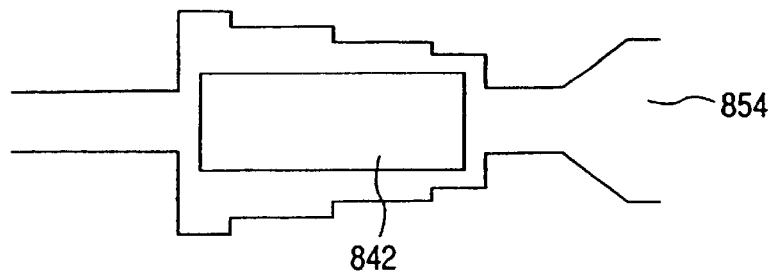
FIGS. 31A, 31B and 31C are views showing an alteration of the liquid discharge head shown in FIG. 29A and 29B, where
Figure 31B:
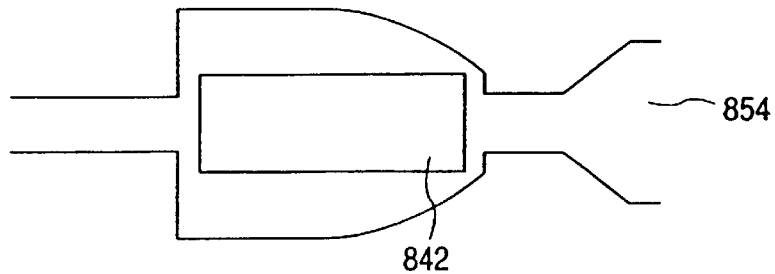
Figure 31C:
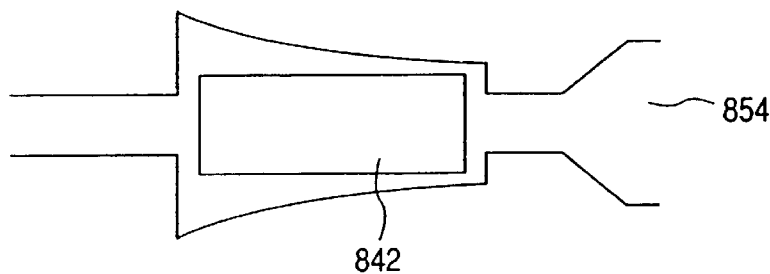

FIGS. 31A to 31C are views showing alterations of the liquid discharge head of FIGS. 29A and 29B, where FIG. 31A is a view showing an alteration in which the width of the second liquid passage in the vicinity of the heat generating member is gradually widened in a stepped manner from the upstream side to the downstream side, FIG. 31B is a view showing an alteration in which the width of the second liquid passage in the vicinity of the heat generating member is gradually widened to have a certain radius of curvature from the upstream side to the downstream side, and FIG. 31C is a view showing an alteration in which the width of the second liquid passage in the vicinity of the heat generating member is gradually widened in an inverted radius of curvature from the upstream side to the downstream side. In these Figures, the discharge port is located at the left side.

In the alteration shown in FIG. 31A, the width of the second liquid passage 854 in the vicinity of the heat generating member 842 is gradually widened in a stepped manner from the upstream side to the downstream side, and, in the alteration shown in FIG. 31B, the width of the second liquid passage 854 in the vicinity of the heat generating member 842 is gradually widened to have a certain radius of curvature from the upstream side to the downstream side, and, in the alteration shown in FIG. 31C, the width of the second liquid passage 854 in the vicinity of the heat generating member 842 is gradually widened in an inverted (with respect to FIG. 31B) radius of curvature from the upstream side to the downstream side. Thus, in any case, the flow resistance at the bubble generating area and therearound becomes smaller toward the discharge port, with the result that pressure of the bubble created by the heat of the heat generating member is apt to be directed toward the discharge port, thereby obtaining high discharging efficiency and discharging force.

EXAMPLE 4

Figure 32:
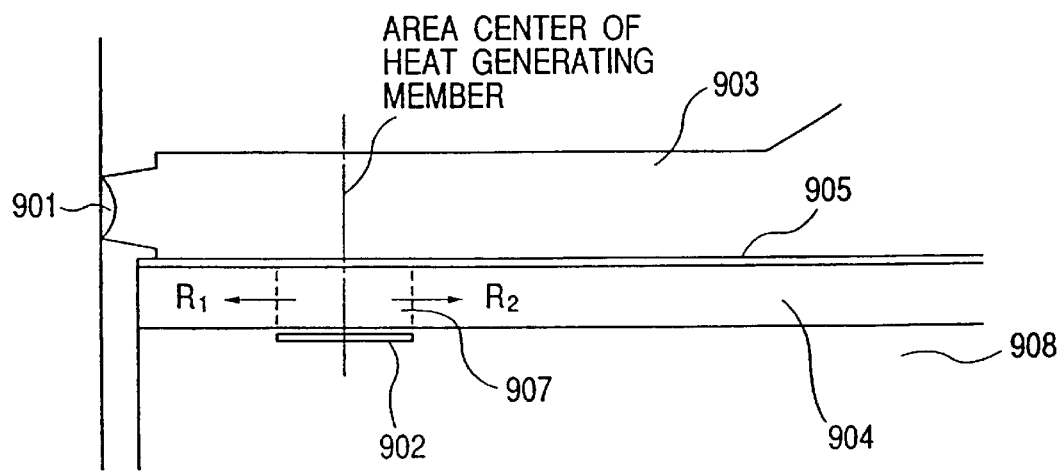
FIG. 32 is a sectional view showing a fourth embodiment of a liquid discharge head having a means for regulating a movable separation diaphragm, according to the present invention, taken along a direction of a liquid passage.

FIG. 32 is a sectional view (taken along a direction of the liquid passage) showing a fourth example of a liquid discharge head according to the present invention having the above-mentioned regulating means.

As shown in FIG. 32, in this example, a second liquid passage 904 for bubbling liquid is provided on a substrate 908 having a heat generating member 902 (in this example, heat generating resistance body having dimension of 40 $\mu$m±105 $\mu$m) for generating thermal energy for creating a bubble in the liquid, and a first liquid passage 903 directly communicated with a discharge port 901 is provided on the second liquid passage. Further, a movable separation diaphragm 905 formed from a thin film made of inorganic material having elasticity is disposed between the first liquid passage 903 and the second liquid passage 904, so that the discharge liquid in the first liquid passage 903 is isolated from the bubbling liquid in the second liquid passage 904 by the movable separation diaphragm 905.

By heating the heat generating member 902, a bubble is created in the bubbling liquid by the film boiling phenomenon. In the second liquid passage 904, when flow resistance $R_1$ in a downstream side of the center of the heat generating member 902 is selected to be greater than flow resistance $R_2$ in an upstream side, a downstream component of pressure in the bubble at the downstream side of the center of the heat generating member 902 acts on the movable separation diaphragm 905 preferentially; on the other hand, an upstream component not only acts on the movable separation diaphragm 905 but also acts on the upstream side.

Thus, when the growth of the bubble is continued, the movable separation diaphragm 905 is greatly displaced toward the discharge port. As a result, the pressure of the bubble created in the bubble generating area 907 is directed toward the discharge port 901.

Now, a discharging operating of the liquid discharge head having the above-mentioned construction will be fully explained.

FIGS. 33A to 33D are views for explaining the operation of the liquid discharge head shown in FIG. 32.

Figure 33A:
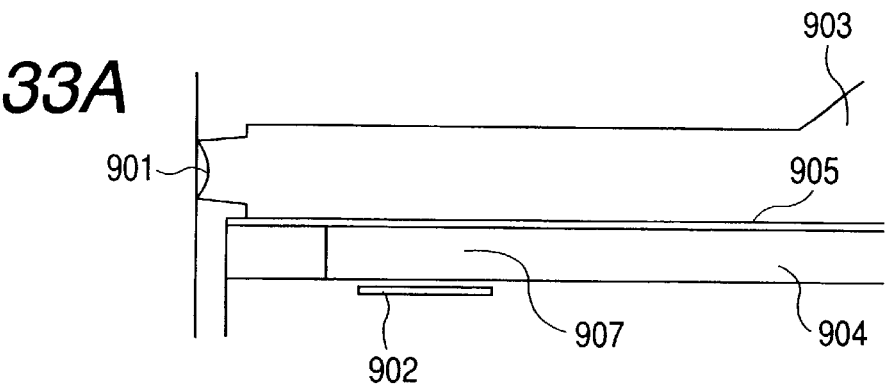
FIGS. 33A, 33B, 33C and 33D are explanatory views for explaining an operation of the liquid discharge head of FIG. 32.

In FIG. 33A, energy such as electrical energy is not applied to the heat generating member 902 so as not to generate heat from the heat generating member 902.

Figure 33B:
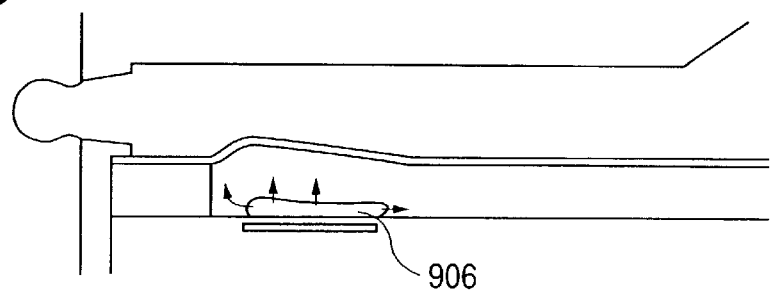

When electrical energy is applied to the heat generating member 902, a part of the bubbling liquid filled in the bubble generating area 907 is heated by heat generated from the heat generating member 902, thereby creating the bubble 906 by film boiling. When the bubble 906 is created, the movable separation diaphragm 905 is displaced from a first position to a second position by pressure in the bubble 906 (FIG. 33B).

It is important that, as mentioned above, in the second liquid passage 904, the flow resistance in the downstream side (discharge port side) of the center of the heat generating member 902 is selected to be greater than flow resistance in the upstream side so that the downstream pressure component of pressure in the bubble acts on the movable separation diaphragm 905 preferentially.

Figure 33C:
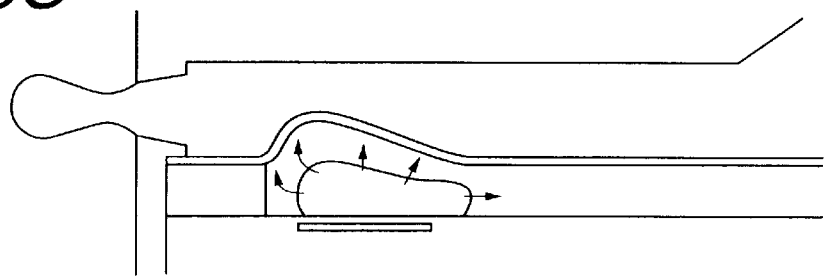

When the bubble 906 is further grown, a horizontal component of the downstream pressure component is directed upwardly by the upstream flow resistance. As a result, almost all of the downstream pressure component acts on the movable separation diaphragm 905 preferentially, thereby further displacing the movable separation diaphragm 905 toward the first liquid passage 903. Consequently, the movable separation diaphragm 905 is greatly swollen toward the discharge port 901 (FIG. 33C).

In this way, by gradually displacing the downstream portion of the movable separation diaphragm 905 toward the discharge port 901 in accordance with the growth of the bubble 906, the bubble 906 is grown toward the downstream direction and the movable separation diaphragm 905 is greatly swollen toward the discharge port, the pressure of the bubble 906 is uniformly directed toward the discharge port 901. As a result, the discharging efficiency for discharging the liquid from the discharge port 901 is enhanced. Incidentally, when the bubble pressure is directed toward the discharge port 901, the movable separation diaphragm 905 almost does not interfere with this, with the result that the propagating direction of the pressure and the growing direction of the bubble 906 can be controlled efficiently in accordance with the magnitude of the propagated pressure.

Figure 33D:
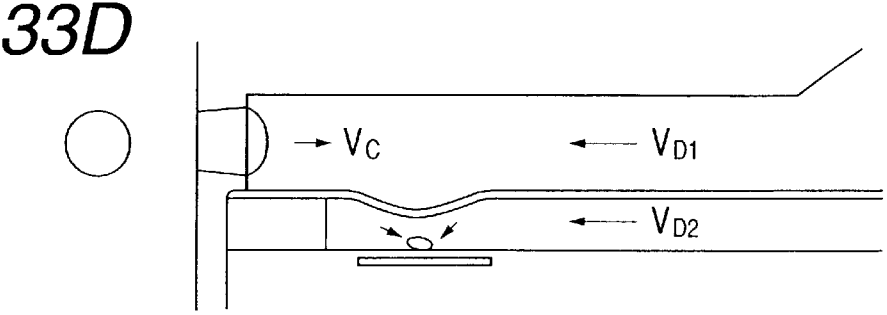

Thereafter, when the bubble 906 contracts and disappears by reduction of the inner pressure of the bubble (characteristic of the film boiling phenomenon), the movable separation diaphragm 905 which was displaced to the second position is displaced toward the second liquid passage 904 through the first position by negative pressure due to contraction of the bubble 906 and then is returned to the initial position (first position) shown in FIG. 33A (FIG. 33D). When the bubble disappears, in order to compensate the volume corresponding to the discharged liquid, the liquid flows in from the common liquid chamber side (shown by the arrows $V_{D1}$, $V_{D2}$) and from the discharge port 901 side (shown by the arrow $V_C$). Similarly, in the second liquid passage 904, the liquid flows in from the upstream side.

Now, supplementary explanation of the above-mentioned liquid discharge head will be made.

Figure 34:
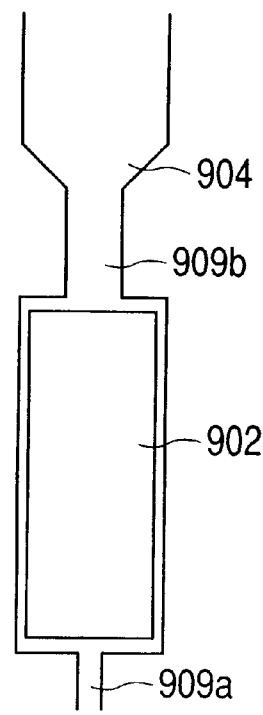
FIG. 34 is a top view for explaining a construction of a second liquid passage of the liquid discharge head of FIG. 32 and FIGS. 33A to 33D, showing the second liquid passage with a movable separation diaphragm omitted.

FIG. 34 is a view for explaining the second liquid passage 904 of the liquid discharge head shown in FIGS. 32 and 33A to 33D, showing the second liquid passage 904 looked at from above, with the movable separation diaphragm 905 omitted from illustration. Incidentally, the discharge port is located at the lower side in FIG. 34.

In the second liquid passage 904, restrictions 909a, 909b are provided with the interposition of the heat generating member 902 to define a chamber (bubbling chamber) for preventing the pressure of the bubble from escaping through the second liquid passage 904. In the restrictions 909a, 909b of the second liquid passage 904, an opening portion at a downstream side (discharge port side) is narrower than an opening portion at an upstream side (common liquid chamber side). By making the opening portion at the downstream side narrower, the flow resistance in the second liquid passage 904 at the downstream side can be made greater and the flow resistance at the upstream side can be made smaller, with the result that the downstream pressure component of the bubble pressure acts on the movable separation diaphragm 905 preferentially and effectively to displace the movable separation diaphragm toward the first liquid passage 903, thereby discharging the liquid in the first liquid passage 903 efficiently with a high discharging force. The downstream restriction 909a of the bubbling chamber in the second liquid passage 904 serves to remove bubbles remaining in the bubbling chamber.

Incidentally, the configuration of the second liquid passage 904 is not limited to the above-mentioned one, but any configurations capable of transmitting the bubble pressure to the movable separation diaphragm 905 effectively can be used.

As mentioned above, according to the above-mentioned arrangement, by selecting the flow resistance at the downstream side (of the center of the heat generating member) in the second liquid passage to be greater than the flow resistance at the upstream side, since the movable separation diaphragm displaced by the bubble pressure is grown toward the downstream direction, liquid having low heat resistance or highly viscous liquid can be discharged efficiently with a high discharging force.

EXAMPLE 5

Figure 35:
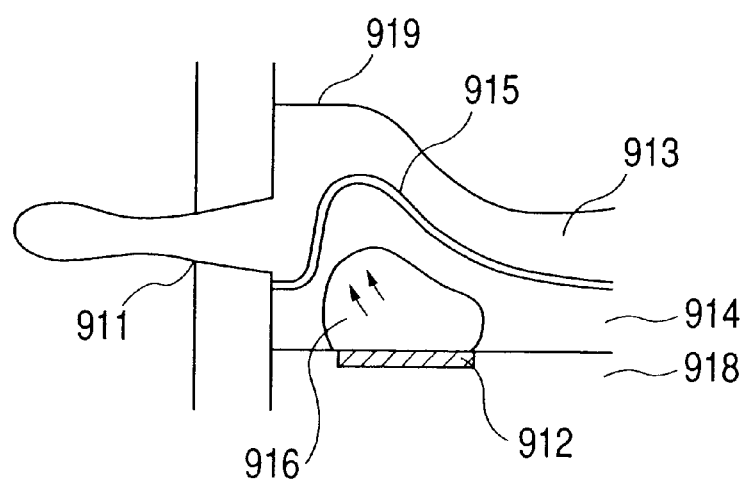
FIG. 35 is a sectional view showing a fifth embodiment of a liquid discharge head having a means for regulating a movable separation diaphragm, according to the present invention, taken along a direction of a liquid passage, showing a bubbling condition.

FIG. 35 is a sectional view (taken along a direction of the liquid passage) showing a fifth example of a liquid discharge head according to the present invention having the above-mentioned regulating means in a bubbling condition.

As shown in FIG. 35, in this example, a second liquid passage 914 for bubbling liquid is provided on a substrate 918 having a heat generating member 912 for generating thermal energy for creating a bubble in the liquid, and a first liquid passage 913 directly communicated with a discharge port 911 is provided on the second liquid passage. Further, a movable separation diaphragm 915 formed from a thin film made of inorganic material having elasticity is disposed between the first liquid passage 913 and the second liquid passage 914, so that the discharge liquid in the first liquid passage 913 is isolated from the bubbling liquid in the second liquid passage 914 by the movable separation diaphragm 915.

Incidentally, the greatest characteristic in this example is that a height of a top plate 919 defining the first liquid passage 913, i.e., a height of the first liquid passage 913 at the projected area of the heat generating member 912 is greater at a downstream side where the discharge port 911 is located than at an upstream side where a common liquid chamber (not shown) is located.

In a liquid discharging apparatus having the above-mentioned construction, by heating the heat generating member 912, a bubble 916 is created in the bubbling liquid by the film boiling phenomenon. When the bubble 916 is created, the movable separation diaphragm 915 is displaced toward the first liquid passage 913. However, since it is designed so that the height of the first liquid passage 913 is greater at the downstream side than at the upstream side, the movable separation diaphragm 915 is displaced toward the first liquid passage 913 more greatly at the downstream side than at the upstream side. As a result, the pressure of the bubble 916 generated in a bubble generating area is directed toward the discharge port 911.

Now, a discharging operation of the liquid discharge head having the above-mentioned construction will be full explained.

FIGS. 36A to 36D are views for explaining the operation of the liquid discharge head shown in FIG. 35.

Figure 36A:
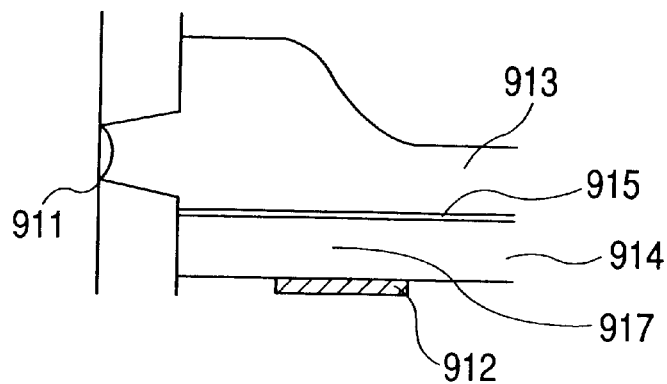
FIGS. 36A, 36B, 36C and 36D are explanatory views for explaining an operation of the liquid discharge head of FIG. 35.

In FIG. 36A, energy such as electrical energy is not applied to the heat generating member 912 so as not to generate heat from the heat generating member 912. Incidentally, the movable separation diaphragm 915 is located at a first position substantially parallel with the substrate 918.

Figure 36B:
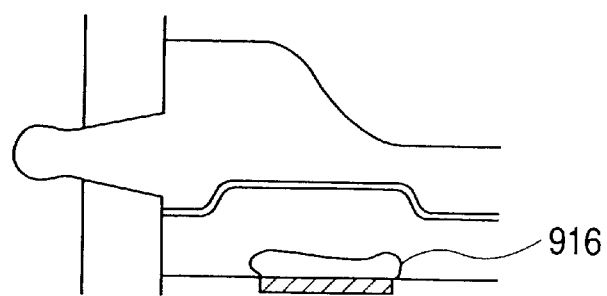

When electrical energy is applied to the heat generating member 912, a part of the bubbling liquid filled in the bubble generating area 917 is heated by heat generated from the heat generating member 912, thereby creating the bubble 916 by film boiling. As a result, a portion of the movable separation diaphragm 915 facing the bubble generating area 917 is displaced toward the first liquid passage 913 (FIG. 36B).

Figure 36C:
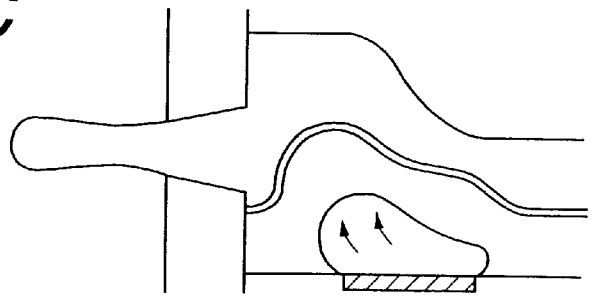

When the bubble 916 is further grown, in accordance with the pressure of the bubble, the movable separation diaphragm 915 is further displaced toward the first liquid passage 913 to reach a second position. In this case, since it is designed so that the height of the first liquid passage 913 is greater at the downstream side than at the upstream side, the movable separation diaphragm 915 is displaced toward the first liquid passage 913 more greatly at the downstream side than at the upstream side (FIG. 36C). Therefore, the discharging efficiency can be further improved.

Figure 36D:
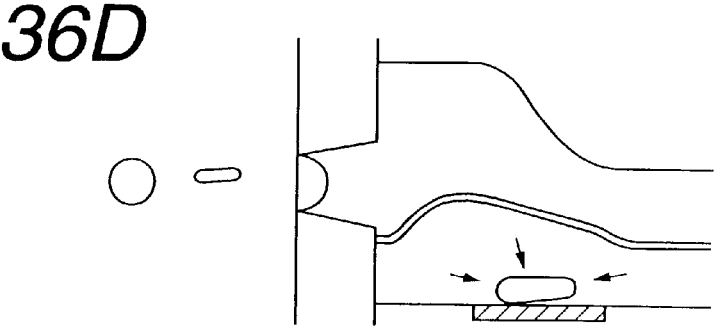

Thereafter, when the bubble 916 contracts and disappears by reduction of the inner pressure of the bubble (characteristic of the film boiling phenomenon), the movable separation diaphragm 915 which was displaced to the second position is gradually returned to the initial position (first position) shown in FIG. 36A by negative pressure due to contraction of the bubble 916 (FIG. 36D). When the bubble disappears, in order to compensate for the volume corresponding to the discharged liquid, the liquid flows in from the upstream side, i.e., the common liquid chamber side and from the discharge port 901 side. As a result, the retard of meniscus due to reduction in volume of the liquid corresponding to the displacement amount of the first liquid passage 913 side caused when the movable separation diaphragm 915 is displaced toward the second liquid passage 914 can be suppressed, thereby reducing the re-fill time.

EXAMPLE 6

Figure 37:
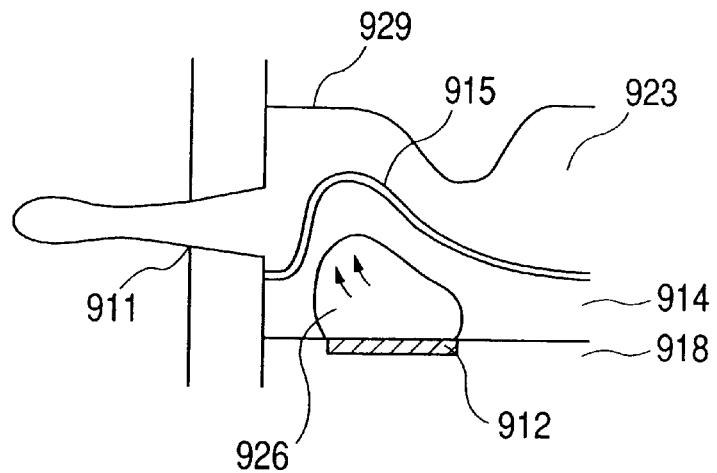
FIG. 37 is a sectional view showing a sixth embodiment of a liquid discharge head having a means for regulating a movable separation diaphragm, according to the present invention, taken along a direction of a liquid passage, showing a bubbling condition.

FIG. 37 is a sectional view (taken along a direction of the liquid passage) showing a sixth example of a liquid discharge head according to the present invention having the above-mentioned regulating means in a bubbling condition.

As shown in FIG. 37, this example differs from the example shown in FIG. 35 in the point that a configuration of a top plate 929, i.e., a configuration of a first liquid passage 923 is different from that in the fifth example, and the other arrangements are the same as those in the fifth example.

As shown in FIG. 37, in this example, regarding the height of the top plate 929, a portion thereof at an upstream side of the heat generating member 912 is lower than the height of the other top plate portions.

When a bubble 926 is created, the movable separation diaphragm 915 is displaced toward the first liquid passage 923. However, since it is designed so that the portion of the top plate at the upstream side of the heat generating member 912 is lower than the height of the other top plate portions, the movable separation diaphragm 915 is displaced toward the first liquid passage 923 more at the downstream side than at the upstream side. As a result, the pressure of the bubble 926 generated in a bubble generating area is directed toward the discharge port 911. Further, since the flow resistance in the first liquid passage 923 is greater at the upstream side than at the downstream side, the discharging efficiency is improved and, since the supply ability from the upstream side in the first liquid passage is excellent, the re-fill ability is further improved.

In the above-mentioned examples, while the present invention was explained by using the discharging system in which the liquid is discharged in the direction parallel with the flow direction of the liquid in the first liquid passage, the present invention is not limited to such a discharging system; so long as a discharge port is disposed at a downstream side of a bubble generating area, the present invention can be applied to a discharging system in which liquid is discharged in a direction perpendicular to a flow direction of liquid in a first liquid passage.

Figure 38A:
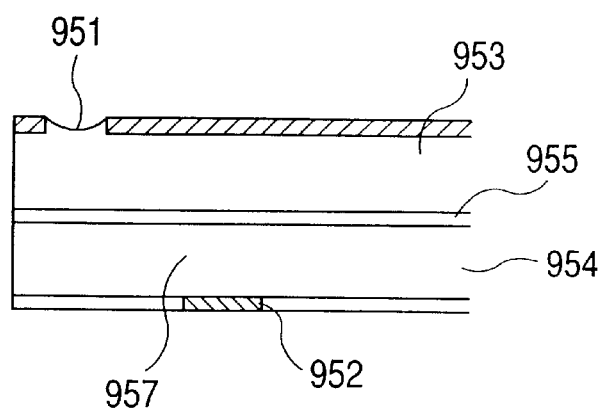
FIGS. 38A and 38B are sectional views taken along a direction of a liquid passage, showing an example that the present invention is applied to a liquid discharge head in which a discharge port is located at a downstream side of a bubble generating area to discharge liquid in a direction perpendicular to a direction along which the liquid flows through a first liquid passage, where
Figure 38B:
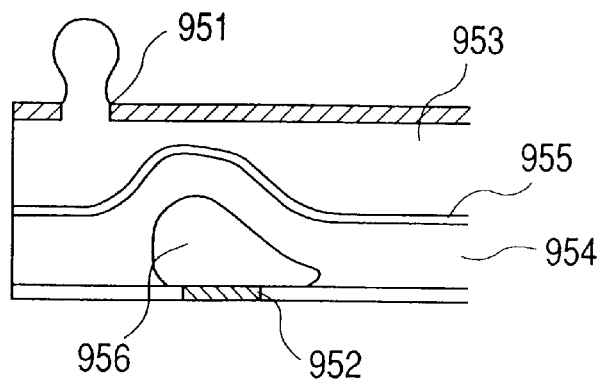

FIGS. 38A and 38B are sectional views (taken along a direction of the liquid passage) showing an example that the present invention is applied to a liquid discharge head in which a discharge port is disposed at a downstream side of a bubble generating area so that liquid is discharged in a direction perpendicular to a flow direction of liquid in a first liquid passage.

As shown in FIGS. 38A and 38B, in an arrangement in which a discharge port 951 is disposed in a direction perpendicular to a flow direction of liquid in a first liquid passage 953, so long as the discharge port 951 is disposed at a downstream side of a bubble generating area 957, the same effect can be achieved by using the construction in any one of the above examples. Incidentally, in FIGS. 38A and 38B, the reference numeral 955 denotes a movable separation diaphragm; 954 denotes a second liquid passage; 952 denotes a heat generating member; and 956 denotes a bubble created by the heat generating member.

<Expansiveness of Diaphragm and Liquid Discharging Operation>

The above-mentioned examples for improving the discharging efficiency utilize expansiveness of the diaphragm. However, a method in which a diaphragm is previously deformed toward a second liquid passage in correspondence to an amount of displacement of the diaphragm caused by a bubble may be used. Now, a liquid discharge head having such a diaphragm will be explained by using examples.

EXAMPLE 1

Figure 43A:
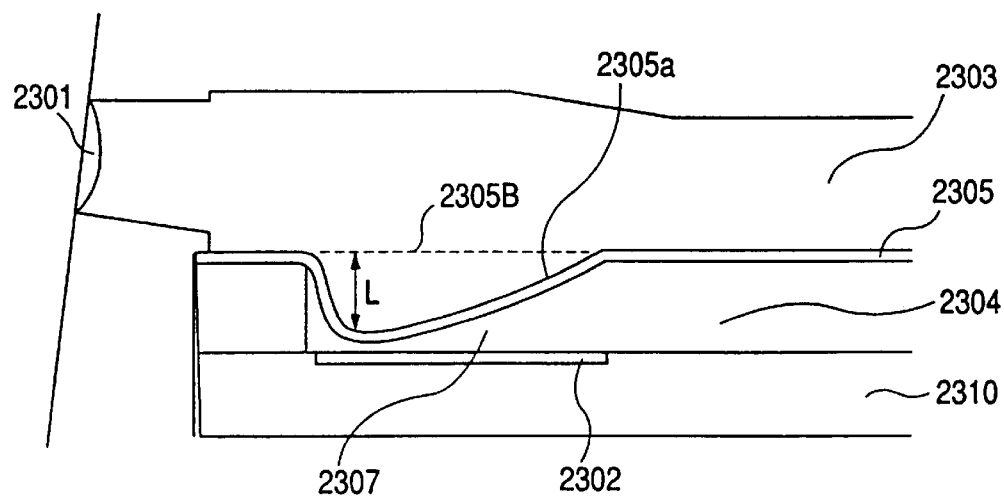
FIGS. 43A and 43B are explanatory views showing an embodiment of a liquid discharge head having a means for regulating a movable separation diaphragm, according to the present invention, where
Figure 43B:
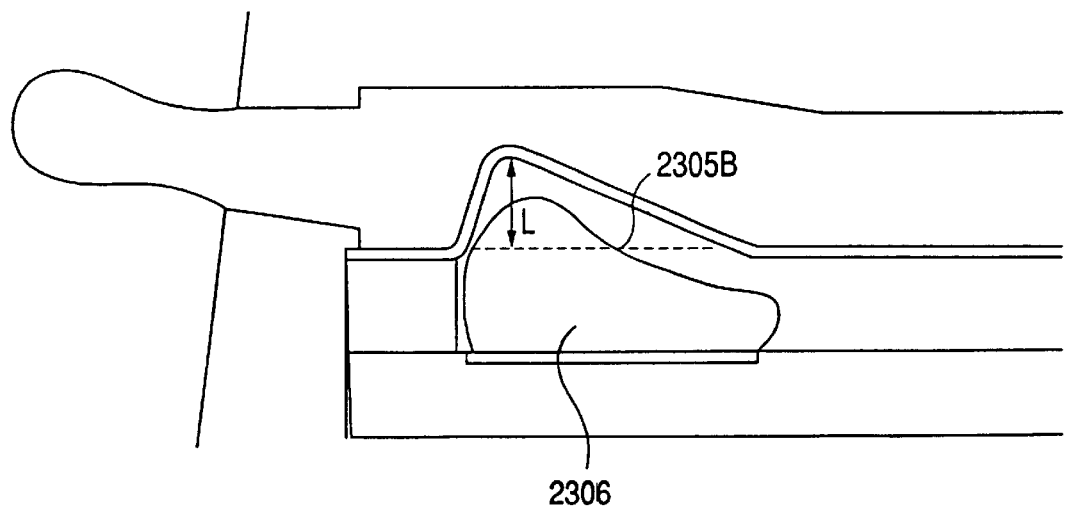

FIGS. 43A and 43B are sectional views (taken along a direction of the liquid passage) showing a first example of such a liquid discharge head, where FIG. 43A is a view showing a non-bubbling condition, and FIG. 43B is a view showing a bubbling condition.

As shown in FIGS. 43A and 43B, in this example, a second liquid passage 2304 for bubbling liquid is provided on a substrate 2310 on which a heat generating member 2302 for generating thermal energy for creating a bubble in the liquid, and a first liquid passage 2303 for discharge liquid directly communicating with a discharge port 2301 is provided on the second liquid passage. Further, a movable separation diaphragm 2305 formed from a deformation thin film is disposed between the first liquid passage 2303 and the second liquid passage 2304, so that the discharge liquid in the first liquid passage 2303 is isolated from the bubbling liquid in the second liquid passage 2304 by the movable separation diaphragm 2305.

As shown in FIG. 43A, in a non-bubbling condition, a portion of the movable separation diaphragm 2305 disposed above a projected area of the heat generating member 2302 is protruded toward the second liquid passage 2304, and a distance L protruded from a reference surface 2305B of the movable separation diaphragm 2305 is selected to be greater at a downstream side where the discharge port 2301 of the first liquid passage 2303 is located than at an upstream side where a common liquid chamber is located. On the other hand, in a bubbling condition shown in FIG. 43B, the configuration of the diaphragm is reversed to permit the displacing process of the present invention.

That is to say, since the configuration of the movable separation diaphragm is previously defined, desired displacement can be obtained stably, and the movable separation diaphragm itself can also act as the direction regulating means described in connection with the diaphragm having elasticity, thereby providing a simple structure.

Incidentally, a maximum displacement volume (represented by the sum of the volumes of the protruded configuration portions in FIGS. 43A and 43B) created by displacement of a protruded configuration portion 2305a of the movable separation diaphragm protruded from the reference surface 2305B toward the second liquid passage is selected to become greater than a maximum expansion volume (if there is no movable separation diaphragm) of a bubble created in a bubble generating area 2307.

Further, a distance between a surface (on which the protruded configuration portion 2305a is not formed) of the movable separation diaphragm 2305 and the surface of the heat generating member 2302 is selected to about 5 to 20 $\mu$m, and the bubble generating area 2307 is defined between the heat generating member 2302 and the protruded configuration portion 2305a.

Now, a liquid discharging operation of the above-mentioned liquid discharge head will be explained.

When electrical energy is applied to the heat generating member 2302, a part of the bubbling liquid filled in the bubble generating area 2307 is heated by heat generated from the heat generating member 2302, thereby creating a bubble 2306 by film boiling. When the bubble 2306 is created, the protruded configuration portion 2305a of the movable separation diaphragm 2305 is displaced from a first position shown in FIG. 43A to a second position shown in FIG. 43B toward the first liquid passage 2303 by pressure of the created bubble 2306. Since the displacement amount is greater at the downstream side than the upstream side, the propagating direction of the pressure of the bubble 2306 can be directed toward the discharge port efficiently.

Thereafter, when the bubble 2306 contracts and disappears by reduction of the inner pressure of the bubble (characteristic of the film boiling phenomenon), the protruded configuration portion 2305a of the movable separation diaphragm 2305 which was displaced to the second position is returned to the initial position (first position) by negative pressure due to contraction of the bubble 2306 and a restoring force due to a spring feature of the movable separation diaphragm 2305 itself.

In this example, since the movable separation diaphragm 2305 is displaced from the second liquid passage side to the first liquid passage side by the displacement of the protruded configuration portion 2305a, in comparison with the case where the movable separation diaphragm is flat in the non-bubbling condition and is displaced toward the first liquid passage when the bubble is created, energy obtained by generation of the bubble contributes to the displacement of the movable separation diaphragm 2305 more efficiency, thereby discharging the liquid efficiently. Incidentally, in case of the arrangement according to this example, although the movable separation diaphragm itself has expansiveness, when the movable diaphragm is displaced by the created bubble, the less the expansion of the diaphragm, the greater the discharging efficiency.

Further, since maximum displacement volume of the protruded configuration portion 2305a of the movable separation diaphragm is selected to become greater than maximum expansion volume (if there is no movable separation diaphragm) of the bubble created in the bubble generating area 2307, the growth of the bubble is not obstructed, thereby further improving the discharging efficiency.

Further, in this example, since the movable separation diaphragm is previously protruded toward the second liquid passage, the displacement amount caused when the movable separation diaphragm is displaced from the first position to the second position by the pressure of the bubble to direct the propagating direction of the bubble pressure toward the discharge port becomes great, thereby improving the liquid discharging efficiency. Further, regarding the protruded configuration portion of the movable separation diaphragm, since the distance is greater at the discharge port side than at the common liquid chamber side, the bubble pressure is apt to be propagated toward the discharge port in the first liquid passage, thereby improving the discharging efficiency for discharging the liquid from the discharge port.

EXAMPLE 2

Figure 44A:
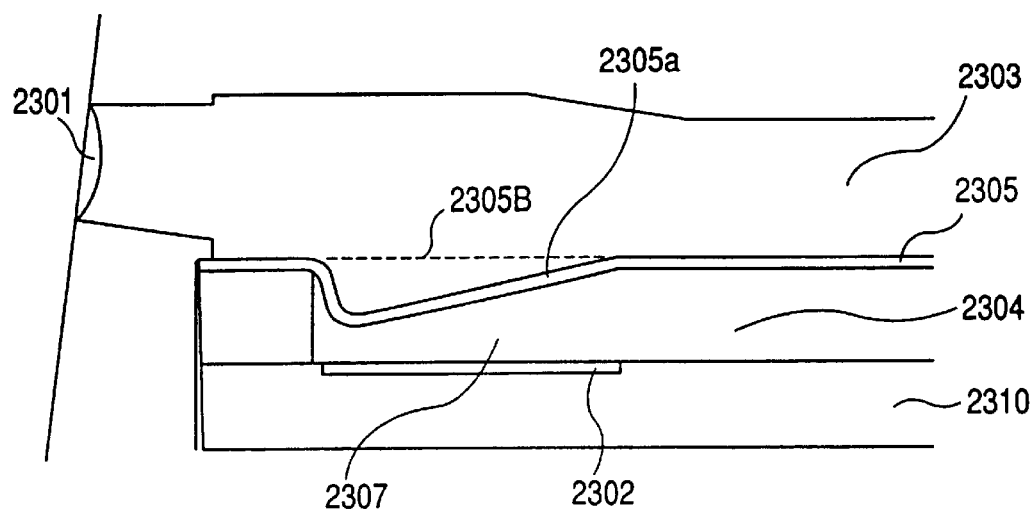
FIGS. 44A and 44B are explanatory views showing another embodiment of a liquid discharge head having a means for regulating a movable separation diaphragm, according to the present invention, where
Figure 44B:
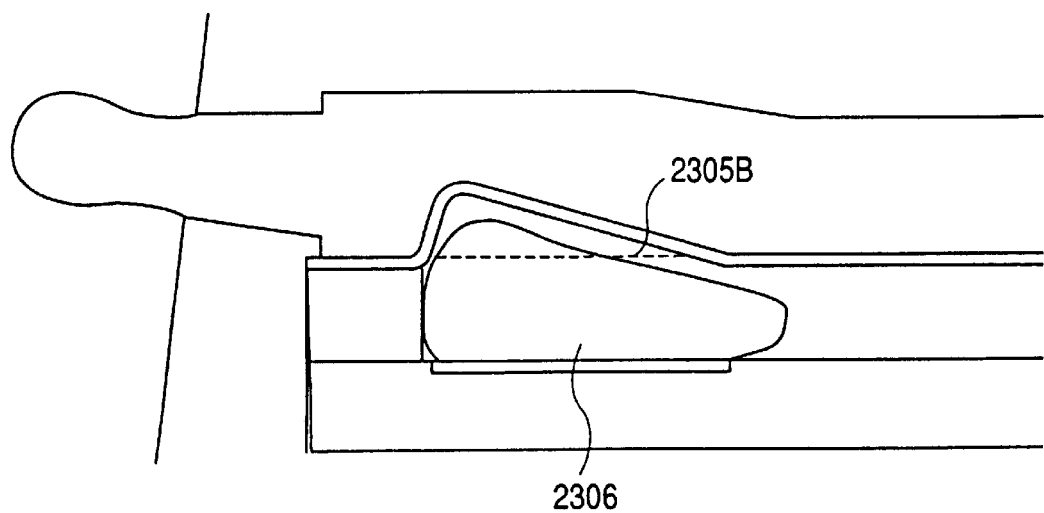

FIGS. 44A and 44B are sectional views (taken along a direction of the liquid passage) showing a second example of such a liquid discharge head, where FIG. 44A is a view showing a non-bubbling condition, and FIG. 44B is a view showing a bubbling (discharging) condition.

Unlike the first example shown in FIGS. 43A and 43B, in this second example, as shown in FIGS. 44A and 44B, the maximum displacement volume of the protruded configuration portion of the movable separation diaphragm is selected to become smaller than a maximum expansion volume (if there were no movable separation diaphragm) of a bubble 2306 created in the bubble generating area 2307.

In this example, the maximum displacement volume of the protruded configuration portion 2305a of the movable separation diaphragm 2305 is selected to be 80% or less of the maximum expansion volume (if there were no movable separation diaphragm) of the bubble 2306 created in the bubble generating area 2307. As a result, even if it is assumed that discharge dispersion of about ±10% occurs in the normal liquid discharge head due to dispersion in the bubble 2306 depending upon the discharging feature of the liquid, since the displacement amount of the protruded configuration portion of the movable separation diaphragm becomes always constant during the bubbling regardless of the dispersion in the expansion volume of the bubble, the discharge amount of the discharge liquid becomes substantially constant, thereby effecting good discharging without dispersion from nozzle to nozzle occurring.

In this way, this example is particularly effective when the maximum expansion volume of the bubble is not always constant or varies from nozzle to nozzle due to dispersion factors based on the manufacturing conditions and/or environmental conditions.

<Liquid Discharge Head Cartridge and Liquid Discharging Recording Apparatus>

Next, a liquid discharge head cartridge on which the liquid discharge head according to any one of the above-mentioned embodiments is mounted, and a liquid discharging recording apparatus, will be explained with reference to FIGS. 39 and 40.

Figure 39:
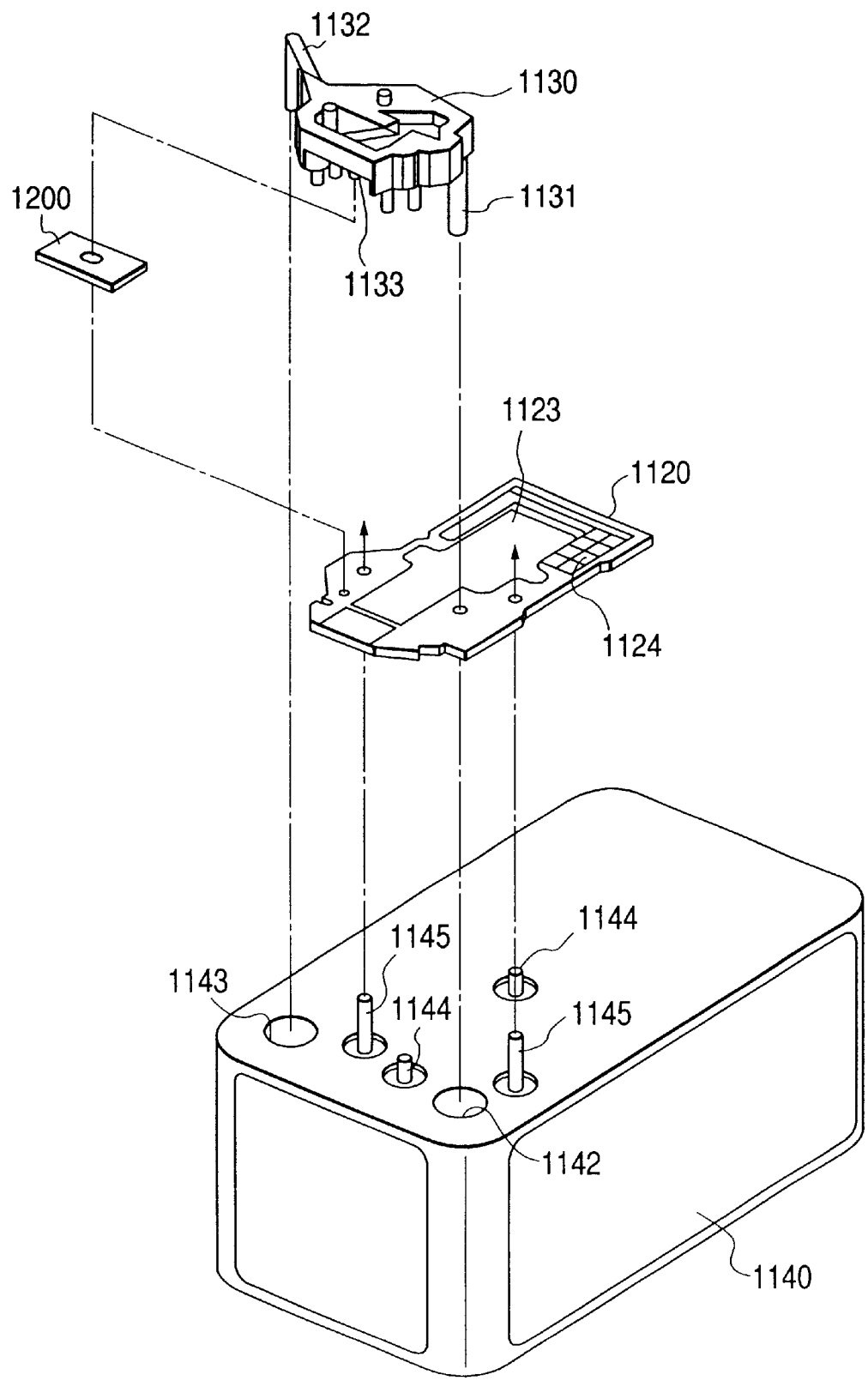
FIG. 39 is an exploded perspective view of a liquid discharge head cartridge to which the present invention can be applied.

FIG. 39 is a schematic exploded perspective view of a liquid discharge head cartridge including the above-mentioned liquid discharge head. The liquid discharge head cartridge is mainly constituted by a liquid discharge head portion and a liquid container 1140.

The liquid discharge head portion comprises the above-mentioned liquid discharge head 1200, a liquid supplying member 1130, and an aluminium base plate (support) 1120. The support 1120 serves to support the liquid discharge head 1200 and the like and is provided with a print wiring substrate 1123 connected to the liquid discharge head 1200 and adapted to supply an electric signal to the head, and contact pads 1124 for sending and receiving electric signals with respect to the apparatus connected thereto.

The liquid container 1140 contains the liquid to be supplied to the liquid discharge head 1200. Positioning portions 1144 for holding a connection member for effecting connection between the liquid discharge head portion and the liquid container 1140, and fixed shafts 1145 for fixing the connection member are provided on the liquid container 1140. The liquid is supplied from liquid supply paths 1142, 1143 of the liquid container 1140 through supply paths of the connection member to liquid supply paths 1131, 1132 of the liquid supplying member 1130 and then is supplied to the common liquid chamber of the liquid discharge head 1200 through liquid paths (not shown) of the members. In this example, while the supply of the liquid from the liquid container 1140 to the liquid supplying member 1130 was effected through two paths, it is not necessarily that two paths are used.

Incidentally, when the liquid is used up, new liquid may be replenished into the liquid container 1140. To this end, it is desirable that the liquid container 1140 is provided with a liquid pouring hole. Further, the liquid discharge head portion may be formed integrally with the liquid container 1140 or may be disconnected from the liquid container.

Figure 40:
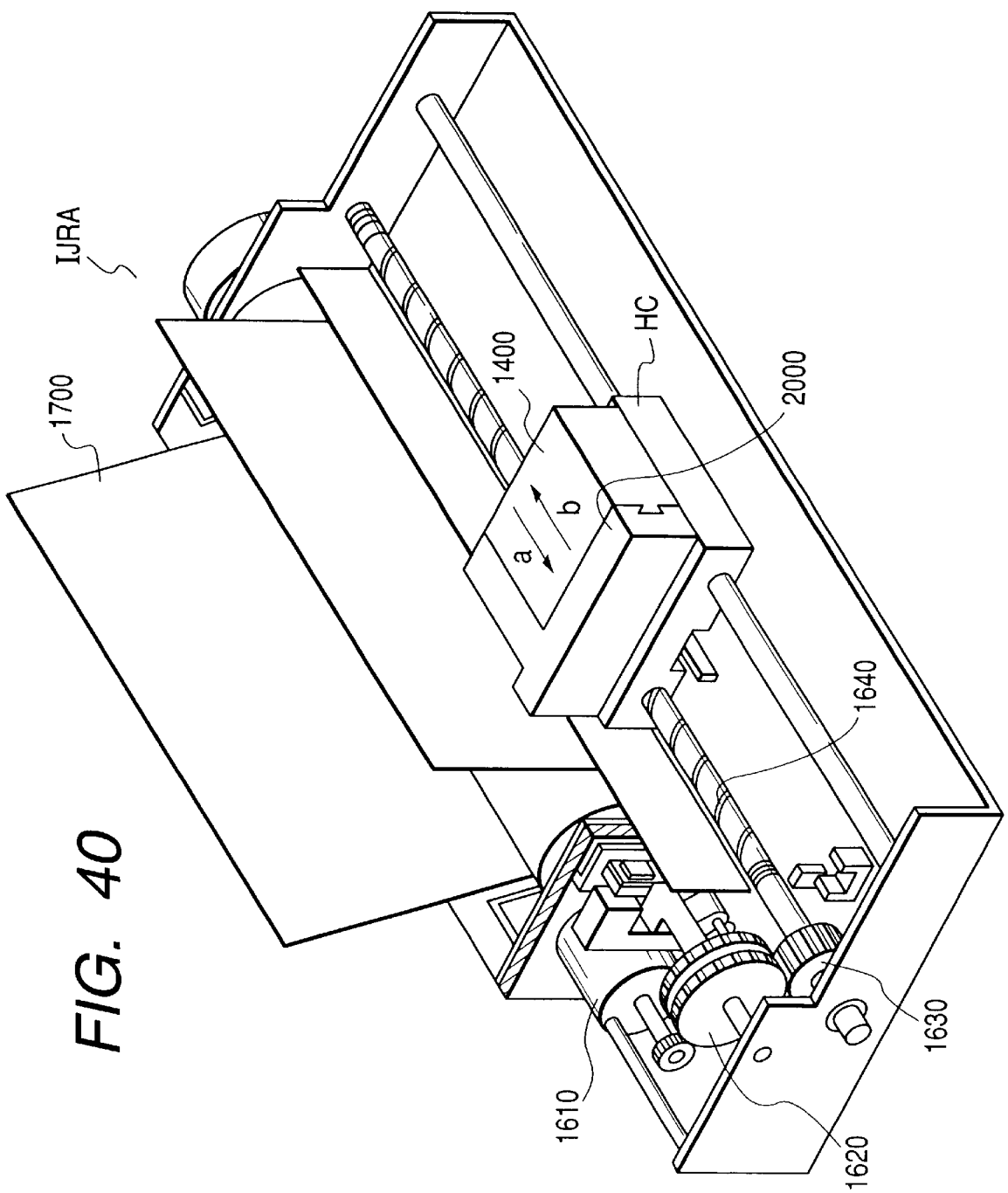
FIG. 40 is a schematic view of the overall structure of a liquid discharging apparatus to which the present invention can be applied.

FIG. 40 schematically shows a liquid discharging apparatus to which the above-mentioned liquid discharge head is mounted. In the illustrated embodiment, particularly, an ink jet recording apparatus IJRA using ink as the discharge liquid will be explained. A carriage HC of the liquid discharging apparatus mounts thereon a head cartridge on which the liquid container 1140 and the liquid discharge head portion 2000 can detachably be mounted and is reciprocally shifted in a width-wise direction (shown by the arrows a, b) of a recording medium 1700 conveyed by a recording medium convey means. Incidentally, the liquid container and the liquid discharge head portion can be separated from each other.

In FIG. 40, when a drive signal is supplied from a drive signal supply means (not shown) to a liquid discharge means on the carriage HC, the recording liquid is discharged from the liquid discharge head portion 2000 toward the recording medium 1700 in response to the drive signal.

Further, the liquid discharging apparatus according to the illustrated embodiment includes a motor (drive source) 1610 for driving the recording medium convey means and the carriage HC, gears 1620, 1630 for transmitting a power from the drive source to the carriage HC, and a carriage shaft 1640. By this recording apparatus, a good image can be obtained by discharging the liquid onto various recording media.

(Preferred Technical Points of Separation Diaphragm)

Since the separation diaphragm made of polyparaxylilene (referred to as "PPX" hereinafter) used in the above-mentioned second to fourth embodiments can be applied to other liquid discharge heads having a separation diaphragm other than the present invention, more preferred conditions of the separation diaphragm have been determined.

Particularly, when the property of PPX was investigated, the following new practical facts (particularly, decomposed temperature of organic diaphragm) were discovered.

Incidentally, in the following explanation, the term "on the surface of the heat generating element" means "on the surface of the anti-cavitation film 107" when the protection film 106 and the anti-cavitation film 107 are provided as shown in FIG. 21 and "on the surface of the heat generating element" when such films are not provided. That is to say, this term is used for indicating a portion (for example, heat acting portion 108 in FIG. 21) on the heat generating element on which the bubble is created by the heat of the heat generating element.

<Relation Between Movable Separation Diaphragm and Surface Temperature of Heat Generating Element>

When normal dying ink is used, in the film boiling for forming the bubble, generally, a bubble starting temperature is a temperature (for example, about 300° C. or more on the surface of the heat generating element, and, practically about 250° C.) obtained by abrupt temperature increase, and a maximum temperature during bubbling may reach about 600° C. on the surface of the heat generating element. This temperature is generated within a time in the order of $\mu$sec and does not continue for a long time. When the bubble disappears, the temperature on the surface of the heat generating element becomes about 180° C. (practically about 200° C.).

When the separation diaphragm was used under these conditions, the properties of a portion of the separation diaphragm suddenly deteriorated or a portion of the diaphragm was broken. When the reason for this was sought, preferred conditions for the separation diaphragm were discovered.

One of the preferred conditions is that, when the movable separation diaphragm is formed by depositing organic material by means of chemical vapor-phase reaction or plasma polymerization reaction, the heat-decomposition temperature of the movable separation diaphragm in such a reaction should be greater than an environmental temperature to which the movable separation diaphragm is exposed. Another preferred condition is that, in light of the short time in the order of several tens of $\mu$sec to several minutes, even if the temperature of the movable separation diaphragm temporarily exceeds a melting point (lower than the heat-decomposition temperature) of the movable separation diaphragm, such fact need not be taken into consideration.

Thus, a relation between the movable separation diaphragm and the temperature on the surface of the heat generating element, which affects the discharging may become as follows. Hereinbelow, effective conditions in such cases are listed.

(1) In One Shot Discharging Operation

First of all, a case where one liquid droplet is discharged from the initial condition (or a continuous discharging operation having a long duration (for example, several tens of msec to several seconds or more) between one discharging to the next discharging) is considered.

In this case, during the growth of the bubble from the start of bubbling, since the movable separation diaphragm is normally fixed to the liquid passage walls and a portion is displaced away from the surface of the heat generating element via the liquid (bubbling liquid) by a predetermined distance, the influence of the surface temperature of the heat generating element on the movable separation diaphragm need not be taken into consideration.

However, after the liquid is discharged from the discharge port, when the bubble disappears, the movable separation diaphragm may closely approach or come into contact with the surface of the heat generating element due to cavitation. In this case, after the bubble disappears, since the movable separation diaphragm tries to return to the initial position soon due to the re-fill of the bubbling liquid, only the instantaneous heat-resisting property of the movable separation diaphragm need be taken into consideration.

Accordingly, so long as the heat-decomposition temperature of the material used for the movable separation diaphragm is greater than the temperature (when the bubble has disappeared) on the surface of the heat generating element, even if the movable separation diaphragm comes into contact with the surface of the heat generating element, the movable separation diaphragm will not decompose.

(2) In a Continuous Shot Discharging Operation

Next, a case where the liquid droplets are continuously discharged at a time interval of several tens of $\mu$sec to several hundreds of $\mu$sec is considered.

When the time interval between the discharging and the next discharging becomes short in this way, so long as the re-fill of the bubbling liquid is effected so that a desired amount of bubbling liquid exists in the bubble generating area on demand, the possibility that the movable separation diaphragm adheres to the surface of the heat generating element when the bubbling begins rather than when the bubble disappears must be taken into consideration.

In this case, if small bubbles are generated by the heat of the heat generating element, since the bubbles exists between the movable separation diaphragm and the surface of the heat generating element, the surface of the heat generating element and the movable separation diaphragm do not further approach each other during the growth of the bubble.

Accordingly, the surface temperature of the heat generating element when the bubbling begins may be taken into consideration, and, since the time period that the movable separation diaphragm is in contact with the surface of the heat generating element is very short, as mentioned above, so long as the heat-decomposition temperature of the material used for the movable separation diaphragm is greater than the temperature (when the bubbling has started) on the surface of the heat generating element, as in case of the disappearance of the bubble, even if the movable separation diaphragm comes into contact with the surface of the heat generating element, the movable separation diaphragm will not decompose.

Further, in the case where the continuous discharging operation is continued for a long time (for example, several minutes to several tens of minutes), the maximum temperature of the surface of the heat generating element not only when the bubbling is starting but also during the bubbling must be taken into consideration. In this case, even if the heat of the liquid discharge head is not radiated adequately during the continuous discharging operation, it is significantly preferable that the movable separation diaphragm not be thermally decomposed.

That is to say, since the temperature of the liquid discharge head does not exceed the above-mentioned maximum temperature of the surface of the heat generating element during the bubbling, so long as the heat-decomposed of material used for the movable separation diaphragm is greater than the maximum temperature on the surface of the heat generating element, the movable separation diaphragm will not be thermally decomposed.

(3) In an Abnormal Operation

Next, the case of an abnormal operation, in which the bubbling liquid is insufficient (or absent) in the bubbling generating area of the second liquid passage due to inadequate re-fill of the bubbling liquid, is considered.

In such a case, there is an increased possibility that the movable separation diaphragm associated with the nozzle in question (the abnormal nozzle) adheres to the surface of the heat generating element and the liquid cannot be discharged from the corresponding discharge port.

Normally, the liquid discharge head or the liquid discharging apparatus having the liquid discharge head is provided with a detection portion for detecting the poor discharging, and, on the basis of a detected result, the bubbling liquid passage (and the discharge liquid passage, if necessary) is restored to a normal condition by using a conventional recovery means.

When such a recovery means is provided, the conditions required for the diaphragm are varied independently of the time period between occurrence of the abnormality and the recovery operation and the remaining amount of the bubbling liquid in the bubble generating area.

For example, when the recovery operation is performed within a time period of several tens of seconds to several minutes from the occurrence of the abnormality, it is not required that the melting point of the movable separation diaphragm be taken into consideration, and the heat-decomposition temperature may be taken into consideration.

Further, when the head or apparatus is left for a long time in a condition that the movable separation diaphragm is adhered to the surface of the heat generating element without effecting the re-fill of the bubbling liquid, or when the re-fill is inadequate during the continuous discharging operation so that the frequent contact of the movable separation diaphragm against the surface of the heat generating element is repeated over a long time (for example, several tens of minutes), it is significantly preferable that the melting point of the movable separation diaphragm be greater than the temperature (when the bubble has disappeared) on the surface of the heat generating element.

On the other hand, when there is almost no bubbling liquid in the bubble generating area for a long time (for example, several tens of minutes), it is significantly preferable that the melting point of the movable separation diaphragm be greater than the temperature (when the bubbling has started) on the surface of the heat generating element.

Example of PPX

The Inventors noticed PPX as material for satisfying the above-mentioned relation between the movable separation diaphragm and the surface temperature of the heat generating element.

The fundamental structure, manufacturing method and polymerization of PPX in the present invention are disclosed in the above-mentioned U.S. Pat. No. 3,379,803 and Japanese Patent Publication Nos. 44-21353 and 52-37479. More specifically, PPX is defined by the chemical formulae shown in FIGS. 41A to 41F (n: integral number greater than 5000) and may be used independently or in combination.

Further, common characteristics of such PPX are as follows.

PPX is crystal polymer not including ion impurities and having crystallinity of about 60% and molecular weight of about 500,000 and has excellent water-repellent ability and gas-barrier ability. Further, PPX is insoluble to all organic solvents at a temperature below 150° C. and has resistance against corrosive liquids such as almost all acids and alkali liquids. In addition, PPX has excellent stability even after repeated displacement. Furthermore, the thickness in film formation can easily be controlled exactly, and a film closely fittable onto an object can be obtained, and a film having a thickness of as little as 0.2 $\mu$m and having no pinholes can be formed depending on the object to be fitted. Further, since PPX is not affected by mechanical stress or thermal stress due to thermal distortion of the object, a film of PPX can be adhered onto the object stably and effectively.

Figure 41A:
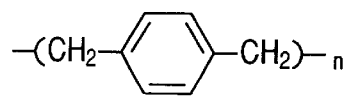
FIGS. 41A, 41B, 41C, 41D, 41E and 41F are views showing fundamental chemical formulae of polyparaxylirene (PPX) according to the present invention.
Figure 41B:
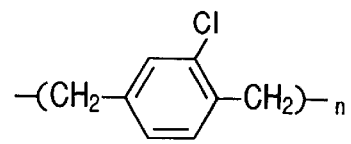
Figure 41C:
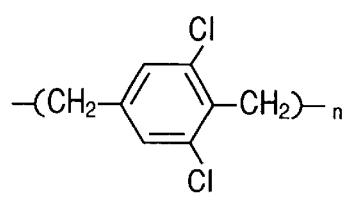
Figure 41D:
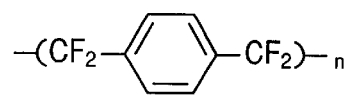
Figure 41E:
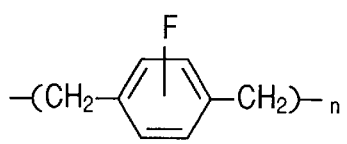
Figure 41F:
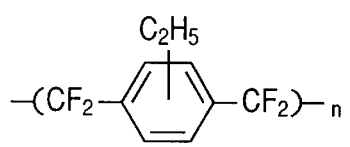

By using the material shown in FIG. 41A, 41B or 41C, the head substrate having the movable separation diaphragm integrally formed therewith was manufactured by the manufacturing method in the first embodiment shown in FIGS. 4A to 4C (however, the formation of the film itself of the movable separation diaphragm was effected by vapor polymerization, and, regarding the sacrifice layer, suitable material (for example, aluminium) capable of providing the selection ratio between the movable separation diaphragm and the element substrate due to solvent of etching rate was selected), and, after the head substrate was joined to the orifice integral type top plate shown in FIG. 3C by an adhesive, the discharge ports were formed by the method shown in FIGS. 5A to 5C to provide the liquid discharge head (in the structure of the head shown in FIGS. 1 and 2, the movable separation diaphragm is made of PPX in place of SiN).

The physical features, fundamental features and deposition (during film formation) of the respective materials were as shown in the following Table 1:

TABLE 1

| Test material | A (composition of FIG. 41A) | B (composition of FIG. 41B) | C (composition of FIG. 41C) |
|---|---|---|---|
| Melting point | 405° C. | 280° C. | 350° C. |
| features | •transparent<br>•excellent penetration into small space<br>•coated film is soft<br>•excellent electrical features<br>•constant dielectric features in various frequency zones | •transparent<br>•excellent prevention of permeation of vapor and gas<br>•thin film having no pinhole can be formed | •transparent<br>•intermediate is somewhat hard<br>•excellent resistance against chemical medicines |
| Deposition | high insulation force | good | not so good |

The heat-decomposition temperatures of these test materials are 680° C., for example, and, in each test material, at a temperature of about 700° C., the heat-decomposition temperature is greater than the surface temperature of the heat generating element (when film boiling effected by the heat generating element is started and when the bubble has disappeared) and the maximum temperature reached on the surface of the heat generating element.

Further, in each test material, the melting point is greater than the surface temperature of the heat generating element (when the bubble has disappeared). Incidentally, in comparison between the melting points of test materials and the surface temperature of the heat generating element (when film boiling effected by the heat generating element is started), the melting points of the test materials A and C are greater than the surface temperature of the heat generating element (when film boiling is started).

In comparison with the conventional liquid discharge heads in which organic material such as polyimide (conventionally known as a separation diaphragm) is used as the movable separation diaphragm, in the liquid discharge heads in which the above-mentioned test materials are used as the movable separation diaphragms it was found the number of liquid discharging times in each nozzle is increased considerably, and endurance of the head is improved, and the normal condition is quickly restored by effecting the recovery treatment if poor discharging is detected. Further, ink corrosion was not found.

Incidentally, even when the above-mentioned separation diaphragm is used, since both the head substrate and the top plate are formed from material of a silicon group, the heat radiating ability of the head is excellent, thereby further improving the service life of the head.

Figure 42A:
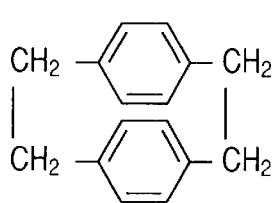
FIGS. 42A, 42B and 42C are explanatory views showing change in material in a reaction process when a separation diaphragm is formed from polyparaxylirene of FIG. 41A alone.
Figure 42B:
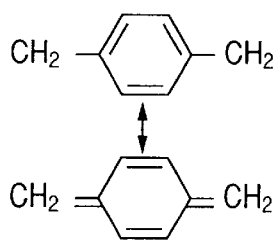
Figure 42C:
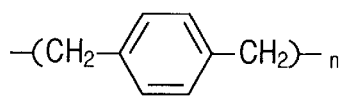

Now, regarding the above-mentioned manufacturing processes, supplementary explanation is made with respect to the deposition of PPX film, referring to FIGS. 42A to 42C.

FIGS. 42A to 42C are explanatory views showing change in material in the deposition reaction process when the separation diaphragm is manufactured from the PPX shown in FIG. 41A alone. First of all, diparaxylilene of solid dimer as raw material shown in FIG. 42A is evaporated under a temperature of about 100 to 200° C. Then, formation of stable diradical paraxylilene monomer is effected under the aforementioned temperature of about 700° C. by heat decomposition of dimer as shown in FIG. 42B. And, absorption and polymerization of diradical paraxylilene to the Si wafer and the head substrate on which the sacrifice layer is coated are effected simultaneously, with the result that the movable diaphragm of polyparaxylilene as shown in FIG. 17B or 10B is formed at room temperature.

Particularly when the condition shown in FIG. 42B is changed to the condition shown in FIG. 42C to form the movable diaphragm, by effecting the formation under a high vacuum of 0.1 Torr or less, diradical paraxylilene (heat-decomposed product of dimer formed in the vapor-phase condition) can be fully penetrated into fine spaces to be joined to the fixing portion of the movable diaphragm chemically stably, thereby improving adhesion between the fixed portion (joining members and liquid passages) of the movable diaphragm and the substrate.

Further, as in the manufacturing methods explained in connection with the second to fourth embodiments, when the movable separation diaphragm is formed to contact with the Si wafer and thereafter the Si wafer is removed by CMP or the like, strictly speaking, the PPX film includes Si having a thickness of about several Å. By this Si having the thickness on the order of the atomic level, it is seen that the rigidity of the diaphragm is changed in comparison with PPX alone, thereby suppressing slack. Accordingly, as in the fourth embodiment, by using the side of the PPX film in contact with Si as the heat generating resistance element side (second liquid passage side), the movable separation diaphragm can be prevented from coming into contact with the surface of the heat generating resistance element when the bubble has disappeared.

<Technical Problem and Effect>

In the present invention, as mentioned above, when the liquid is discharged by the formation of the bubble caused by film boiling by using the organic film and the heat generating element, the practical effects are superior to the conventional technical level, reflecting the effectiveness of the invention.

Incidentally, the conventional technical level is to recognize the problems for improving the discharging efficiency. However, before that, simple separation diaphragms capable of isolating the mere bubbling liquid and the discharge liquid were mostly considered.

From this point of view, the above-discussed solutions of the technical problems provided by the present invention constitute an "improvement of the separation diaphragm alone and the ink jet head in consideration of thermal factors in the displacement of the separation diaphragm caused by a series of changes (generation, growth and disappearance of the bubble)" affecting the separation diaphragm of the present invention. This is novel.

Accordingly, the above-discussed invention solving the above problems can eliminate the cause of the problems themselves, and, even if abnormal operation occurs, such operation can be quickly corrected by recovery treatment. Accordingly, in comparison with the liquid discharge head having the conventional separation diaphragm, the liquid discharge head of the present invention has the following advantages: the liquid discharge head can be used for a long time without breaking the separation diaphragm, the service life of the head itself can be lengthened, and the head portion having the plurality of nozzles can be prevented from being damaged. The respective inventions are effective independently, and combinations thereof provide more excellent effects.

What is claimed is:

1. A method for manufacturing a liquid discharge head, said head comprising:

a top plate including a plurality of ink discharge ports for discharging ink droplets, a plurality of first liquid passages for supplying ink in correspondence to said plurality of ink discharge ports and a common liquid chamber for supplying the ink to said first liquid passages;

a liquid discharge head substrate obtained by forming second liquid passages arranged adjacent to said first liquid passages and including bubble generating areas on a substrate on which a plurality of heat generating elements for causing said ink discharge ports to discharge the ink droplets are arranged and including drivers for driving said heat generating elements; and a moving diaphragm for completely isolating said first liquid passages and said second liquid passages from each other and displaceable by a bubble generated on said heat generating elements, said method comprising:

a moving diaphragm forming step for providing said moving diaphragm in such a manner that a portion for fixing said moving diaphragm is covered;

a step for providing a sacrifice layer on portions of said substrate on which said second liquid passages are formed;

a step for forming a though-hole in a rear side of a surface of said substrate on which said sacrifice layer is provided; and a step for removing said sacrifice layer from said through-hole, wherein said portion for fixing said moving diaphragm is said substrate and said moving diaphragm is provided on the surface of said substrate on which said sacrifice layer is provided.

2. A method for manufacturing a liquid discharge head according to claim 1, wherein said top plate, said substrate and said moving diaphragm all comprise an inorganic material including silicon.

3. A method for manufacturing a liquid discharge head, said head comprising:

a top plate including a plurality of ink discharge ports for discharging ink droplets, a plurality of first liquid passages for supplying ink in correspondence to said plurality of ink discharge ports and a common liquid chamber for supplying the ink to said first liquid passages;

a liquid discharge head substrate obtained by forming second liquid passages arranged adjacent to said first liquid passages and including bubble generating areas on a substrate on which a plurality of heat generating elements for causing said ink discharge ports to discharge the ink droplets are arranged and including drivers for driving said heat generating elements; and a moving film for completely isolating said first liquid passages and said second liquid passages from each other and displaceable by a bubble generated on said heat generating elements, said method comprising:

a moving film forming step, of providing said moving film in such a manner that a portion for fixing said moving film is covered, said portion for fixing said moving film being a first frame provided at an area other than deformable portions of said moving film;

a first frame forming step, of providing said first frame on a support for forming said first frame prior to said moving film forming step; and a step of removing said support after said moving film forming step.

4. A liquid discharge head manufacturing method according to claim 3, further comprising a step of providing a second frame on said moving film after said moving film forming step.

5. A method for manufacturing a liquid discharge head, said head comprising:

a top plate including a plurality of ink discharge ports for discharging ink droplets, a plurality of first liquid passages for supplying ink in correspondence to said plurality of ink discharge ports and a common liquid chamber for supplying the ink to said first liquid passages;

a liquid discharge head substrate obtained by forming second liquid passages arranged adjacent to said first liquid passages and including bubble generating areas on a substrate on which a plurality of heat generating elements for causing said ink discharge ports to discharge the ink droplets are arranged and including drivers for driving said heat generating elements; and a moving diaphragm for completely isolating said first liquid passages and said second liquid passages from each other and displaceable by a bubble generated on said heat generating elements, said method comprising:

a moving diaphragm forming step, of providing said moving diaphragm in such a manner that a portion for fixing said moving diaphragm is covered, said portion for fixing said moving diaphragm being a first frame provided at an area other than deformable portions of said moving diaphragm;

a first frame forming step, of providing said first frame on a support for forming said first frame prior to said moving diaphragm forming step; and a step of removing said support after said moving diaphragm forming step, wherein, in said first frame forming step, a cantilever movable member contacted with said moving diaphragm in correspondence to said deformable portions of said moving diaphragm and opened toward a direction of said ink discharge ports is formed simultaneously with said first frame.

6. A liquid discharge head comprising:

a top plate including a plurality of ink discharge ports for discharging ink droplets, a plurality of first liquid passages for supplying ink in correspondence to said plurality of ink discharge ports and a common liquid chamber for supplying the ink to said first liquid passages;

a liquid discharge head substrate obtained by forming second liquid passages arranged adjacent to said first liquid passages and including bubble generating areas on a substrate on which a plurality of heat generating elements for causing said ink discharge ports to discharge the ink droplets are arranged and including drivers for driving said heat generating elements; and a moving diaphragm for completely isolating said first liquid passages and said second liquid passages from each other and displaceable by a bubble generated on said heat generating elements, wherein said moving diaphragm has a frame joined to said moving diaphragm to support said moving diaphragm, said frame is provided to pinch both surfaces of said moving diaphragm, and said frame provided on both surfaces of said moving diaphragm has joining portions joined to each other, and wherein a cantilever movable member arranged adjacent to said moving diaphragm and opened toward a direction of said ink discharge ports by a bubble generated on said heat generating elements is formed integrally with said frame.

7. A liquid discharge head according to claim 6, wherein said moving diaphragm is a single layer.

8. A liquid discharge head according to claim 6, wherein said top plate, said substrate and portions of said moving diaphragm joined to said top plate and said substrate are formed from material including silicon, and said moving diaphragm comprises an inorganic material including silicon.

9. A liquid discharge head according to claim 8, wherein said frame is formed from material including silicon.

10. A liquid discharge head according to claim 8, further comprising a direction controlling means for displacing said moving diaphragm at an upstream side of said ink discharge ports with respect to a flow direction of the liquid in said first liquid passages so that a downstream portion of said moving diaphragm with respect to the flow direction of the liquid is relatively displaced toward said ink discharge ports to a greater extent than an upstream portion of said moving diaphragm.

11. A liquid discharge head according to claim 10, wherein said cantilever movable member serves as said direction controlling means.

12. A head cartridge comprising a liquid discharge head as claimed in claim 8, and an ink tank for holding liquid to be discharged from said head.

13. A liquid discharging apparatus comprising a liquid discharge head as claimed in claim 8, an ink tank for holding liquid to be discharged from said head, a mounting portion on which said liquid discharge head is mounted, and a convey means for conveying a recording medium on which recording is effected by said liquid discharge head.

14. A head cartridge having a liquid discharge head as claimed in claim 6, and an ink tank for holding liquid to be discharged from said head.

15. A liquid discharging apparatus comprising a liquid discharge head as claimed in claim 6, an ink tank for holding liquid to be discharged from said head, a mounting portion on which said liquid discharge head is mounted, and a convey means for conveying a recording medium on which recording is effected by said liquid discharge head.

16. A liquid discharge head according to claim 6, wherein said moving diaphragm includes polyparaxylylene.

* * * * *

UNITED STATES PATENT AND TRADEMARK OFFICE
CERTIFICATE OF CORRECTION

PATENT NO. : 6,540,336 B2
DATED : April 1, 2003
INVENTOR(S) : Masahiko Kubota et al.

It is certified that error appears in the above-identified patent and that said Letters Patent is hereby corrected as shown below:

Title page,
Item [56], References Cited, FOREIGN PATENT DOCUMENTS,
"JP 54-059936 12/1986" should read -- JP 54-059936 12/1979 --.
Item [57], ABSTRACT,
Line 5, "droplet," should read -- droplets, --.

Column 9,
Line 48, "herein after)." should read -- hereinafter). --.

Column 10,
Line 15, "is" should read -- be --.

Column 11,
Line 29, "the" (second occurrence) should be deleted; and
Line 32, "is" should read -- be --.

Column 12,
Line 36, "that" should read -- in which --.

Column 13,
Line 24, "functioned" should read -- made to function --;
Line 36, "excellent." should read -- perfected. --; and
Line 56, "is" should read -- be --.

Column 14,
Line 39, "heating" should read -- heat --;
Line 57, "functioned" should read -- made to function --; and
Line 66, "excellent," should read -- perfected, --.

Column 15,
Line 1, "characteristic" should read -- characteristics --; and
Line 55, "is" should read -- be --.

Column 16,
Line 63, "the" (second occurrence) should read -- an --.

Column 17,
Line 8, "plurality" should read -- plurality of --.

UNITED STATES PATENT AND TRADEMARK OFFICE
CERTIFICATE OF CORRECTION

PATENT NO.    : 6,540,336 B2
DATED         : April 1, 2003
INVENTOR(S)   : Masahiko Kubota et al.

It is certified that error appears in the above-identified patent and that said Letters Patent is hereby corrected as shown below:

Column 18,
Line 14, "is" should read -- be --; and
Line 30, "in dependence" should read -- depending --.

Column 19,
Line 4, "the" should be deleted.

Column 20,
Line 63, "dimension" should read -- dimensions --.

Column 21,
Line 11, "to" should be deleted.

Column 22,
Line 59, "liquids itself" should read -- the liquid itself --.

Column 23,
Line 5, "be discharged," should read -- discharge, --;
Line 38, "discharged," should read -- discharge, --; and
Line 54, "was" should read -- were --.

Column 25,
Line 19, "platation" should read -- implantation --;
Line 31, "that the N-mos transistor is used" should read -- using the N-MOS transistor --; and
Line 40, "layers" should read -- layer --.

Column 27,
Line 3, "dimension" should read -- dimensions --;
Line 21, "displace," should read -- be displaced, --;
Line 28, "expanded" should read -- be expanded --; and
Line 57, "amount." should read -- amount. ¶ {Second Discharging Principle} --.

Column 28,
Line 18, "displace," should read -- be displaced, --.

UNITED STATES PATENT AND TRADEMARK OFFICE
CERTIFICATE OF CORRECTION

PATENT NO. : 6,540,336 B2
DATED : April 1, 2003
INVENTOR(S) : Masahiko Kubota et al.

It is certified that error appears in the above-identified patent and that said Letters Patent is hereby corrected as shown below:

Column 29,
Line 62, "called" should read -- referred to --.

Column 32,
Line 36, "direct" should read -- be directed --.

Column 33,
Line 24, "dimension" should read -- dimensions --;
Line 25, "$\mu$m ±105" should read -- $\mu$m x 150 --; and
Line 27, "communicated" should read -- communicating --.

Column 34,
Line 40, "compensate" should read -- compensate for --.

Column 35,
Line 33, "communicated" should read -- communicating --; and
Line 64, "full" should read -- fully --.

Column 38,
Line 65, "efficiency," should read -- efficiently, --.

Column 40,
Line 29, "it is not necessarily that" should be deleted;
Line 30, "are" should read -- are not necessarily --; and
Line 33, "is" (second occurrence) should read -- be --.

Column 42,
Line 30, "exists" should read -- exist --.

Column 45,
Line 5, "found" should read -- found that --.

UNITED STATES PATENT AND TRADEMARK OFFICE
CERTIFICATE OF CORRECTION

PATENT NO.    : 6,540,336 B2
DATED         : April 1, 2003
INVENTOR(S)   : Masahiko Kubota et al.

It is certified that error appears in the above-identified patent and that said Letters Patent is hereby corrected as shown below:

Column 46,
Line 46, "though-hole" should read -- through-hole --; and
Line 51, "is said" should read -- in said --.

Signed and Sealed this

Fourth Day of November, 2003

JAMES E. ROGAN
*Director of the United States Patent and Trademark Office*